United States Patent
Ng et al.

(10) Patent No.: US 10,637,619 B2
(45) Date of Patent: Apr. 28, 2020

(54) METHOD AND APPARATUS FOR CHANNEL ACCESS FOR LTE ON UNLICENSED SPECTRUM

(71) Applicant: Samsung Electronics Co., Ltd., Suwon-si, Gyeonggi-do (KR)

(72) Inventors: Boon Loong Ng, Plano, TX (US); Jianzhing Zhang, Plano, TX (US); Thomas David Novlan, Dallas, TX (US); Aris Papasakellariou, Houston, TX (US); Eko Onggosanusi, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 558 days.

(21) Appl. No.: 14/930,453

(22) Filed: Nov. 2, 2015

(65) Prior Publication Data
US 2016/0127098 A1    May 5, 2016

Related U.S. Application Data

(60) Provisional application No. 62/074,545, filed on Nov. 3, 2014, provisional application No. 62/086,018, filed
(Continued)

(51) Int. Cl.
*H04W 4/00* (2018.01)
*H04L 5/00* (2006.01)

(52) U.S. Cl.
CPC ............ *H04L 5/0048* (2013.01); *H04L 5/001* (2013.01); *H04L 5/0007* (2013.01)

(58) Field of Classification Search
CPC ....... H04L 5/0048; H04L 5/0007; H04L 5/005; H04W 8/005; H04W 72/042; H04W 72/0446
See application file for complete search history.

(56) References Cited

U.S. PATENT DOCUMENTS

2006/0223448 A1    10/2006    Kruys
2009/0141738 A1*    6/2009    Li ................... H04L 12/413
                                                        370/448
(Continued)

FOREIGN PATENT DOCUMENTS

CN            102769933 A        11/2012
WO         WO 2013109036           7/2013
WO            2013150500 A3       10/2013

OTHER PUBLICATIONS

International Search Report and Written Opinion issued for PCT/KR2015/011727 dated Feb. 5, 2016, 9 pgs.
(Continued)

*Primary Examiner* — Abdelnabi O Musa

(57) ABSTRACT

A method of a base station (BS) to implement a listen-before-talk (LBT) protocol is provided. The method includes generating for transmission at least one of a discovery reference signal (DRS) or a data signal. The method also includes initiating an LBT protocol based on a single sensing interval to access a channel and transmit the DRS in contiguous orthogonal frequency-division multiplexing (OFDM) symbols. The method further includes initiating an LBT protocol with random back-off to access the channel and transmit the data signal, where a back-off counter value of the LBT protocol with random back-off does not decrement when the DRS is transmitting in the channel.

20 Claims, 45 Drawing Sheets

Related U.S. Application Data on Dec. 1, 2014, provisional application No. 62/092,120, filed on Dec. 15, 2014, provisional application No. 62/131,687, filed on Mar. 11, 2015, provisional application No. 62/134,386, filed on Mar. 17, 2015.

(56) References Cited

U.S. PATENT DOCUMENTS

| | | | |
|---|---|---|---|
| 2011/0128895 A1 | 6/2011 | Sadek et al. | |
| 2013/0343288 A1 | 12/2013 | Ratasuk et al. | |
| 2014/0341018 A1* | 11/2014 | Bhushan | H04W 16/14 370/230 |
| 2015/0003356 A1 | 1/2015 | Seo et al. | |
| 2015/0373582 A1* | 12/2015 | Valliappan | H04W 28/08 370/329 |
| 2016/0036617 A1* | 2/2016 | Luo | H04L 27/2662 375/260 |
| 2016/0094998 A1* | 3/2016 | Bhushan | H04W 16/14 455/454 |
| 2016/0249350 A1* | 8/2016 | Koutsimanis | H04W 16/14 |
| 2017/0048041 A1* | 2/2017 | Yi | H04W 72/042 |
| 2017/0231003 A1* | 8/2017 | Godana | H04W 74/0808 |

OTHER PUBLICATIONS

Samsung, "Deployment Scenarios and Evaluation Methodologies for LAA", R1-143880, 3GPP TSG-RAN WG1#78bis, Sep. 27, 2014, 5 pgs.

Extended European Search Report for European Application No. 15857113.3, dated Oct. 18, 2017. (9 pages).

Qualcomm Incorporated, "Required functionalities and design targets"; 3GPP TSG RAN WG1 #78bis, R1-143999, Oct. 6-10, 2014, Ljubljana, Slovenia. (4 pages).

Broadcom Corporation, et al., "PHY enhancement areas & options to support robust coexistence LAA"; 3GPP TSG-RAN WG1 Meeting #78bis, R1-144233, Oct. 6-10, 2014, Ljubljana, Slovenia. (3 pages).

Ericsson, "Initial discussion on solutions for identified LAA functionalities"; 3GPP TSG RAN WG1 Meeting #78bis, R1-144267, Oct. 6-10, 2014, Ljubljana, Slovenia. (3 pages).

China National Intellectual Property Administration, "The First Office Action," Application No. CN201580059748.1, Sep. 11, 2019, 20 pages.

\* cited by examiner

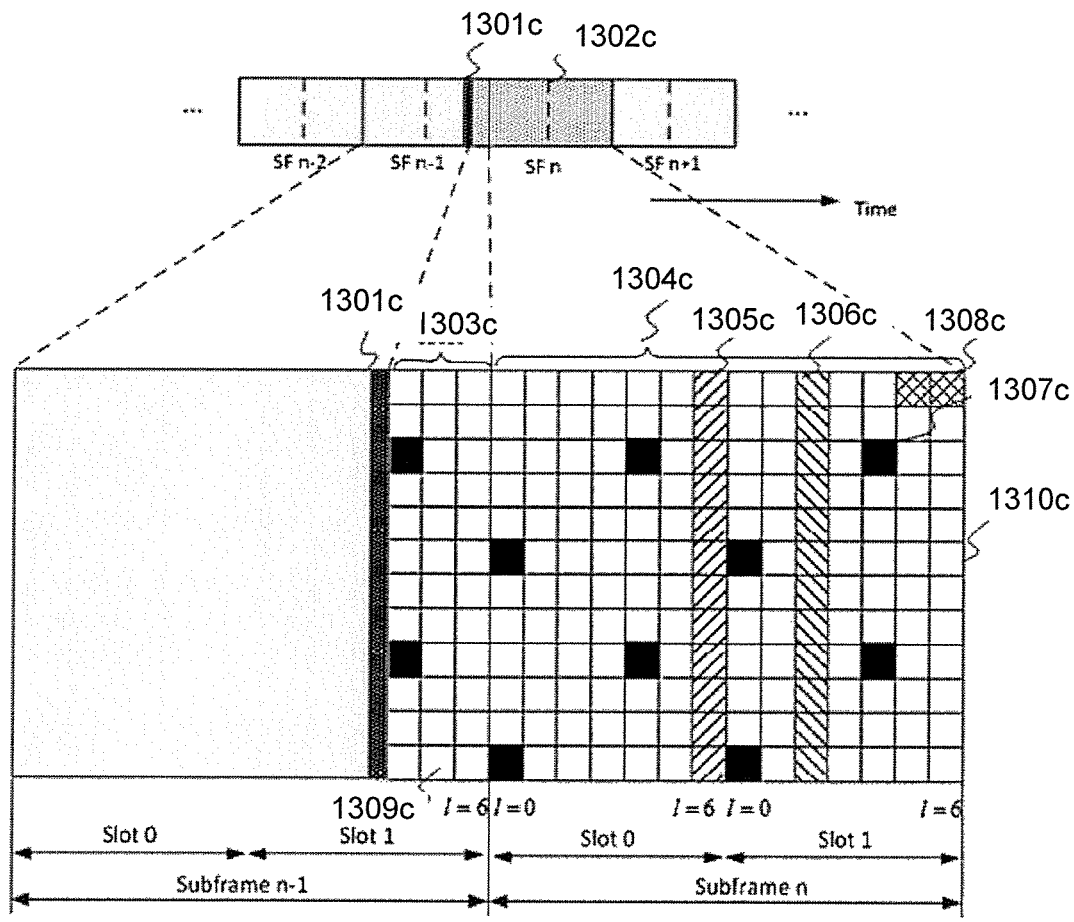
FIGURE 13C
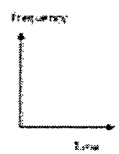

METHOD AND APPARATUS FOR CHANNEL ACCESS FOR LTE ON UNLICENSED SPECTRUM

CROSS-REFERENCE TO RELATED APPLICATION(S) AND CLAIM OF PRIORITY

The present application claims priority to U.S. Provisional Patent Application Ser. No. 62/074,545, filed on Nov. 3, 2014, entitled "METHOD AND APPARATUS FOR CHANNEL ACCESS FOR LTE ON UNLICENSED SPECTRUM," U.S. Provisional Patent Application Ser. No. 62/086,018, filed on Dec. 1, 2014, entitled "METHOD AND APPARATUS FOR CHANNEL ACCESS FOR LTE ON UNLICENSED SPECTRUM," U.S. Provisional Patent Application Ser. No. 62/092,120, filed on Dec. 15, 2014, entitled "METHOD AND APPARATUS FOR CHANNEL ACCESS FOR LTE ON UNLICENSED SPECTRUM," U.S. Provisional Patent Application Ser. No. 62/131,687, filed on Mar. 11, 2015, entitled "METHOD AND APPARATUS FOR CHANNEL ACCESS FOR LTE ON UNLICENSED SPECTRUM," and U.S. Provisional Patent Application Ser. No. 62/134,386, filed on Mar. 17, 2015, entitled "METHOD AND APPARATUS FOR CHANNEL ACCESS FOR LTE ON UNLICENSED SPECTRUM." The content of the above-identified patent documents are incorporated herein by reference in their entireties.

TECHNICAL FIELD

The present application relates generally to wireless communication systems and, more specifically, to wireless communication in long term evolution (LTE) in unlicensed spectrum.

BACKGROUND

Licensed assisted access (LAA) refers to LTE radio access technology (RAT) on an unlicensed frequency spectrum (5 GHz). For REL-13, an LAA cell/carrier is an SCell of carrier aggregation. To co-exist with a WiFi network, listen-before-talk (LBT)/clear channel assessment (CCA) and discontinuous transmission with a limited maximum transmission duration is required.

SUMMARY

Embodiments of the present disclosure provide an efficient operation of LTE cells on an unlicensed spectrum.

In a first example, a method of implementing a listen-before-talk (LBT) protocol by a base station (BS) is provided. The method includes generating for transmission at least one of a discovery reference signal (DRS) or a data signal. The method also includes initiating an LBT protocol based on a single sensing interval to access a channel and transmit the DRS in contiguous orthogonal frequency-division multiplexing (OFDM) symbols. The method further includes initiating an LBT protocol with a random back-off to access the channel and transmit the data signal, where a back-off counter value of the LBT protocol with random back-off does not decrement when the DRS is transmitting in the channel.

In a second example, a base station (BS) is provided. The BS includes processing circuitry. The processing circuitry is configured to generate for transmission at least one of a discovery reference signal (DRS) or a data signal. The processing circuitry is also configured to initiate an LBT protocol based on a single sensing interval to access a channel and transmit the DRS in contiguous orthogonal frequency-division multiplexing (OFDM) symbols. The processing circuitry is further configured to initiate an LBT protocol with random back-off to access the channel and transmit the data signal, where a back-off counter value of the LBT protocol with random back-off does not decrement when the DRS is transmitting in the channel.

In a third example, a method of implementing a listen-before-talk (LBT) protocol by a mobile station (MS) is provided. The method includes receiving a discovery reference signal (DRS) transmitted from a base station (BS) via a channel using an LBT protocol based on a single sensing interval. The DRS is received in contiguous orthogonal frequency-division multiplexing (OFDM) symbols. The method also includes receiving a data signal transmitted from the BS via the channel using an LBT protocol with random back-off.

In a fourth example, a mobile station (MS) is provided. The MS includes a transceiver. The MS also includes processing circuitry. The processing circuitry is configured to detect a reception, via the transceiver, of a discovery reference signal (DRS) transmitted from a base station (BS) via a channel using an LBT protocol based on a single sensing interval. The DRS is received in contiguous orthogonal frequency-division multiplexing (OFDM) symbols. The processing circuitry is also configured to detect a reception, via the transceiver, of a data signal transmitted from the BS via the channel using an LBT protocol with random back-off. The data signal is received by the MS when the MS is not receiving the DRS via the channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A, 13B, 13C, and 13D illustrate examples of a COS of a first method with a second frame structure type according to this disclosure;

DETAILED DESCRIPTION

The following documents and standards descriptions are hereby incorporated into the present disclosure by reference as if fully set forth herein: 3GPP TS 36.211 v12.3.0, "E-UTRA, Physical channels and modulation." [1]; 3GPP TS 36.212 v12.2.0, "E-UTRA, Multiplexing and Channel coding" [2]; 3GPP TS 36.213 v12.3.0, "E-UTRA, Physical Layer Procedures" [3]; 3GPP TR 36.872 V12.1.0, "Small cell enhancements for E-UTRA and E-UTRAN—Physical layer aspects" [4]; 3GPP TS 36.133 v12.5.0, "E-UTRA Requirements for support of radio resource management" [5]; 3GPP TS 36.331 v12.3.0, "E-UTRA, Radio Resource Control (RRC) Protocol Specification" [6]; ETSI EN 301 893 V1.7.1 (2012-06), Harmonized European Standard, "Broadband Radio Access Networks (BRAN); 5 GHz high performance RLAN" [7]; U.S. patent application Ser. No. 14/846,598 "CELL DETECTION, SYNCHRONIZATION AND MEASUREMENT ON UNLICENSED SPECTRUM" [8]; U.S. Pat. No. 9,060,321 entitled "METHODS AND APPARATUS FOR DEMODULATION REFERENCE SIGNALS AND SYNCHRONIZATION SIGNALS IN EXTENSION CARRIER OF LTE ADVANCED" [9]; and 3GPP TS 36.889 v13.0.0 (2015-06) "Study on Licensed-Assisted Access to Unlicensed Spectrum" [10].

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
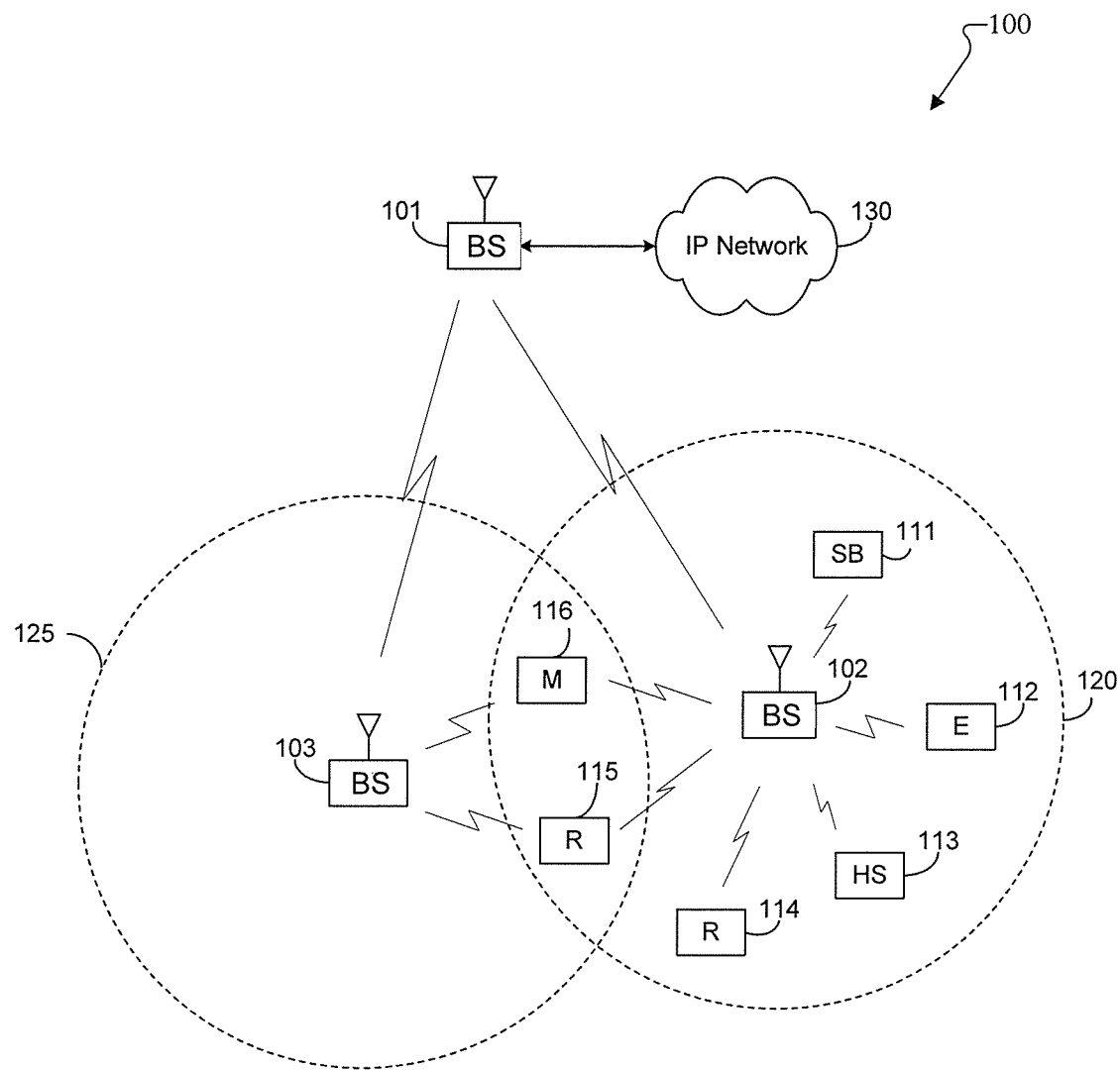
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network.

Depending on the network type, other well-known terms may be used instead of "base station" or "BS," such as "eNodeB" or "eNB" or "access point." These terms may be used interchangeably and are used in this patent document to refer to network infrastructure components that provide wireless access to mobile station (MS). Also, depending on the network type, other well-known terms may be used instead of "mobile station" or "MS," such as "user equipment," "UE," "subscriber station," "remote terminal," "wireless terminal," or "user device." These terms may be used interchangeably and are used in this patent document to refer to remote wireless equipment that wirelessly accesses an BS, whether the MS is a mobile device (such as a mobile telephone or smartphone) or is normally considered a stationary device (such as a desktop computer or vending machine).

The BS 102 provides wireless broadband access to the network 130 for a first plurality of MSs within a coverage area 120 of the BS 102. The first plurality of MSs includes an MS 111, which may be located in a small business (SB); an MS 112, which may be located in an enterprise (E); an MS 113, which may be located in a WiFi hotspot (HS); an MS 114, which may be located in a first residence (R); an MS 115, which may be located in a second residence (R); and an MS 116, which may be a mobile device (M) like a cell phone, a wireless laptop, a wireless PDA, or the like. The BS 103 provides wireless broadband access to the network 130 for a second plurality of MSs within a coverage area 125 of the BS 103. The second plurality of MSs includes the MS 115 and the MS 116. In some embodiments, one or more of the BSs 101-103 may communicate with each other and with the MSs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, various devices in the network 100 (such as BSs and MSs) support techniques for channel estimation.

Although FIG. 1 illustrates one example of a wireless network 100, various changes may be made to FIG. 1. For example, the wireless network 100 could include any number of BSs and any number of MSs in any suitable arrangement. Also, the BS 101 could communicate directly with any number of MSs and provide those MSs with wireless broadband access to the network 130. Similarly, each BS 102-103 could communicate directly with the network 130 and provide MSs with direct wireless broadband access to the network 130. Further, the BS 101, 102, and/or 103 could provide access to other or additional external networks, such as external telephone networks or other types of data networks.

Figure 2A:
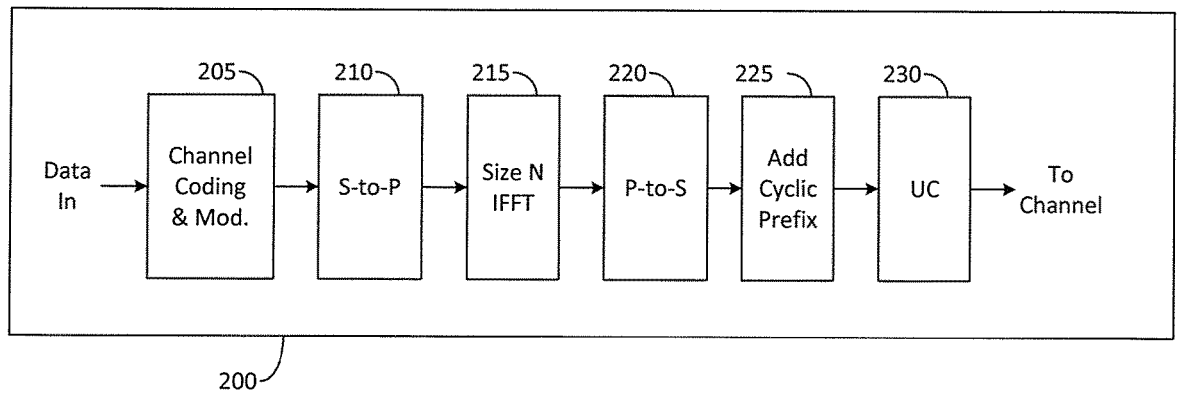
FIGS. 2A and 2B illustrate example embodiments of orthogonal frequency division multiple access (OFDMA) transmit and receive paths according to this disclosure.
Figure 2B:
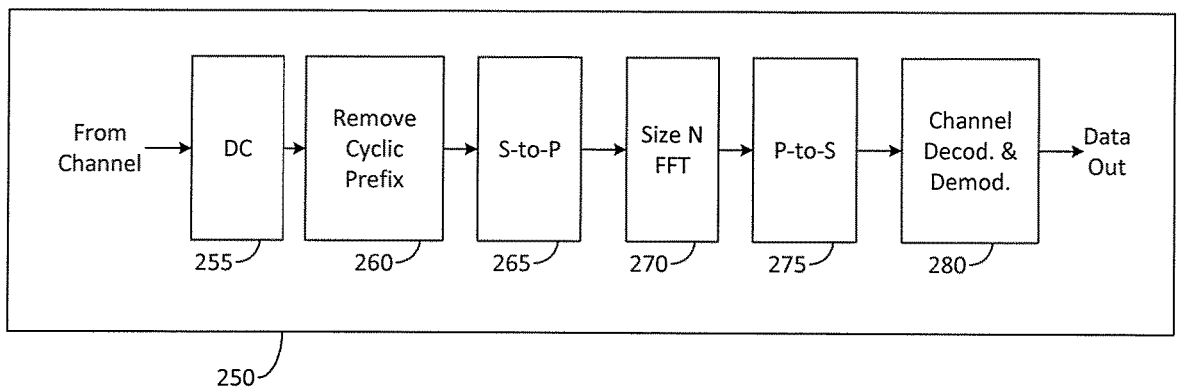

FIGS. 2A and 2B illustrate example embodiments of orthogonal frequency division multiple access (OFDMA) transmit and receive paths according to this disclosure. In FIG. 2A, a transmit path 200 may be implemented in an eNB, such as eNB 102 of FIG. 1. In FIG. 2B, a receive path 250 may be implemented in a UE, such as UE 116 of FIG. 1. It will be understood, however, that the receive path 250 could be implemented in an eNB (such as eNB 102 of FIG. 1) and that the transmit path 200 could be implemented in a UE. The transmit path 200 and the receive path 250 can be configured to implement inter-eNB coordination methods as described herein.

The transmit path 200 includes channel coding and modulation block 205, serial-to-parallel (S-to-P) block 210, size N Inverse Fast Fourier Transform (IFFT) block 215, parallel-to-serial (P-to-S) block 220, add cyclic prefix block 225, and up-converter (UC) 230. The receive path 250 includes down-converter (DC) 255, remove cyclic prefix block 260, serial-to-parallel (S-to-P) block 265, size N Fast Fourier Transform (FFT) block 270, parallel-to-serial (P-to-S) block 275, and channel decoding and demodulation block 280.

In some embodiments, at least some of the components in FIGS. 2A and 2B may be implemented in software, while other components may be implemented by configurable hardware or a mixture of software and configurable hardware. As particular examples, it is noted that the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

In the transmit path 200, the channel coding and modulation block 205 receives a set of information bits, applies coding (such as Turbo or LDPC coding), and modulates the input bits (such as with Quadrature Phase Shift Keying (QPSK) or Quadrature Amplitude Modulation (QAM)) to produce a sequence of frequency-domain modulation symbols. The serial-to-parallel block 210 converts (such as de-multiplexes) the serial modulated symbols to parallel data to produce N parallel symbol streams, where N is the IFFT/FFT size used in eNB 102 and UE 116. The size N IFFT block 215 performs an IFFT operation on the N parallel symbol streams to produce time-domain output signals. The parallel-to-serial block 220 converts (such as multiplexes) the parallel time-domain output symbols from the size N IFFT block 215 to produce a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal may also be filtered at baseband before conversion to RF frequency.

The transmitted RF signal arrives at the UE 116 after passing through the wireless channel, and reverse operations to those at the eNB 102 are performed. The down-converter 255 down-converts the received signal to baseband frequency, and the remove cyclic prefix block 260 removes the cyclic prefix to produce the serial time-domain baseband signal. The serial-to-parallel block 265 converts the time-domain baseband signal to parallel time domain signals. The size N FFT block 270 performs an FFT algorithm to produce N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path that is analogous to transmitting in the downlink to UEs 111-116 and may implement a receive path that is analogous to receiving in the uplink from UEs 111-116. Similarly, each of UEs 111-116 may implement a transmit path corresponding to the architecture for transmitting in the uplink to eNBs 101-103 and may implement a receive path corresponding to the architecture for receiving in the downlink from eNBs 101-103.

In some embodiments, an eNB can have one or multiple cells, and each cell can have one or multiple antenna arrays. Also, each array within a cell can have a different frame structure, such as different uplink and downlink ratios in a time division duplex (TDD) system. Multiple TX/RX (transmitting/receiving) chains can be applied in one array or in one cell. One or multiple antenna arrays in a cell can have the same downlink control channel (such as synchronization channel, physical broadcast channel, and the like) transmission, while other channels (such as data channels) can be transmitted in the frame structure specific to each antenna array.

Although FIGS. 2A and 2B illustrate examples of OFDMA transmit and receive paths, various changes may be made to FIGS. 2A and 2B. For example, various components in FIGS. 2A and 2B could be combined, further subdivided, or omitted and additional components could be added according to particular needs.

Figure 3:
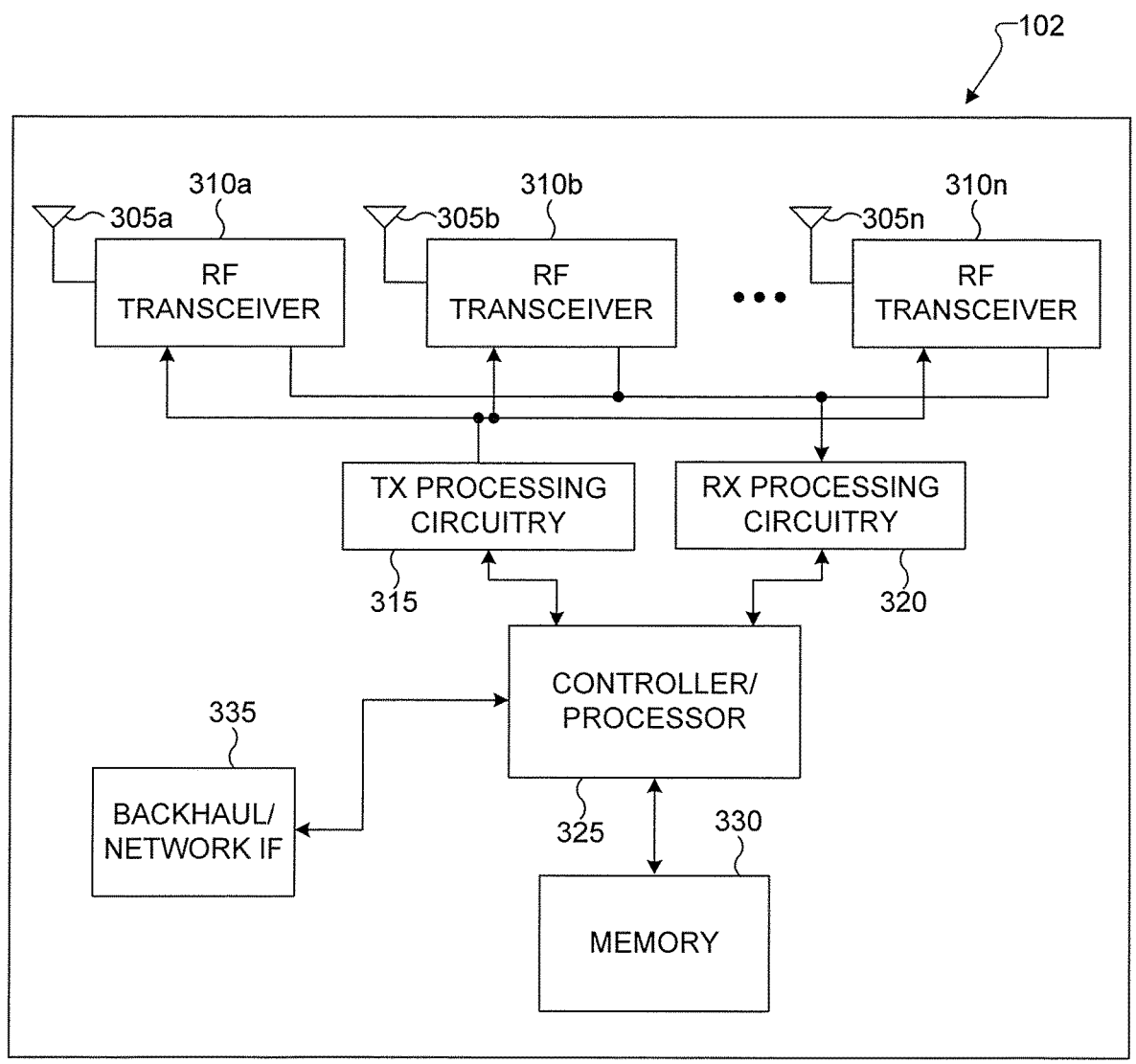
FIG. 3 illustrates an example base station (BS) according to this disclosure.

FIG. 3 illustrates an example BS 102 according to this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 3 does not limit the scope of this disclosure to any particular implementation of a BS.

As shown in FIG. 3, the BS 102 includes multiple antennas 305a-305n, multiple RF transceivers 310a-310n, transmit (TX) processing circuitry 315, and receive (RX) processing circuitry 320. The BS 102 also includes a controller/processor 325, a memory 330, and a backhaul or network interface 335.

The RF transceivers 310a-310n receive, from the antennas 305a-305n, incoming RF signals, such as signals transmitted by MSs in the network 100. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the BS 102. For example, the controller/processor 325 could control the reception of forward channel signals and the transmission of reverse channel signals by the RF transceivers 310a-310n, the RX processing circuitry 320, and the TX processing circuitry 215 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the BS 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 235. The backhaul or network interface 335 allows the BS 102 to communicate with other devices or systems over a backhaul connection or over a network. The interface 335 could support communications over any suitable wired or wireless connection(s). For example, when the BS 102 is implemented as part of a cellular communication system (such as one supporting 5G, LTE, or LTE-A), the interface 335 could allow the BS 102 to communicate with other BS over a wired or wireless backhaul connection. When the BS 102 is implemented as an access point, the interface 335 could allow the BS 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

Although FIG. 3 illustrates one example of BS 102, various changes may be made to FIG. 3. For example, the BS 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the BS 102 could include multiple instances of each (such as one per RF transceiver). Also, various components in FIG. 3 could be combined, further subdivided, or omitted and additional components could be added according to particular needs.

Figure 4:
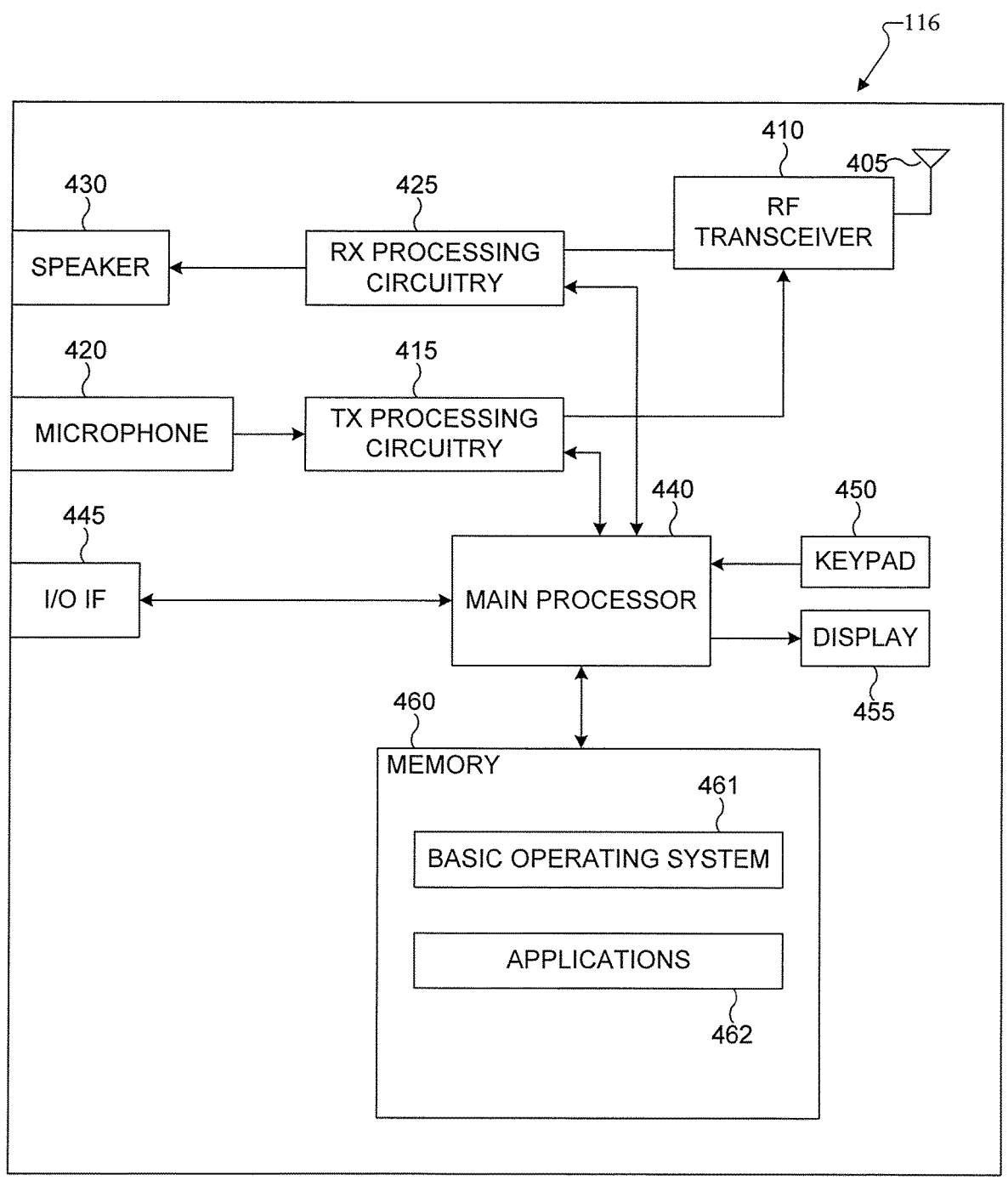
FIG. 4 illustrates an example mobile station (MS) according to this disclosure.

FIG. 4 illustrates an example MS 116 according to this disclosure. The embodiment of the MS 116 illustrated in FIG. 4 is for illustration only, and the MSs 111-115 of FIG. 1 could have the same or similar configuration. However, MSs come in a wide variety of configurations, and FIG. 4 does not limit the scope of this disclosure to any particular implementation of a MS.

As shown in FIG. 4, the MS 116 includes an antenna 405, a radio frequency (RF) transceiver 410, transmit (TX) processing circuitry 415, a microphone 420, and receive (RX) processing circuitry 425. The MS 116 also includes a speaker 430, a main processor 440, an input/output (I/O) interface (IF) 445, a keypad 450, a display 455, and a memory 460. The memory 460 includes a basic operating system (OS) program 461 and one or more applications 462.

The RF transceiver 410 receives, from the antenna 405, an incoming RF signal transmitted by a BS of the network 100. The RF transceiver 410 down-converts the incoming RF signal to generate an intermediate frequency (IF) or baseband signal. The IF or baseband signal is sent to the RX processing circuitry 425, which generates a processed baseband signal by filtering, decoding, and/or digitizing the baseband or IF signal. The RX processing circuitry 425 transmits the processed baseband signal to the speaker 430 (such as for voice data) or to the main processor 440 for further processing (such as for web browsing data).

The TX processing circuitry 415 receives analog or digital voice data from the microphone 420 or other outgoing baseband data (such as web data, e-mail, or interactive video game data) from the main processor 440. The TX processing circuitry 415 encodes, multiplexes, and/or digitizes the outgoing baseband data to generate a processed baseband or IF signal. The RF transceiver 410 receives the outgoing processed baseband or IF signal from the TX processing circuitry 415 and up-converts the baseband or IF signal to an RF signal that is transmitted via the antenna 405.

The main processor 440 can include one or more processors or other processing devices and execute the basic OS program 461 stored in the memory 460 in order to control the overall operation of the MS 116. For example, the main processor 440 could control the reception of forward channel signals and the transmission of reverse channel signals by the RF transceiver 410, the RX processing circuitry 425, and the TX processing circuitry 415 in accordance with well-known principles. In some embodiments, the main processor 440 includes at least one microprocessor or microcontroller.

The main processor 440 is also capable of executing other processes and programs resident in the memory 460, such as operations for receiving a sounding configuration message from a BS and transmitting one or more UL-SRSs to a BS. The main processor 440 can move data into or out of the memory 460 as required by an executing process. In some embodiments, the main processor 440 is configured to execute the applications 462 based on the OS program 461 or in response to signals received from BSs or an operator. The main processor 440 is also coupled to the I/O interface 445, which provides the MS 116 with the ability to connect to other devices such as laptop computers and handheld computers. The I/O interface 445 is the communication path between these accessories and the main controller 440.

The main processor 440 is also coupled to the keypad 450 and the display unit 455. The operator of the MS 116 can use the keypad 450 to enter data into the MS 116. The display 455 may be a liquid crystal display or other display capable of rendering text and/or at least limited graphics, such as from web sites. The keypad 450 could also be incorporated into the display 455, such as when the display 455 represents a touchscreen.

The memory 460 is coupled to the main processor 440. Part of the memory 460 could include a random access memory (RAM), and another part of the memory 460 could include a Flash memory or other read-only memory (ROM).

Although FIG. 4 illustrates one example of MS 116, various changes may be made to FIG. 4. For example, various components in FIG. 4 could be combined, further subdivided, or omitted and additional components could be added according to particular needs. As a particular example, the main processor 440 could be divided into multiple processors, such as one or more central processing units (CPUs) and one or more graphics processing units (GPUs). Also, while FIG. 4 illustrates the MS 116 configured as a mobile telephone or smartphone, MSs could be configured to operate as other types of mobile or stationary devices.

DL signals include data signals conveying information content, control signals conveying DL Control Information (DCI), and Reference Signals (RS), which are also known as pilot signals. An eNodeB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNodeB can transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used [3]. A UE can determine the CSI-RS transmission parameters through higher layer signaling from an eNodeB. DMRS is transmitted only in the BW of a respective PDSCH and a UE can use the DMRS to demodulate information in a PDSCH.

Figure 5:
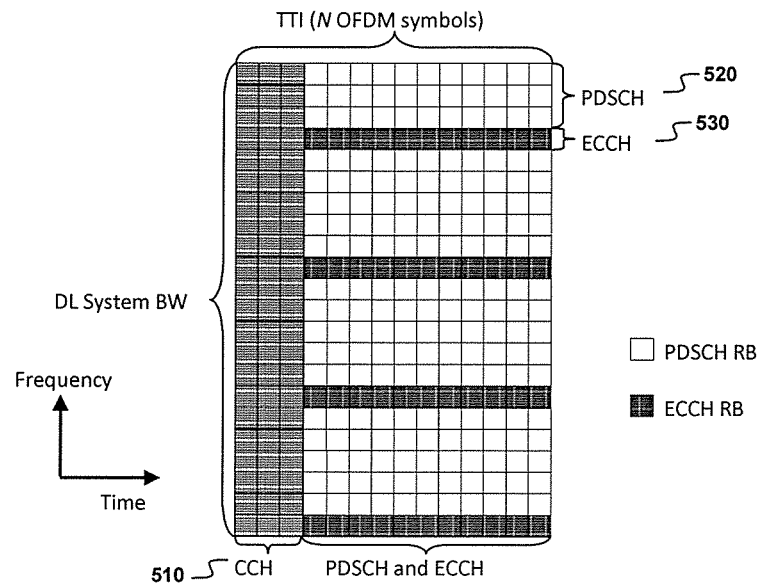
FIG. 5 is a diagram illustrating an example structure of a DL Transmission Time Interval (TTI) according to this disclosure.

FIG. 5 is a diagram illustrating an example structure of a DL Transmission Time Interval (TTI) according to this disclosure. Referring to FIG. 5, DL signaling uses Orthogonal Frequency Division Multiplexing (OFDM) and a DL TTI has a duration of one millisecond (ms) and includes N=14 OFDM symbols in the time domain (or two slots) and K Resource Blocks (RBs) in the frequency domain. A first type of Control CHannels (CCHs) is transmitted in a first $N_1$ OFDM symbols 510 (including no transmission, $N_1$=0). A remaining $N-N_1$ OFDM symbols are used primarily for transmitting PDSCHs 520 and, in some RBs of a TTI, for transmitting a second type of CCHs (ECCHs) 530.

Figure 6:
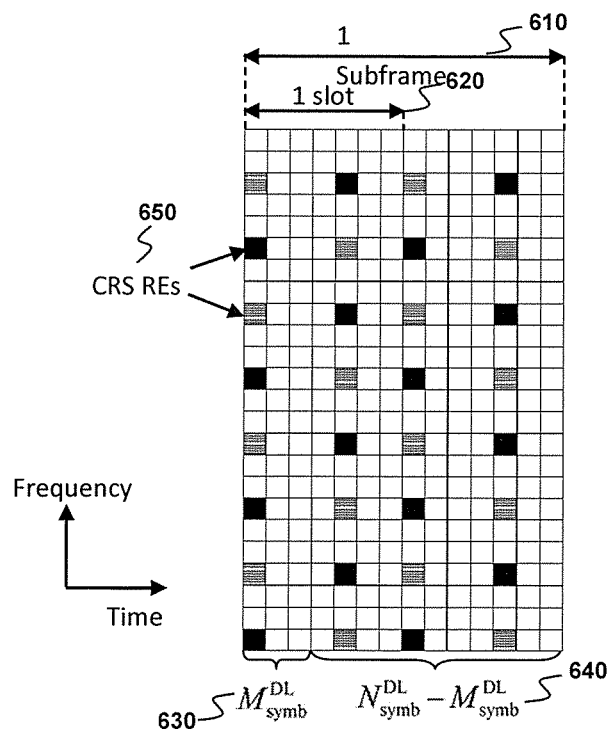
FIG. 6 is a diagram illustrating an example of CRS RE mapping within a subframe according to this disclosure.

FIG. 6 illustrates an example DL SF structure according to this disclosure. The embodiment of the DL SF structure shown in FIG. 6 is for illustration only. Other embodiments could be considered without departing from the scope of the present disclosure.

A DL SF 610 has duration of one millisecond (msec) and includes two slots 620 and a total of $N_{symb}^{DL}$ symbols for transmitting data information, DCI, or RS. The first $M_{symb}^{DL}$ SF symbol can be used to transmit PDCCHs and other control channels (not shown) 630. The remaining $M_{symb}^{DL}$ symbols are primarily used to transmit PDSCHs 640. The transmission bandwidth consists of frequency resource units referred to as resource blocks (RBs). Each RB consists of $N_{sc}^{RB}$ sub-carriers, or resource elements (REs). For example, $N_{sc}^{RB}$=12. A UE 116 is allocated $M_{PDSCH}$ RBs for a total of $M_{PDSCH}$ REs for a PDSCH transmission bandwidth. A unit of 1 RB in frequency and 1 SF in time is referred to as PRB pair. Some REs in some symbols contain CRS 650, CSI-RS, or DMRS.

The SF symbols in FIG. 6 have a "normal" cycle prefix (CP) size and there are 14 symbols per SF. For operation in large cells, the SF symbols can have an "extended" CP size and then there are 12 symbols per SF (see also [1]).

To assist cell search and synchronization, DL signals also include synchronization signals such as a Primary Synchronization Signal (PSS) and a Secondary Synchronization Signal (SSS). Although having a same structure, the time-domain positions of synchronization signals within a frame that includes ten subframes can differ depending on whether a cell is operating in Frequency Division Duplex (FDD) or Time Division Duplex (TDD). Therefore, after acquiring the synchronization signals, a UE can determine whether a cell operates in FDD or in TDD and a subframe index within a frame. The PSS and SSS occupy the central 72 sub-carriers, also referred to as Resource Elements (REs), of an operating bandwidth. Additionally, the PSS and SSS can inform of a Physical Cell IDentifier (PCID) for a cell and therefore, after acquiring the PSS and SSS, a UE can know the PCID of the transmitting cell.

Figure 7:
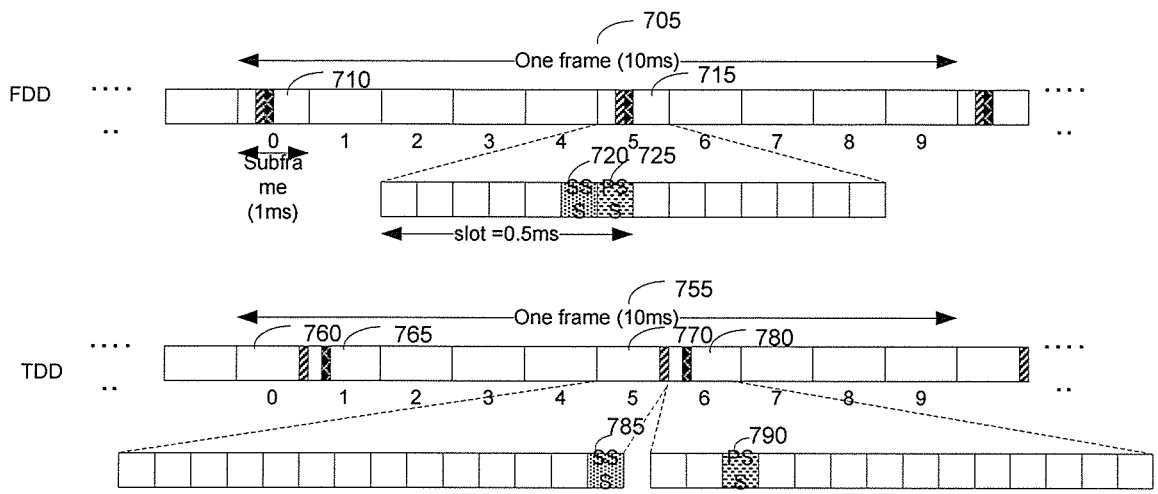
FIG. 7 illustrates example time domain positions for PSS/SSS for FDD and TDD according to this disclosure.

FIG. 7 illustrates example time domain positions for PSS/SSS for FDD and TDD according to this disclosure. Referring to FIG. 7, in case of FDD, in every frame 705, a PSS 725 is transmitted within a last symbol of a first slot of subframes 0 and 5 (710 and 715), wherein a subframe includes two slots. A SSS 720 is transmitted within a second last symbol of a same slot. In case of TDD, in every frame 755, a PSS 790 is transmitted within a third symbol of subframes 1 and 6 (765 and 780), while a SSS 785 is transmitted in a last symbol of subframes 0 and 5 (760 and 770). The difference allows for the detection of the duplex scheme on a cell. The resource elements for PSS and SSS are not available for transmission of any other type of DL signals.

The Federal Communications Commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical (ISM) carriers and the Unlicensed National Information infrastructure (UNII) carriers that can be used by IEEE 802.11 devices. It may be possible to deploy LTE radio access technology (RAT) on an unlicensed frequency spectrum, which can also be called LTE-Unlicensed or LTE-U or Licensed Assisted Access (LAA). A possible deployment scenario for LAA is to deploy an LAA carrier as a part of carrier aggregation, where an LAA carrier is aggregated with another carrier on a licensed spectrum, as illustrated in FIG. 8.

Figure 8:
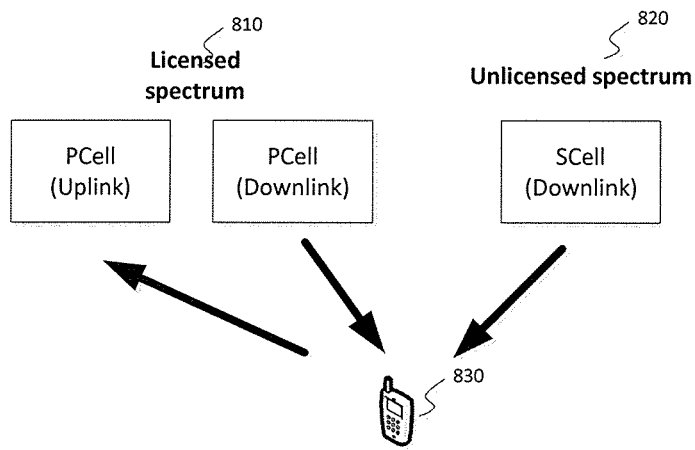
FIG. 8 is a diagram illustrating an example of carrier aggregation of a carrier on licensed spectrum and a carrier on an unlicensed spectrum according to this disclosure.

FIG. 8 is a diagram illustrating an example of carrier aggregation of a carrier on licensed spectrum 810 and a carrier on an unlicensed spectrum 820 according to this disclosure. In a typical arrangement, the carrier on the licensed spectrum 710 is assigned as the Primary Cell (PCell) and the carrier on the unlicensed spectrum 720 is assigned as the Secondary Cell (SCell) for a UE 830. FIG. 8 illustrates an example where the LAA cell comprises of a downlink carrier without an uplink carrier.

Since there may be other RATs operating on the same unlicensed spectrum as the LAA carrier, there is a need to enable co-existence of other RATs with LAA on an unlicensed frequency spectrum. Carrier Sense Multiple Access (CSMA) can be applied, for example before a UE or a NodeB transmits, it monitors a channel for a predetermined time period to determine whether there is an ongoing transmission in the channel. If no other transmission is sensed in the channel, the UE or the NodeB can transmit; otherwise, the UL, or the NodeB postpones transmission.

Figure 9:
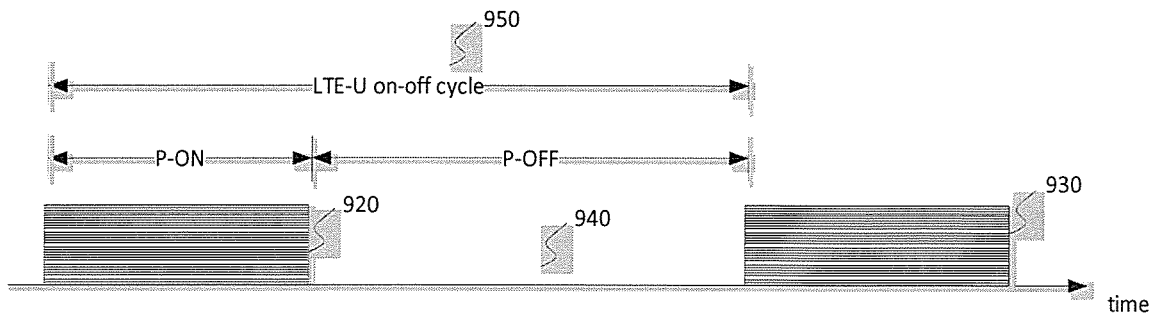
FIG. 9 illustrates an example of a transmission patter of an LAA downlink carrier according to this disclosure.

FIG. 9 illustrates an example of a transmission patter of an LAA downlink carrier according to this disclosure. Referring to FIG. 9, of the LTE-U on-off cycle 950, the LAA carrier is ON (920 & 930) for a period P-ON and is OFF 940 for a period P-OFF. When the LAA carrier is ON, LTE signals are transmitted including at least one of PSS, SSS, CRS, DMRS, PDSCH, PDCCH, EPDCCH and CSI-RS; whereas when the LAA carrier if OFF, it does not transmit any signals. The ON period (such as maximum channel occupancy time) can have a maximum duration as defined by regulation, such as 10 ms (according to European regulation, ETSI EN 301893 V1.7.1). The length for P-ON can be adjusted or adapted by the scheduler of the LAA according to the buffer status or traffic pattern at the LAA carrier and a co-existence metric requirement or target. WiFi APs or other RAT transmitters may utilize the P-OFF period for transmissions since it is free from LAA interference.

If a listen-before-talk (LBT) protocol is applied, there can be an idle period after the end of channel occupancy, where such as for a frame-based equipment, a minimum idle period (such as 5%) of the channel occupancy time can be specified (according to European regulation, ETSI EN 301893 V1.7.1 [7]). The idle period can include a Clear Channel Assessment (CCA) period towards the end of the idle period, where carrier sensing is performed by the UE.

The LBT protocol can also be defined for load-based equipment [7]. For example, before a transmission or a burst of transmissions on an Operating Channel, the equipment performs a Clear Channel Assessment (CCA) check using "energy detect." The equipment observes the Operating Channel(s) for the duration of the CCA observation time which shall not be less than 20 µs. The Operating Channel is considered occupied if the energy level in the channel exceeds a threshold which can be proportional to the maximum transmit power (PH) of the transmitter. If the equipment finds the channel to be clear, it may transmit immediately.

If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range of 1 to q every time an Extended CCA is required. The N value is stored in a counter. The value of q can be selected in the range of 4 to 32. The counter is decremented every time a CCA slot is considered to be "unoccupied". When the counter reaches zero, the equipment may transmit.

The total time that an equipment makes use of an Operating Channel is the Maximum Channel Occupancy Time which shall be less than $(13/32) \times q$ ms, after which the device shall perform the Extended CCA as discussed herein.

The equipment, upon correct reception of a packet which was intended for this equipment, can skip CCA and immediately proceed with the transmission of management and control frames (such as ACK and Block ACK frames). A consecutive sequence of transmissions by the equipment, without it performing a new CCA, shall not exceed the Maximum Channel Occupancy Time as defined herein.

The energy detection threshold for the CCA is proportional to the maximum transmit power (PH) of the transmitter. For example, for a 23 dBm equivalent isotropically radiated power (EIRP) transmitter, the CCA threshold level (TL) shall be equal to or less than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm EIRP).

Discovery Reference Signals (DRS) or Discovery Signals (DS) can be transmitted by an LTE cell on an unlicensed spectrum. DRS comprises of physical signals such as primary synchronization signal (PSS), second synchronization signal (SSS), common reference signal (CRS), and channel state information reference signal (CSI-RS), if configured. The purposes or functions of DRS for an LTE cell on an unlicensed spectrum include, but may not be limited to, discovery of the LTE cell, synchronization to the LTE cell, radio resource management (RRM) and channel state information (CSI) measurements of the LTE cell.

A DRS transmission instance by a cell is sometimes referred to in the following as a DRS occasion of the cell. The duration of a DRS occasion can be either fixed or configurable (such as by radio resource control (RRC)) by the network. The duration (in unit of ms or subframes) can be 1, 2, 3, 4 or 5. The possible DRS occasion duration can also depend on the duplexing mode (such as for FDD), the duration can be 1 to 5 and for TDD, the duration can be 2 to 5. The physical signals and their corresponding resource element (RE) mappings for a DRS occasion of 1 ms duration for FDD and 2 ms duration for TDD are illustrated in FIGS. 10A and 10B.

Figure 10A:
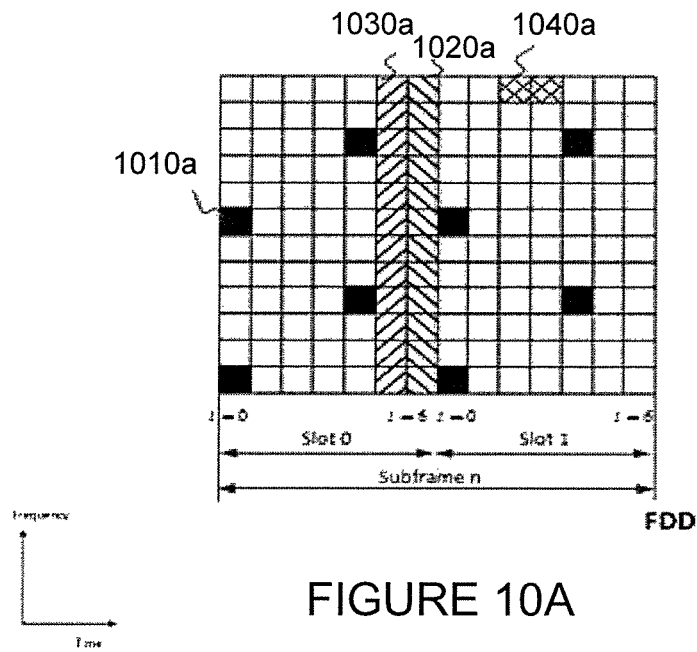
FIGS. 10A and 10B illustrate example DRS occasions according to this disclosure.
Figure 10B:
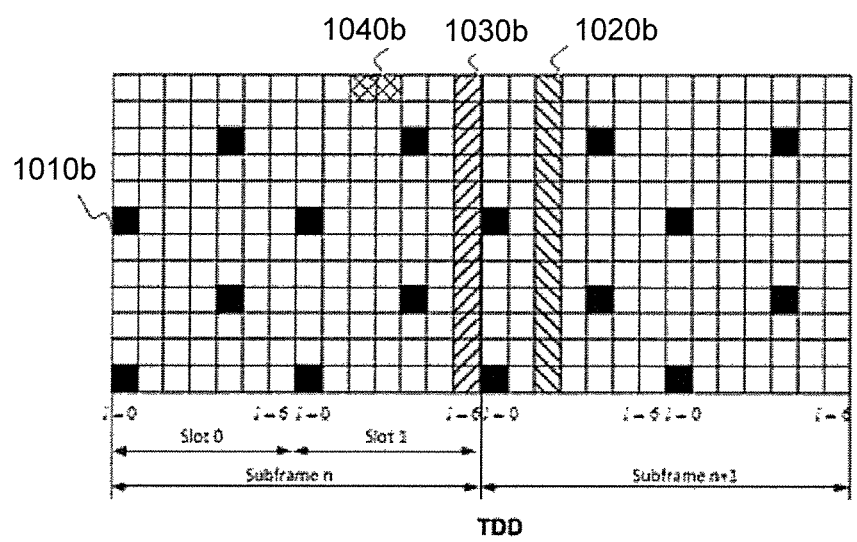

FIGS. 10A and 10B illustrate example DRS occasions according to this disclosure. FIG. 10A illustrates an example DRS occasion of 1 ms for FDD and FIG. 10B illustrates an example DRS occasion of 2 ms for TDD. Referring to FIGS. 10A and 10B, a DRS occasion can include CRS (1010*a*, 1010*b*) (such as antenna port 0 [1]), PSS (1020*a*, 1020*b*), SSS (1030*a*, 1030*b*) and CSI-RS (1040*a*, 940*b*). The CSI-RS may only be present in a DRS occasion if the CSI-RS is configured. The location of the CSI-RS REs can be in any location allowed by the LTE Rel-10/11 specifications (see [1] and [3]) or can be a new location designed for operation in an unlicensed carrier. Multiple CSI-RS resources can also be transmitted within the same DRS occasion and can be over multiple subframes. The second subframe of the DRS occasion for TDD can be a special subframe, in which case, CRS is only present in the downlink pilot time slot (DwPTS) region of the subframe.

Figure 11A:
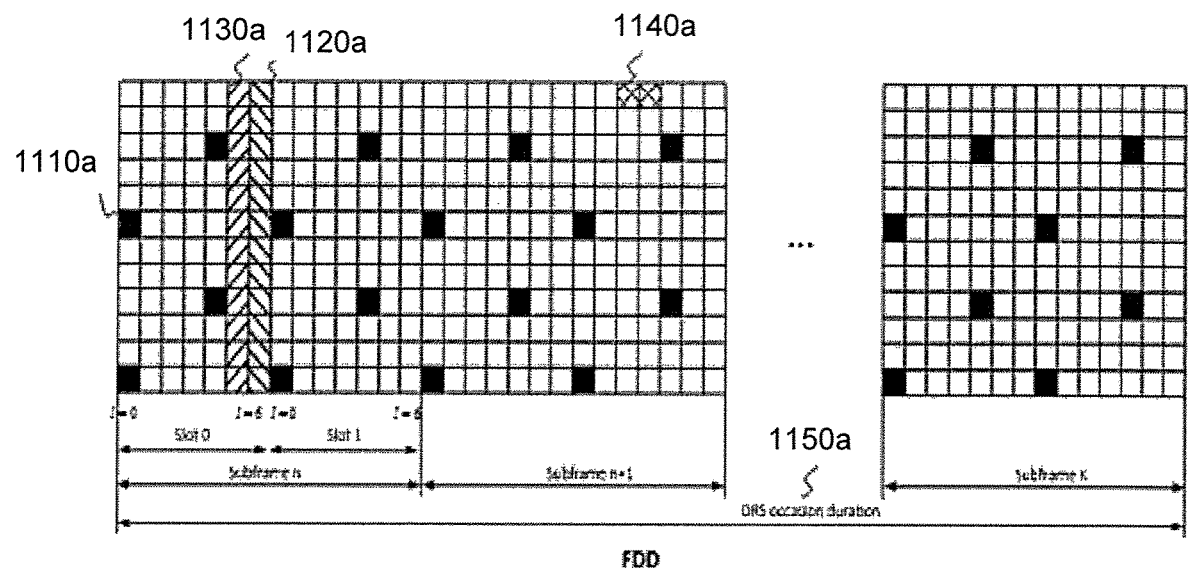
FIGS. 11A and 11B illustrate examples of DRS occasions with a duration of K ms for FDD and for TDD according to this disclosure.
Figure 11B:
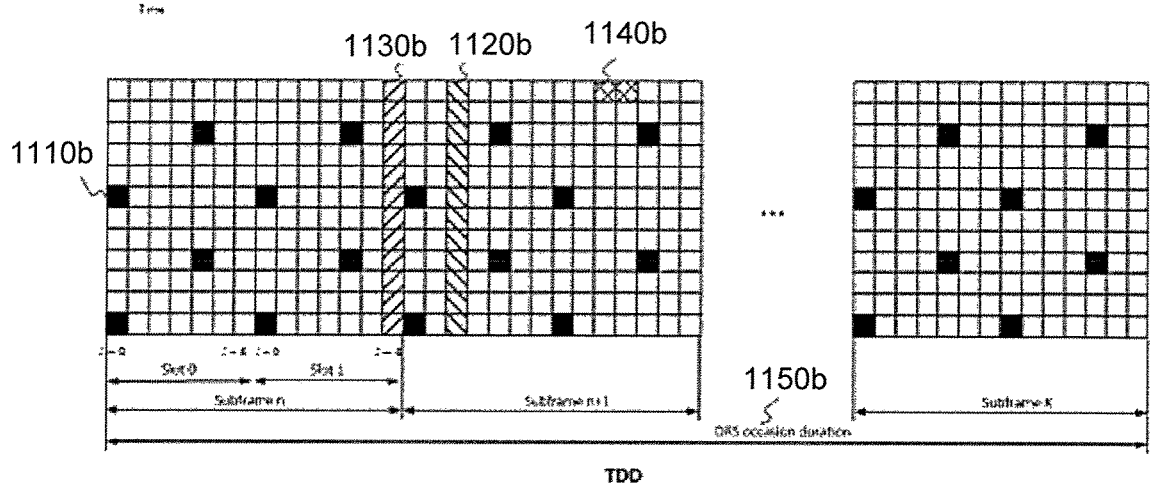

FIGS. 11A and 11B illustrate examples of DRS occasions with a duration of K ms (such as K≤5) for FDD and for TDD according to this disclosure. Referring to FIGS. 11A and 11B, CRS (1110*a*, 1110*b*) (such as antenna port 0) can be transmitted in all DL subframes and in the DwPTS of special subframes. PSS (1120*a*, 1120*b*) and SSS (1130*a*, 1130*b*) are transmitted once over the DRS occasion duration and their locations within the DRS occasion can be fixed or configurable by the network. In an example of fixed PSS and SSS locations, the PSS and the SSS can be transmitted in the first subframe of the DRS occasion for FDD, whereas for TDD, the SSS and the PSS can be transmitted in the first and the second subframe of the DRS occasion, respectively. The CSI-RS (1140*a*, 1140*b*) may only be present in a DRS occasion if the CSI-RS is configured.

It should be understood that an LAA device can be an eNodeB or a UE operating on an LAA carrier. It should also be understood that the embodiments described herein are not limited to operation on unlicensed spectrum. For example, the embodiments described herein can be implemented on lightly licensed spectrum, licensed shared spectrum, and the like.

A first embodiment is directed to channel occupancy signals. In at least the first embodiment, it is assumed that the LAA cell can start to transmit signals immediately after the last CCA slot according to a certain listen-before-talk protocol or channel access protocol is determined to be idle. An example CCA slot can be 20 µs. Other CCA slot lengths are not precluded.

If the last CCA slot before transmission is determined to be idle by a LAA cell, the LAA cell can proceed to transmit a set of signals which shall be referred to as Channel Occupany Signals (COS). The functions of COS include, but are not limited to, channel occupancy/reservation, Automatic Gain Control (AGC) setting for the UE, LAA cell signal time and/or frequency synchronization (such as by using one or more of PSS, SSS, CRS) by the UE, RRM (using CRS or CSI-RS) and CSI measurement (using CSI-RS) by the UE. The COS consists of a variable length region in time and a fixed length region in time. The length of the variable length region can depend on the remaining duration until the next subframe or slot timing of the LAA cell and it can be different for different transmission instance (because of the different time location of the last idle CCA slot before transmission).

Note that the duration of the variable length region can be zero millisecond if the last idle CCA slot is just before the start of the next subframe. A variable length region can consist of a fractional OFDM symbol or an integer number of OFDM symbols plus a fractional OFDM symbol if a CCA slot is not aligned for the ODFM symbol boundary. The fixed length region of the COS can be 0.5 ms (or 1 slot) or 1 ms (or 1 subframe) or 1.5 ms (or 1.5 subframe) or 2 ms (or 2 subframes) or a fixed number of OFDM symbols (including one OFDM symbol). For a limited number of subframes or slots after the COS transmission, physical signals including one or more of demodulation reference signal (DM-RS), CRS, CSI-RS, positioning reference signal (PRS), and physical channels including one or more of physical downlink control channel (PDCCH), enhanced physical downlink control channel (EPDCCH), physical downlink shared channel (PDSCH), physical multicast channel (PMCH), can be transmitted. The sum of COS duration and the subsequent physical signals and physical channels transmission duration should not exceed the maximum channel occupancy duration FIGS. 12A, 12B, 12C, and 12D illustrate examples of a COS of a first method with a first frame structure type according to this disclosure. Regarding at least this embodiment of the first method, at least CRS is mapped to a set of resource elements belonging to the OFDM symbols which correspond to the variable length region in a subframe. The CRS mapping in the subframe can be according to the legacy CRS mapping method. Other signals, which can be any signals that meet the regulatory requirements, can be mapped to resource elements not mapped for CRS. Such signal may not need to be decoded by the UE and its purpose is to reserve the channel such that other devices operating on the unlicensed channel can sense the channel to be occupied, as well as providing a reference for UE's AGC tuning. We shall refer to such signal as Reservation Signal. Alternatively, CRS is not mapped to the variable length region and any signals that meet the regulatory requirements (such as Reservation Signal) can be transmitted instead. The fixed length region of the COS can be one subframe containing one or more of PSS, SSS, CRS and CSI-RS (such as all of PSS, SSS, CRS and CSI-RS are included, or only CRS and CSI-RS are included), or it can be one OFDM symbol containing the CRS (such a port 0, or port 0 and 1). The resource element mapping can be the same as that defined for frame structure type 1 (FDD) of legacy LTE. When COS contains PSS, SSS, CRS, and possibly CSI-RS, the subframe can also be considered as a DRS (Discovery Reference Signal) or DS (Discovery Signal) subframe or synchronization subframe. For the other resource elements not mapped for PSS, SSS, CRS or CSI-RS, any signals that meet the regulatory requirements can be transmitted. Alternatively, PDCCH, EPDCCH, PDSCH or a new physical channel can be transmitted instead. In yet another alternative, the first one or several OFDM symbols of the COS can contain a first signal such as the Reservation Signal while the rest of the OFDM symbols of the COS can contain a second signal, such as PDCCH, EPDCCH, PDSCH or new physical channels. With reference at least to FIGS. 12A, 12B, 12C, and 12D it is assumed that PSS, SSS, CRS and CSI-RS are included in COS.

Figure 12A:
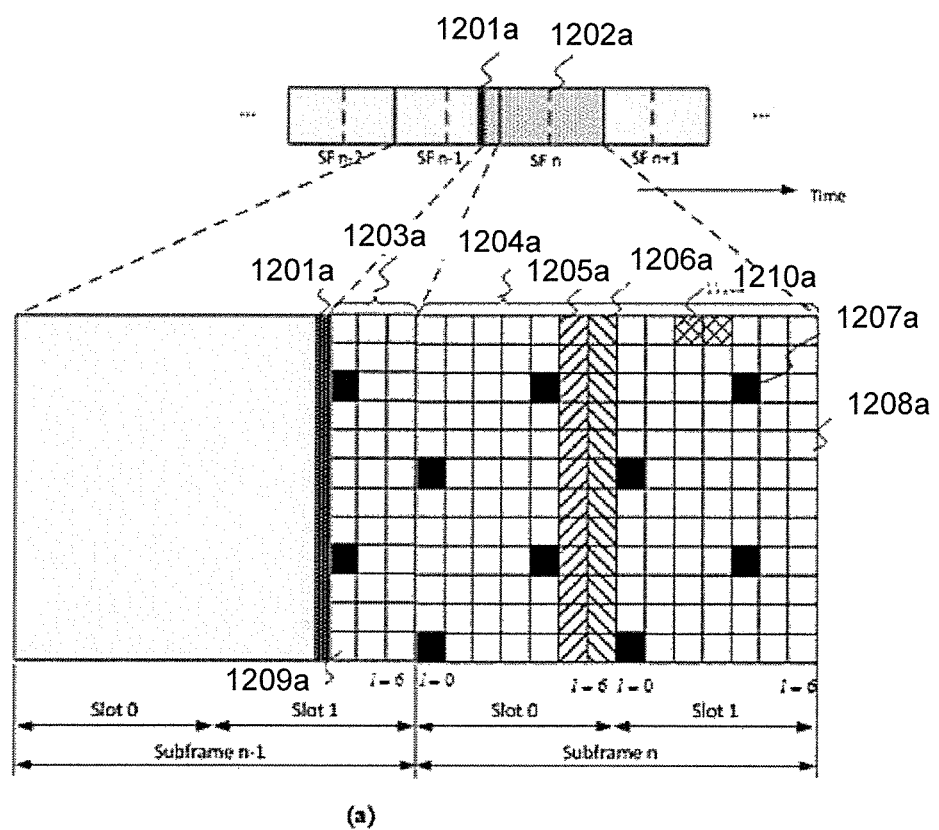
FIGS. 12A, 12B, 12C, and 12D illustrate examples of a COS of a first method with a first frame structure type according to this disclosure.
Figure 12B:
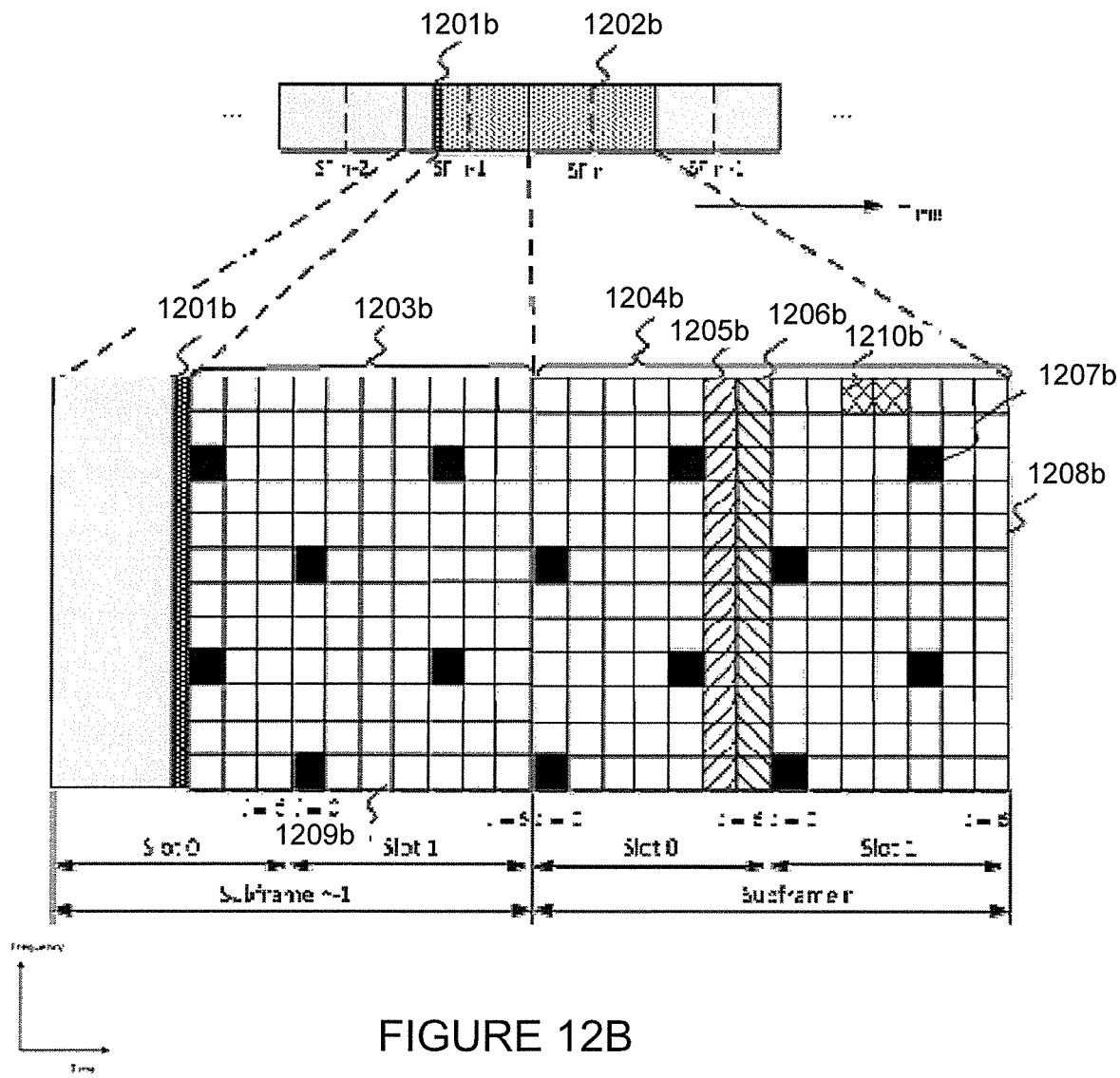

Referring to FIGS. 12A and 12B, after the last idle CCA slot (1201*a*, 1201*b*), a LAA cell can transmit COS (1202*a*, 1202*b*), which consists of a variable length region (1203*a*, 1203*b*) and a fixed length region (1204*a*, 1205*b*) of one subframe. PSS (1206*a*, 1206*b*), SSS (1205*a*, 1205*b*) and CSI-RS (1210*a*, 1210*b*) are mapped in the fixed length region according to frame structure type 1; whereas CRS (1207*a*, 1207*b*) is mapped to both variable and fixed length regions. The resource elements (1209*a*, 1209*b*) not mapped to CRS in the variable length region can be transmitted with Reservation Signal. PDCCH/EPDCCH/PDSCH or a new physical channel can be mapped to the resource elements (1208*a*, 1208*b*) not mapped to PSS, SSS, CRS or CSI-RS in the fixed length region.

FIGS. 12A and 12B illustrate examples of different time locations of the last idle CCA. As shown in FIG. 12A, the last idle CCA slot is located in the second slot of subframe n−1 and the variable length region is less than one slot. As shown in FIG. 12B, the last idle CCA slot is located in the first slot of subframe n and the variable length region is more than one slot but is less than one subframe. The COS may not include the PSS and the SSS (such as if the PSS and the SSS are transmitted in different subframe(s)) in which case, the signals indicated as 1205*a*, 1205*b*, 1206*a*, 1206*b* are not present. In this first example, the maximum duration of the variable length region can be slightly less than one subframe. This enables the LAA cell to occupy the wireless channel as soon as it gets the opportunity.

Figure 12C:
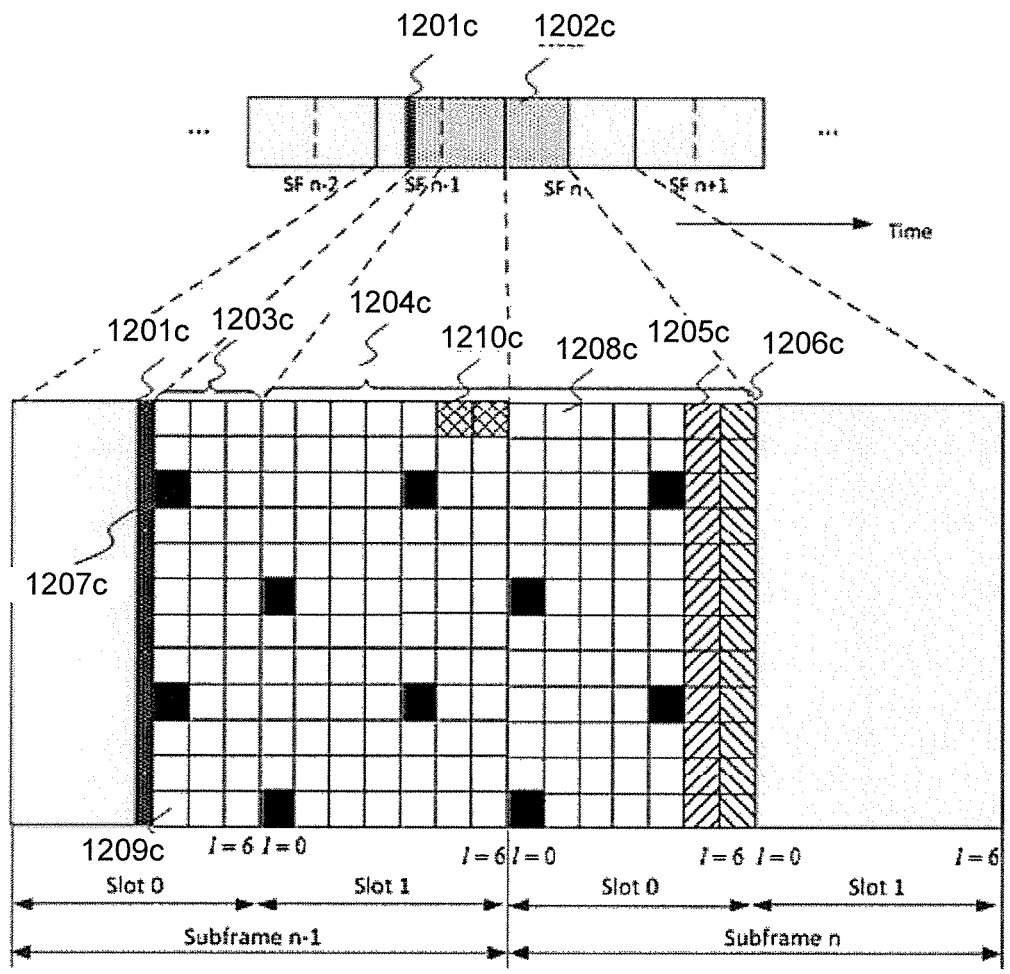
Figure 12D:
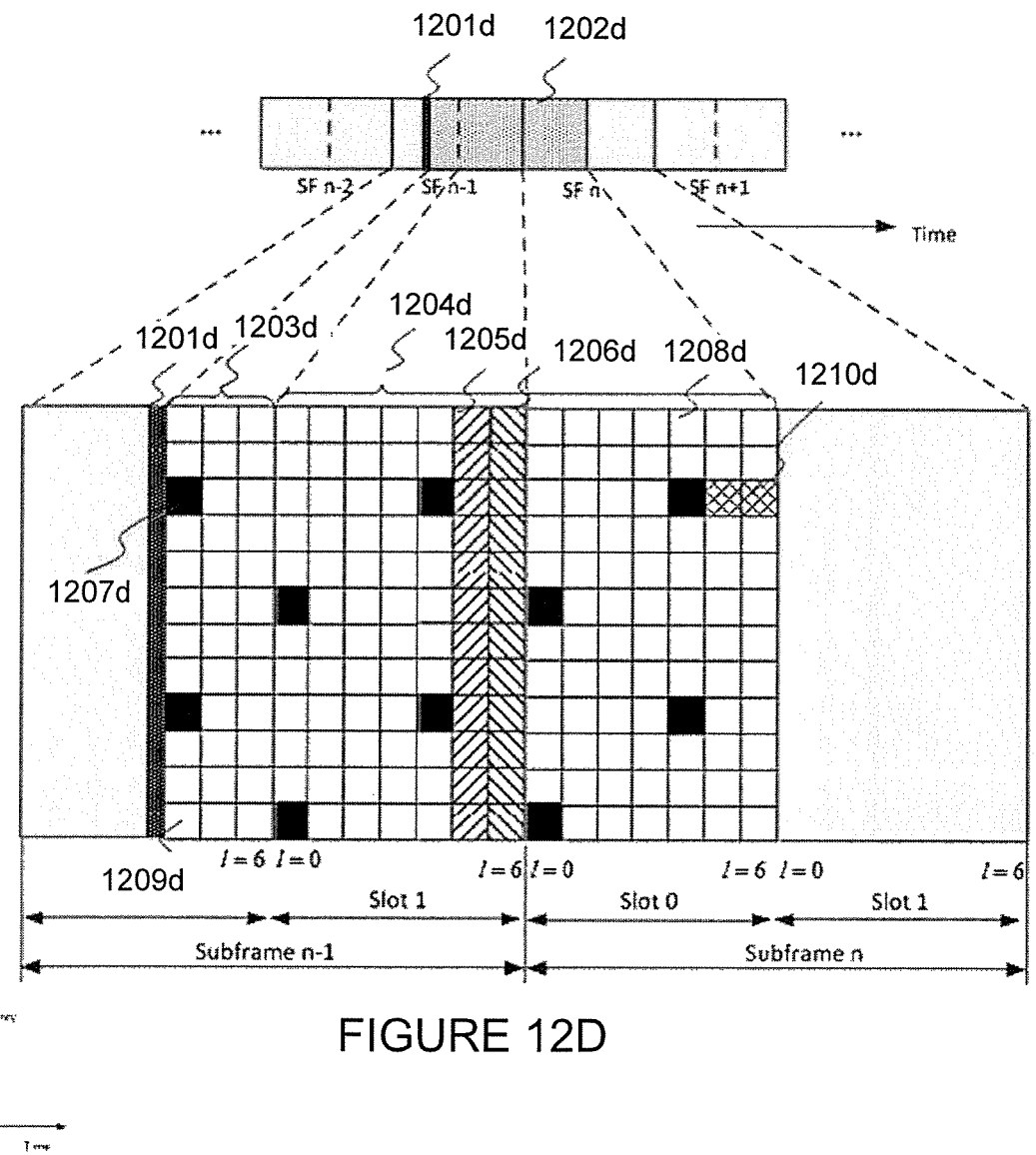

Referring to FIGS. 12C and 12D, in at least a second embodiment of the first method, the maximum duration of the variable length region can be one slot or slightly less than one slot. This can reduce interference introduced by the variable length region of the COS. If the last idle CCA slot occurs in a first slot of a subframe, another CCA can take place in the CCA slot immediately before the start of the next subframe. If the CCA slot is determined to be idle, the LAA cell can transmit, or else the LAA cell can imitate a back-off according to an extended CCA procedure or a back-off procedure. In an embodiment, if the last idle CCA slot occurs in the first slot of subframe n−1, the variable length region starts from after the CCA slot to an end of the first slot of subframe n−1 (1203*c*, 1203*d*). The fixed length region starts from the second slot of subframe n−1 to the end of the first slot of subframe n (1204*c*, 1204*d*). The PSS and the SSS can be in the second slot of subframe n−1 (1205*c*, 1206*c*) or can be in the first slot of subframe n (1205*d*, 1206*d*). CCA slot (1201*c*, 1201*d*) can be the same or similar to CCA slots (1201*a*, 120*b*). COS (1202*c*, 1202*d*) can be the same or similar to COS (1202*a*, 1201*b*). CRS (1207*c*, 1207*d*) can be the same or similar to CRS (1207*a*, 1207*b*). Resource elements (1208*c*, 1208*d*) can be the same or similar to resource elements (1208*a*, 1208*b*). Resource elements (1209*c*, 1209*d*) can be the same or similar to resource elements (1209*a*, 1209*b*). CSI-RS (1210*c*, 1210*d*) can be the same or similar to CSI-RS (1210*a*, 1210*b*).

Figure 13A:
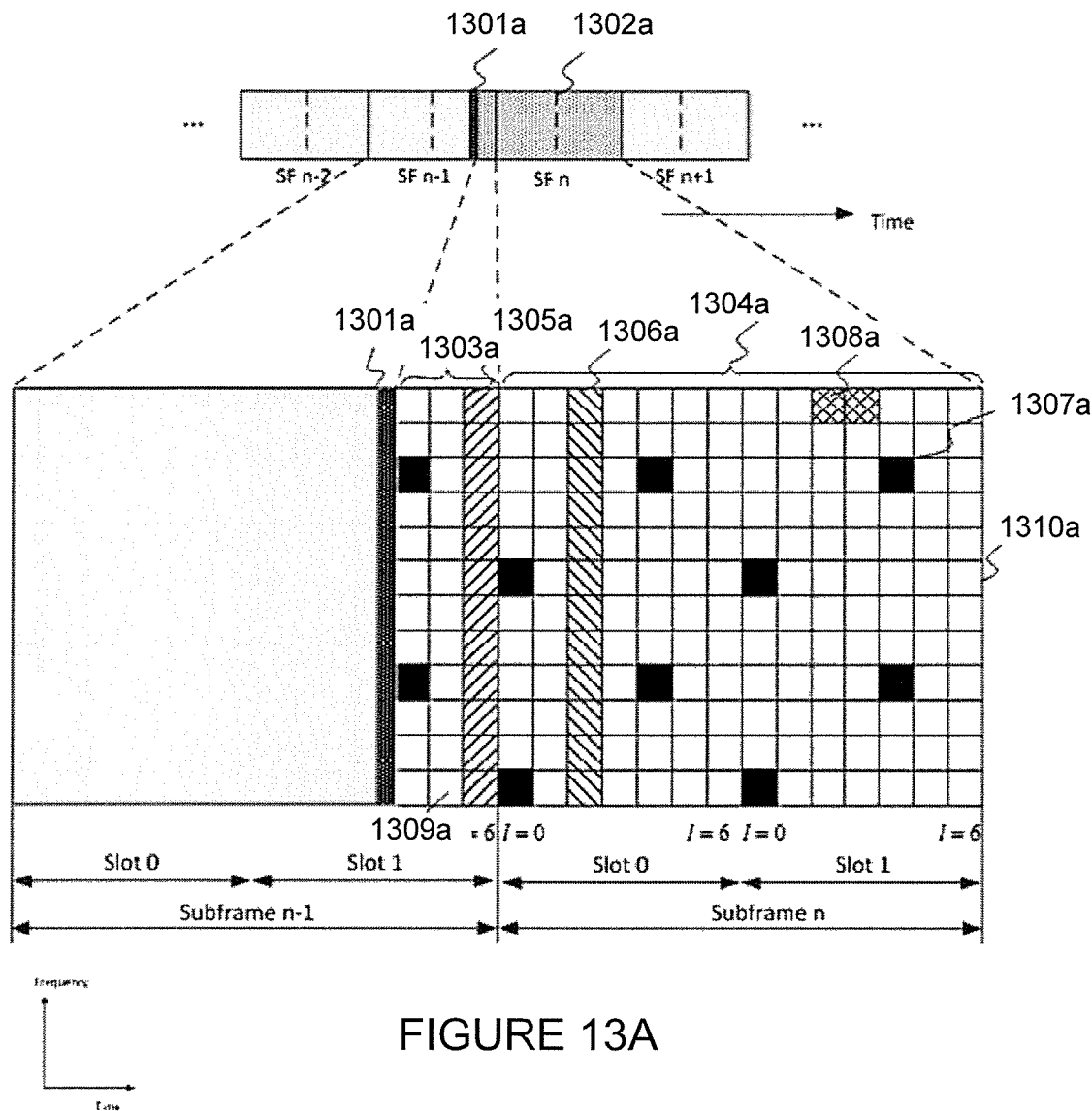
Figure 13B:
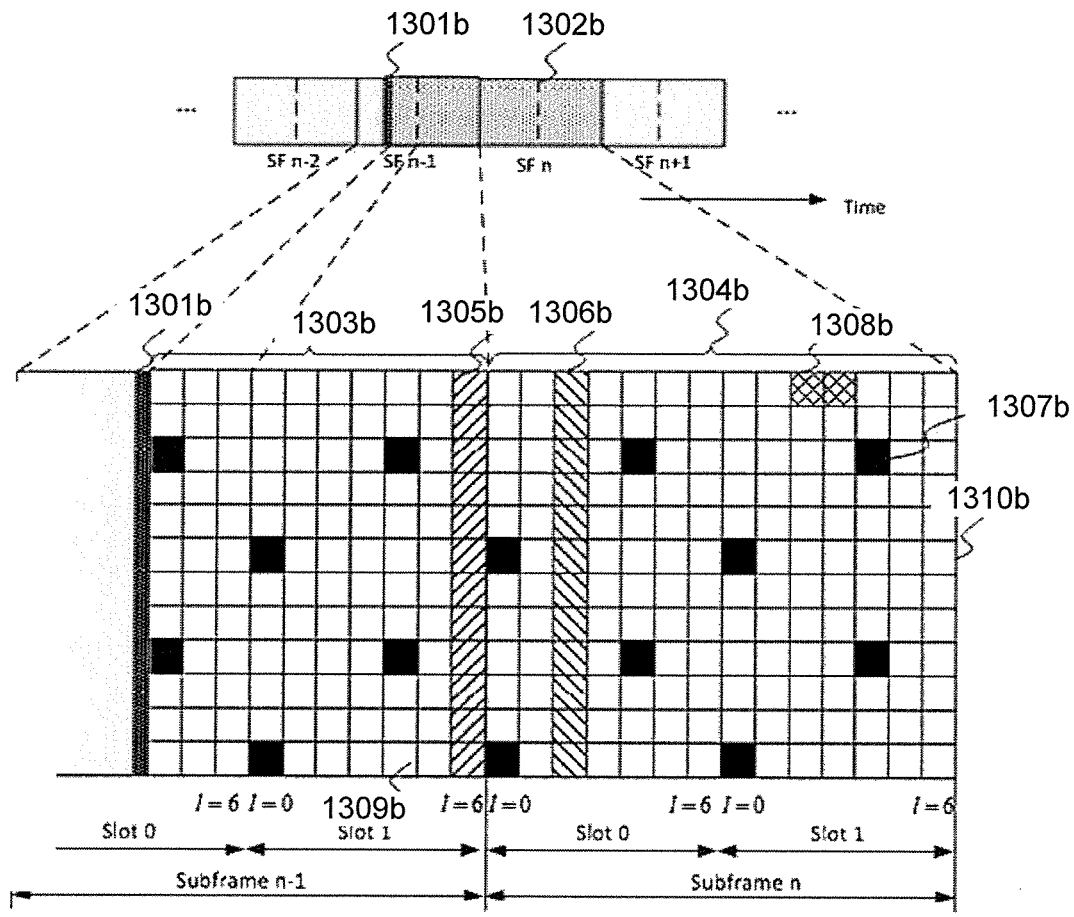

The principles of the first method can be applied to a case where the resource element mapping of PSS, SSS, CRS and CSI-RS to COS is according to a second frame structure type (TDD). FIGS. 13A, 13B, 13C, and 13D illustrate examples of a COS of the first method with a second frame structure type according to this disclosure. Referring to FIGS. 13A and 13B, the fixed length region (1304*a*, 1304*b*) of the COS (1302*a*, 1302*b*) can include one or more of PSS (1306*a*, 1306*b*), CRS (1307*a*, 1307*b*) and CSI-RS (1308*a*, 1308*b*), and the duration can be 1 ms. A variable length region (1303*a*, 1303*b*) of the COS (1302*a*, 1302*b*) can include one or more of SSS (1305*a*, 1305*b*), CRS (1307*a*, 1307*b*) and CSI-RS, and the duration can be up to 1 ms. Resource elements (1309*a*, 1309*b*) not mapped to CRS in the variable length region can be transmitted with Reservation Signal. PDCCH/EPDCCH/PDSCH or a new physical channel can be mapped to the resource elements (1310*a*, 1310*b*) not mapped to PSS, SSS, CRS or CSI-RS in the fixed length region.

Figure 13D:
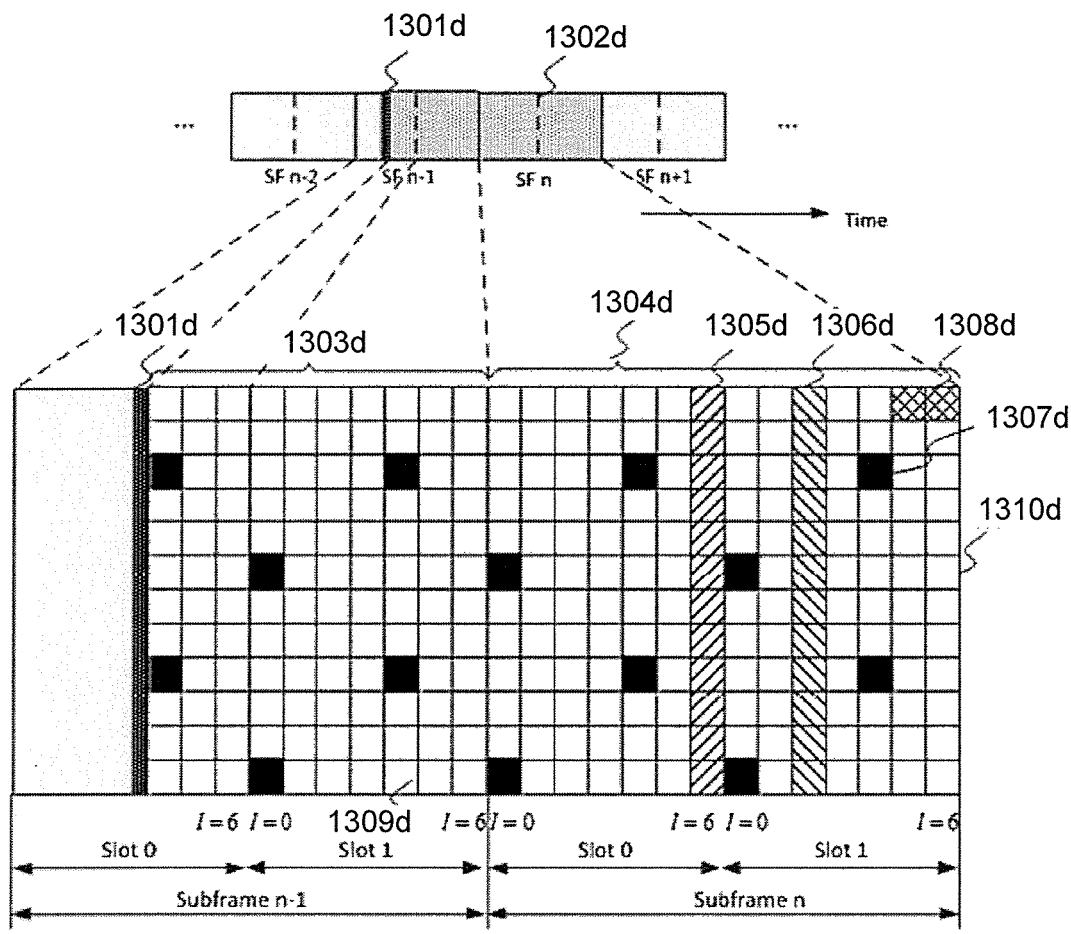

FIGS. 13A and 13B illustrate examples of different time locations of the last idle CCA. In case the variable length region in subframe n−1 is short such that the SSS (1305*a*, 1305*b*), or the SSS and at least one CRS symbol, cannot be transmitted in subframe n−1, then the SSS is transmitted in subframe n and the PSS is transmitted in subframe n+1 instead, such as the COS spans three subframes (subframe n−1, subframe n and subframe n+1). In another alternative, the location of the PSS and the SSS is changed such that the PSS is mapped to the third OFDM symbol of the second slot of the fixed length region and the SSS is mapped to the last OFDM symbol of the first slot of the fixed length region. In yet another alternative, the modification of PSS and SSS location for frame structure type 2 does not depend on the variable length region as shown in FIGS. 13C and 13D. The COS may not include the PSS and the SSS (such as if they are transmitted in different subframe(s)), in which case the signals indicated as 1305*a*, 1305*b*, 1305*c*, 1305*d*, 1306*a*, 1306*b*, 1306*c*, 1306*d* are not present. CCA slot (1301*a*, 1301*b*, 1301*c*, and 1301*d*) can be the same or similar to CCA slots (1201*a*, 1201*b*, 1201*c*, and 1201*d*, respectively). COS (1302*c*, 1302*d*) can be the same or similar to COS (1302*a*, 130*b*). CRS (1307*c*, 1307*d*) can be the same or similar to CRS (1307*a*, 1307*b*). CSI-RS (1308*c*, 1308*d*) can be the same or similar to CSI-RS (1308*a*, 1308*b*). Resource elements (1309*c*, 1309*d*) can be the same or similar to resource elements (1309*a*, 1309*b*). Resource elements (1310*c*, 1310*d*) can be the same or similar to resource elements (1310*a*, 1310*b*).

FIGS. 14A, 14B, 14C, and 14D illustrate examples of a COS of the second method with a first frame structure type according to this disclosure. Regarding the example second method, the fixed length region of COS is defined to be one LTE slot which can include one or more of CRS, PSS, SSS and CSI-RS (such as all of PSS, SSS, CRS and CSI-RS are included, or only CRS and CSI-RS are included). The resource element mapping for the physical signals to the one-slot fixed-length region of the COS can be the same as that of the first slot of a DRS subframe for frame structure type 1 (or equivalently the first slot of subframe 0 for frame structure type 1). As a variation of the second method, depending on the time of the last idle CCA slot, the one-slot fixed length region of COS can be transmitted in either the first slot or the second slot of the LAA subframe.

The variable length region of the COS can be the same as the design described in the first method, except that the maximum duration of the variable length region is one slot or slightly less than one slot and can be transmitted in either the first slot or the second slot of the LAA subframe depending on the time of the last idle CCA slot. For resource elements not mapped for PSS, SSS, CRS, or CSI-RS, any signals that meet the regulatory requirements such as Reservation Signal can be transmitted. Alternatively, PDCCH, EPDCCH, PDSCH or one or more new physical channels can be transmitted instead. In yet another alternative, the first one or several OFDM symbols of the COS can contain a first signal such as the Reservation Signal while the rest of the OFDM symbols of the COS can contain a second signal such as PDCCH, EPDCCH, PDSCH or a new physical channel.

Figure 14A:
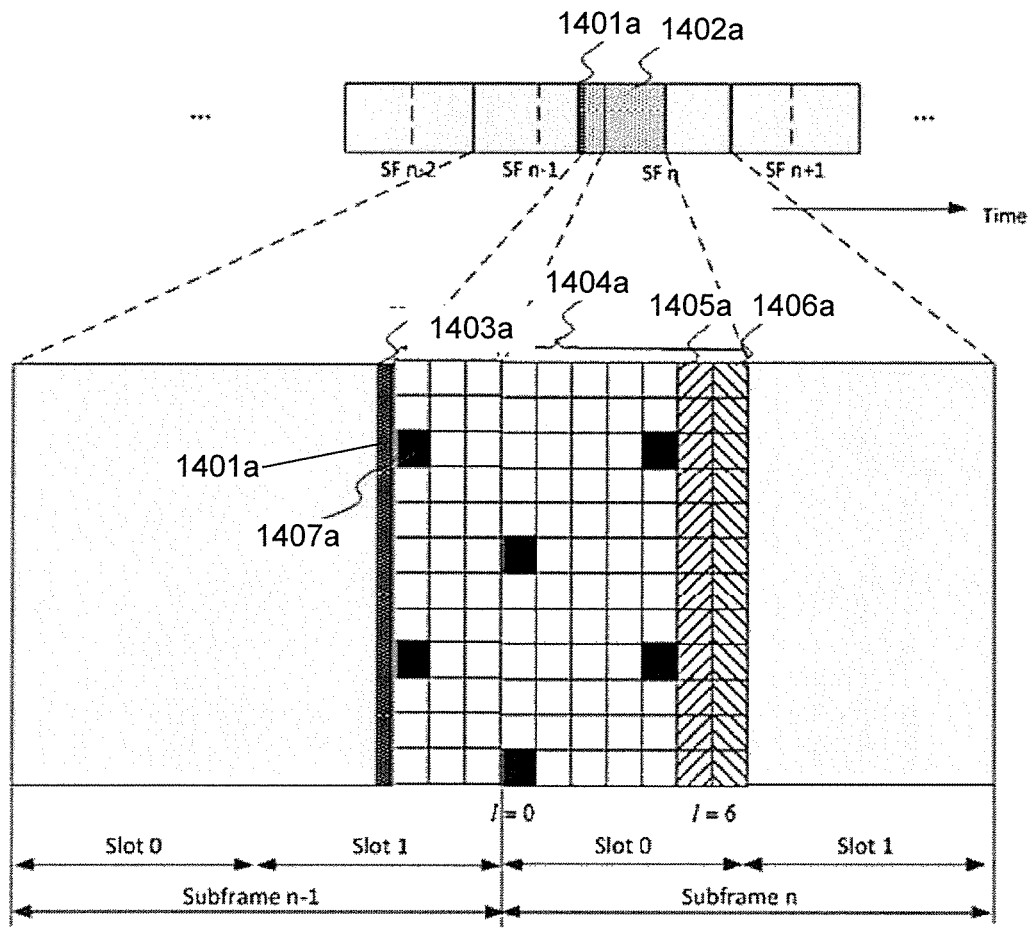
FIGS. 14A, 14B, 14C, and 14D illustrate examples of a COS of a second method with a first frame structure type according to this disclosure.
Figure 14B:
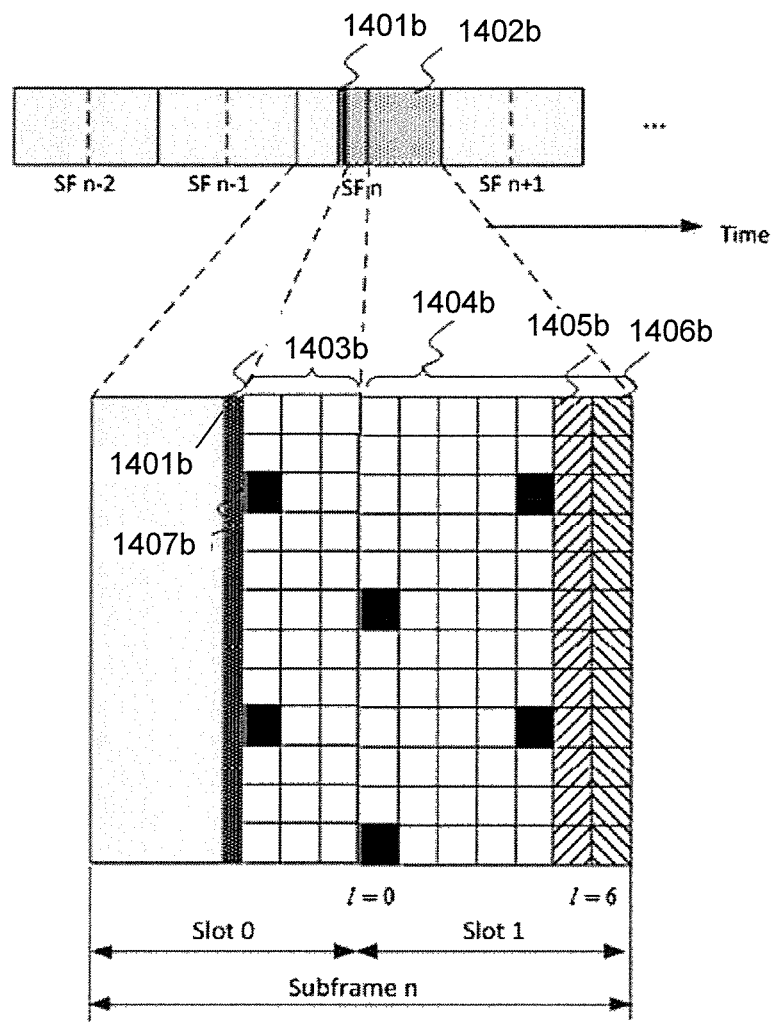
Figure 14C:
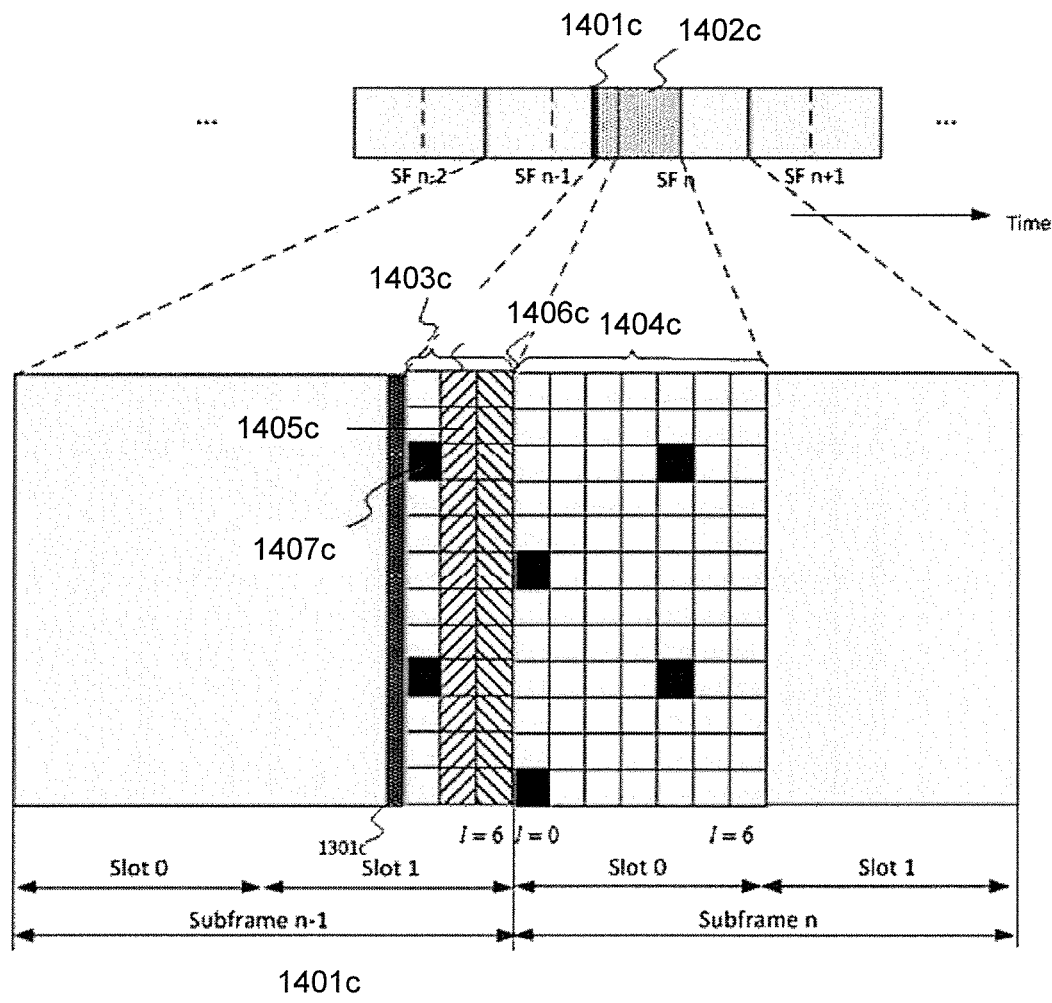
Figure 14D:
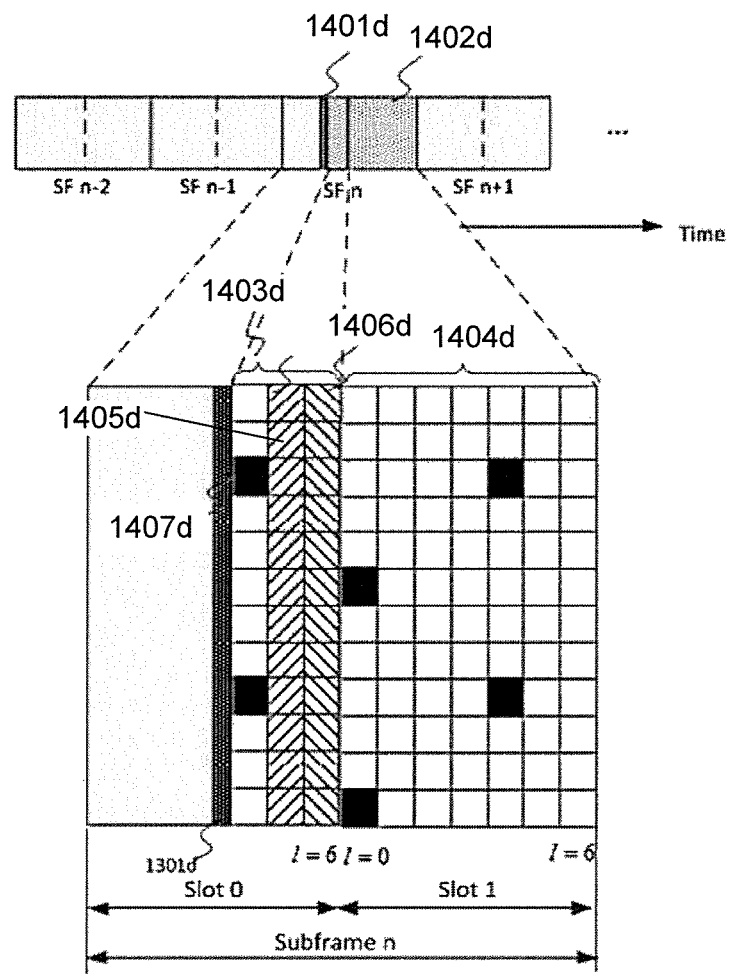

Referring to FIGS. 14A, 14B, 14C, and 14D, if the last idle CCA slot (1401*a*, 1401*c*) takes place in a second slot of a LAA subframe, the one-slot fixed length region (1404*a*, 1404*c*) of COS (1402*a*, 1402*c*) is transmitted in the first slot of the subframe immediately after the subframe of the last idle CCA slot as shown in FIGS. 14A and 14C, respectively. If the last idle CCA slot (1401*b*, 1401*d*) takes place in a first slot of a LAA subframe, the one-slot fixed length region of COS is transmitted in the second slot of the subframe immediately after the subframe of the last idle CCA slot as shown in FIGS. 14B and 14D, respectively. In other words, the location of the PSS and SSS can depend on whether the last idle CCA slot takes place in the first or second slot of the a LAA subframe. The PSS (1406*a*, 1406*b*, 1406*c*, 1406*d*) and SSS (1405*a*, 1405*b*, 1405*c*, 1405*d*) can be located in the fixed length region (1404*a*, 1404*b*) as shown in FIGS. 14A and 14B; or can be located in the variable length region (1403c, 1403d) as shown in FIGS. 14C and 14D. The CRS (1407a, 1407b, 1407c, 1407d) resource element mapping can be the same for all examples. If the PSS and the SSS can be located in the variable length region, further condition can be specified, such as in case the variable length region is short such that the PSS and the SSS cannot be transmitted, then the PSS and the SSS are transmitted in the fixed length region instead. The COS may not include the PSS and the SSS (such as if they are transmitted in different subframe(s)), in which case, the signals indicated as 1405a, 1405b, 1405c, 1405d, 1406a, 1406b, 1406c, 1406d are not present.

Figure 15A:
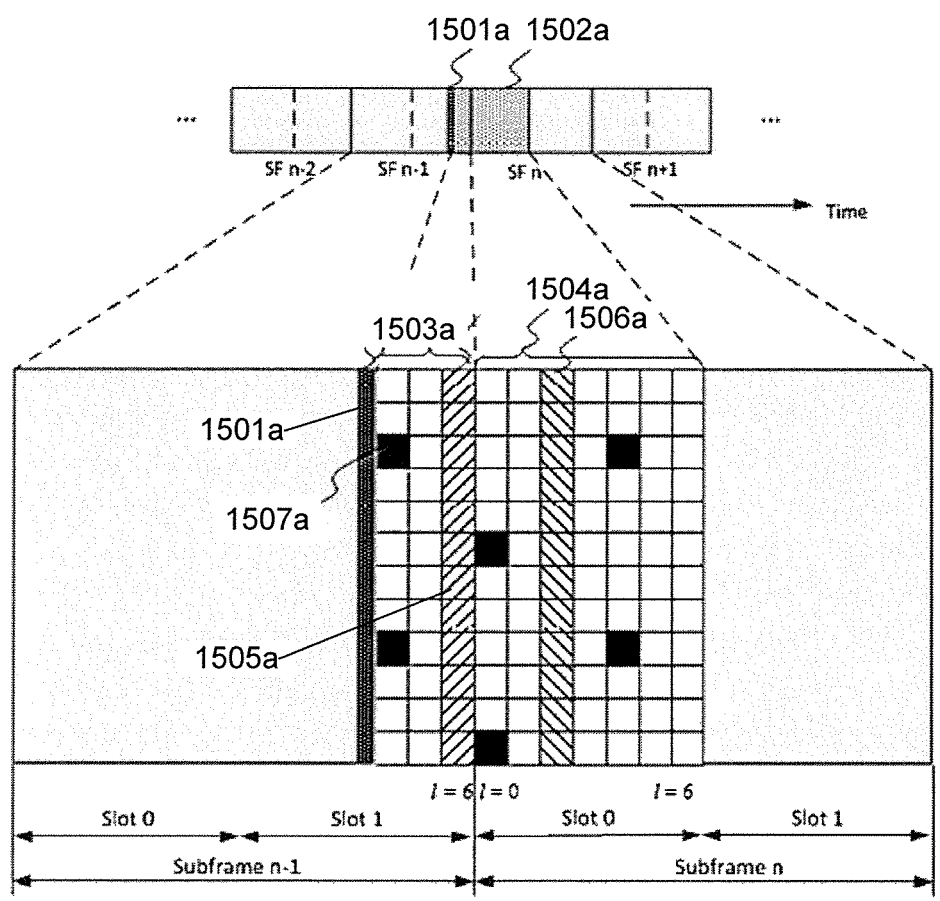
FIGS. 15A and 15B illustrate examples of a COS of the second method with a second frame structure type according to this disclosure.
Figure 15B:
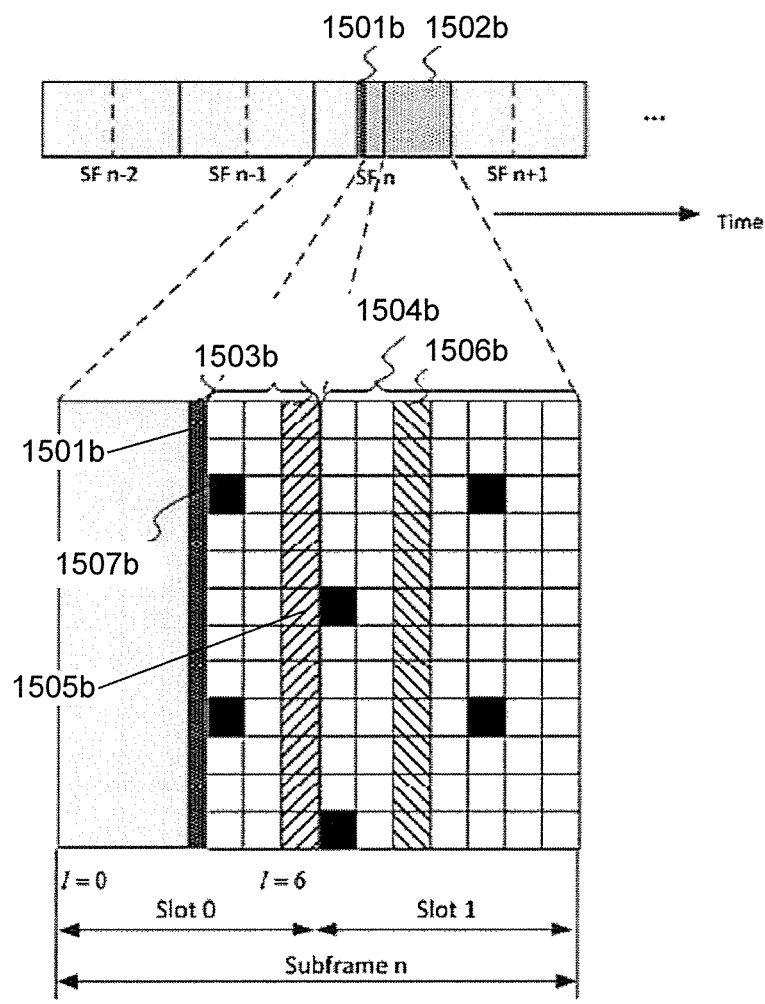

The principles of the second method can be applied to the case where the resource element mapping of PSS, SSS, CRS and CSI-RS to COS is according to the second frame structure type (TDD). FIGS. 15A and 15B illustrate examples of a COS of the second method with a second frame structure type according to this disclosure. Referring to FIGS. 15A and 15B, after the last idle CCA slot (1501a, 1501b), a LAA cell can transmit COS (1502a, 1502b), where the duration of the variable length region (1503a, 1503b) is up to 1 slot and the duration of the fixed length region (1504a, 1504b) is 1 slot. If the CCA slot is located in the second slot of subframe n−1, the SSS 1505a and PSS 1506a is mapped to the second slot of subframe n−1 and the first slot of subframe n, respectively. Otherwise, if the CCA slot is located in the first slot of subframe n, the SSS 1505b and PSS 1506b is mapped to the first slot and the second slot of subframe n, respectively. The COS may not include the PSS and the SSS (such as if they are transmitted in different subframe(s)) in which case, the signals indicated as 1505a, 1505b, 1506a, 1506b are not present.

Figure 16A:
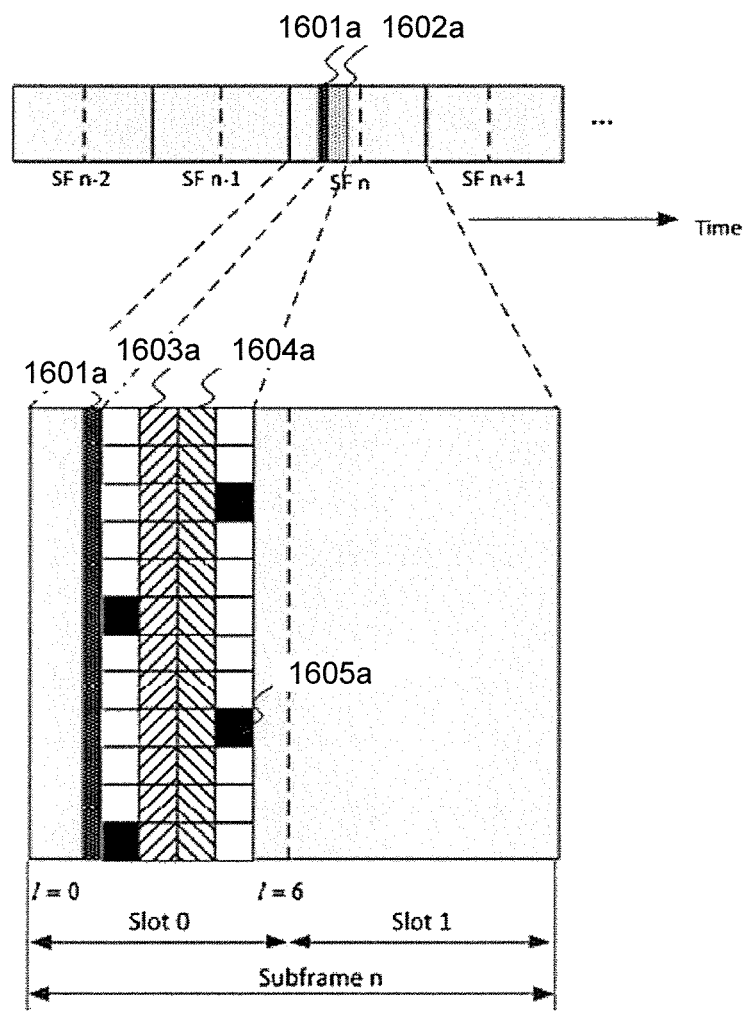
FIGS. 16A, 16B, 16C, 16D, 16E, and 16F illustrate examples of a COS of a third method according to this disclosure.
Figure 16B:
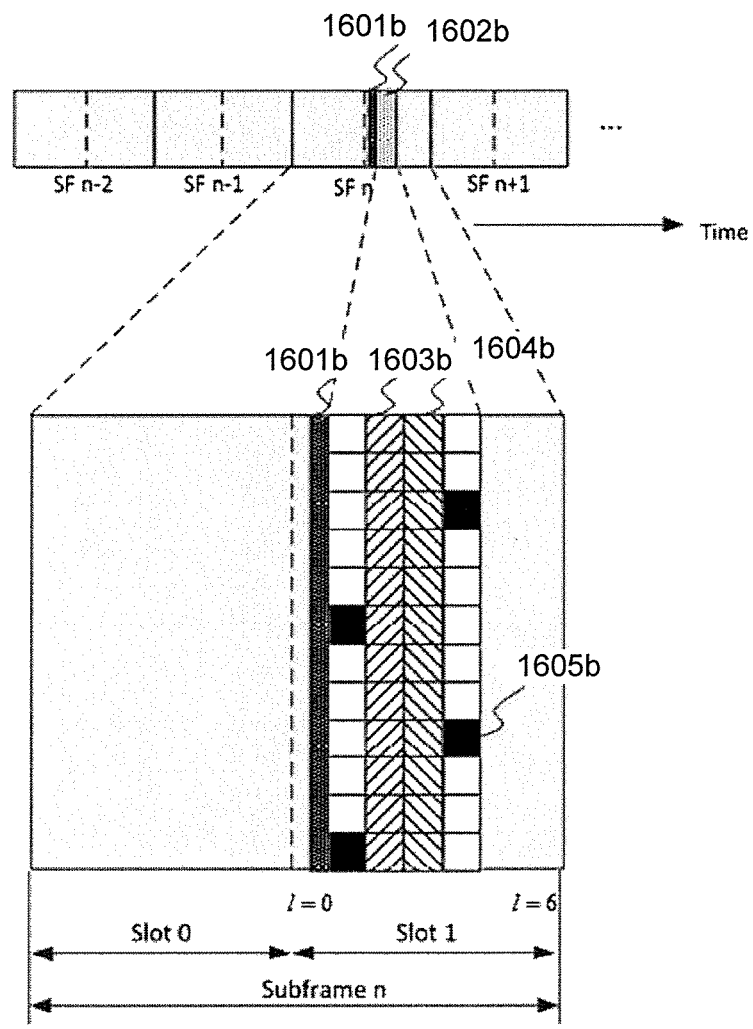

FIGS. 16A, 16B, 16C, and 16D illustrate examples of a COS of a third method according to this disclosure. The physical signals (including one or more of PSS, SSS, CRS) and their resource element mapping in a first set of OFDM symbols of COS immediately after the last idle CCA slot are fixed, regardless of the timing of the CCA lot. FIG. 16A illustrates that the COS is in the first slot while FIG. 16B illustrates that the COS is in the second slot. Other examples are shown in FIG. 16C to FIG. 16F.

Figure 16C:
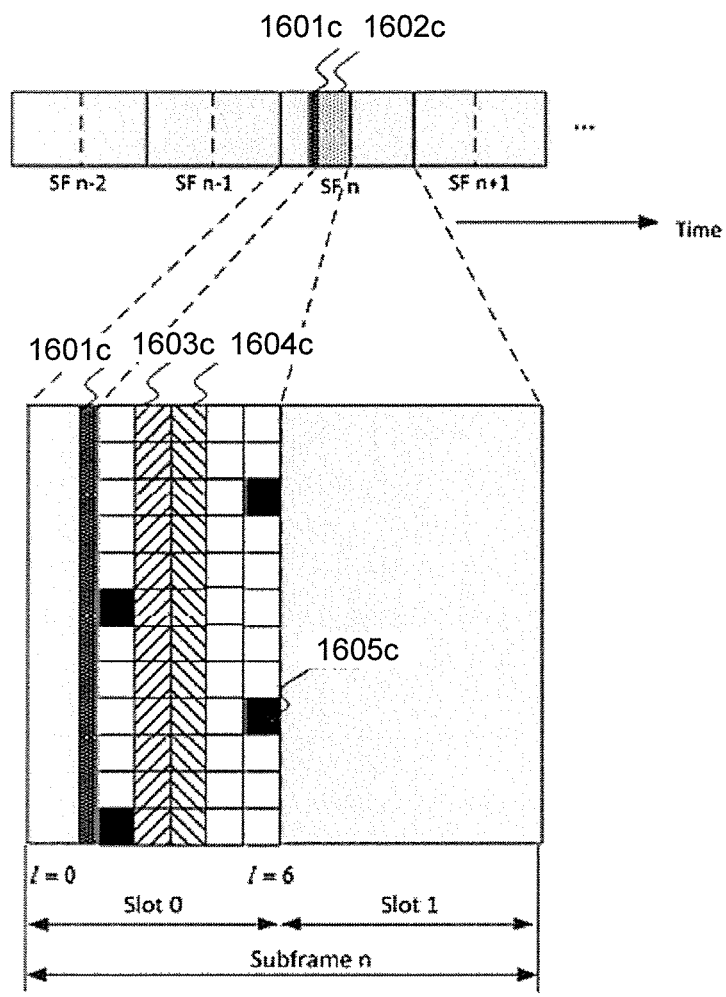
Figure 16D:
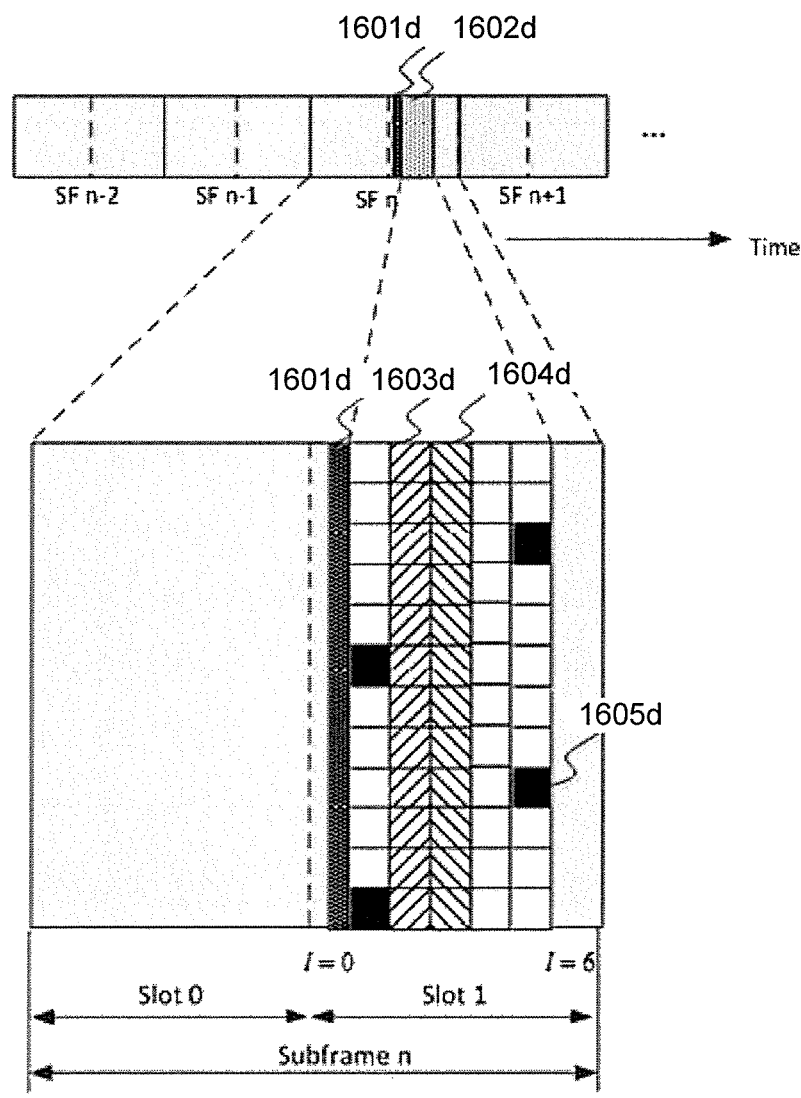
Figure 16E:
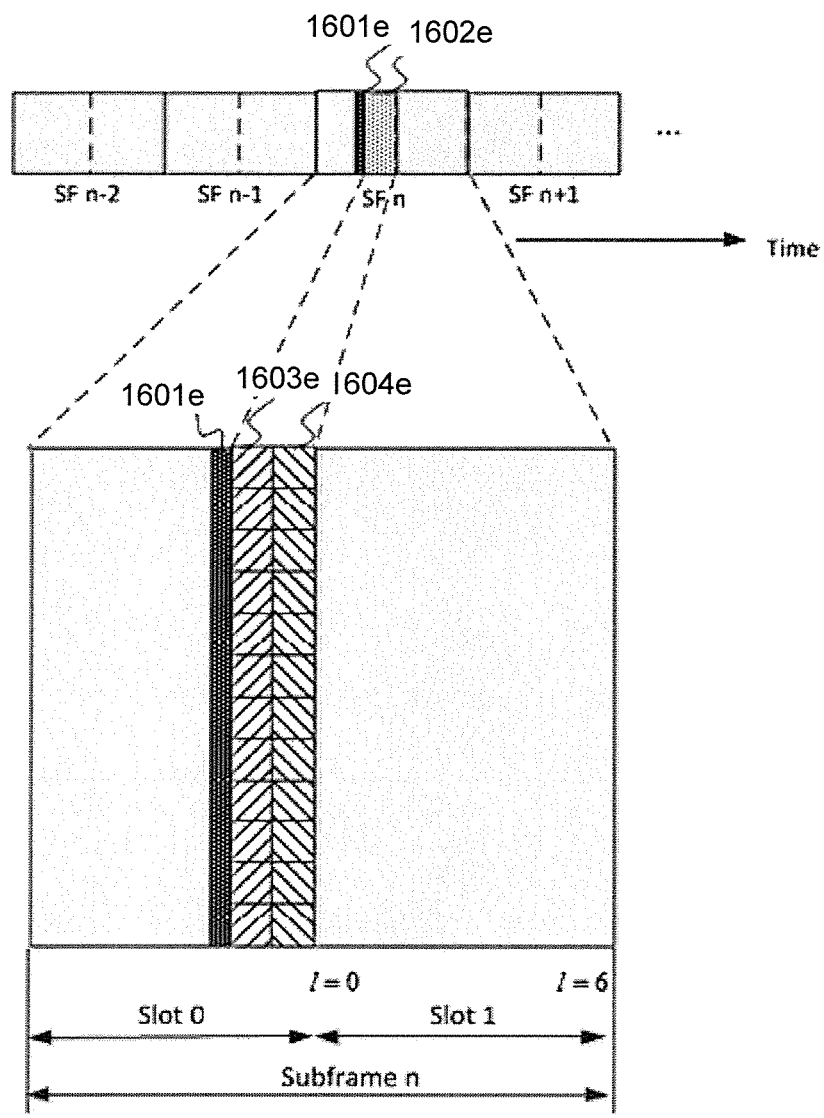
Figure 16F:
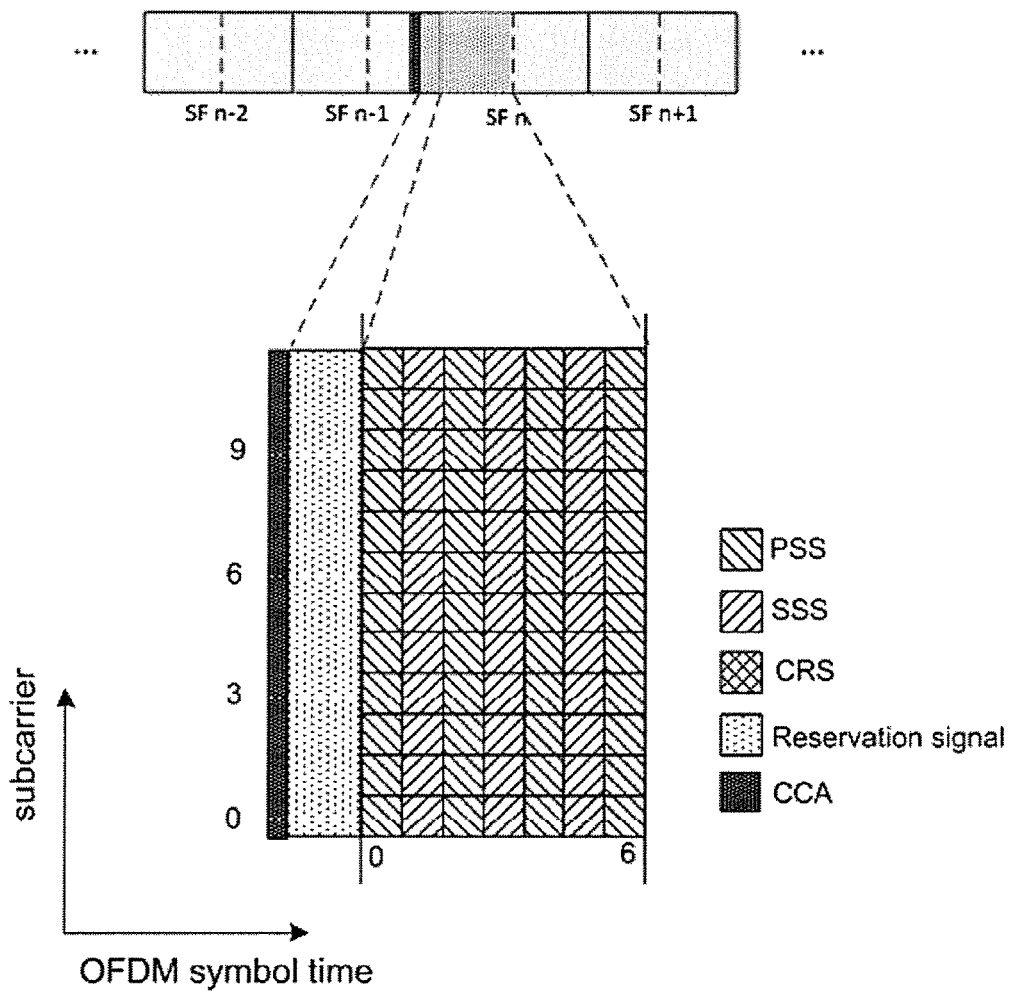

Referring to FIGS. 16A, 16B, 16C, and 16D, the first OFDM symbol after the last idle CCA slot (1601a, 1601b, 1601c, 1601d) (denoted symbol L, where L∈{0 . . . 6} for normal cyclic prefix and L∈{0 . . . 5} for extended cyclic prefix), is used to transmit CRS (1605a, 1605b, 1605c, 1605d). The resource element mapping for CRS in symbol l' (where l'=0 . . . 6 for normal cyclic prefix and l'=0 . . . 5 for extended cyclic prefix) can be the same as OFDM symbol (l'−L) (for FIGS. 16C and 16D, CRS frequency shift of 0) or OFDM symbol (l'−L+4) (for FIGS. 16A and 16B, CRS frequency shift of 3) of a conventional or legacy LTE slot. The first CRS OFDM symbol is followed by SSS (1603a, 1603b, 1603c, 1603d) and PSS (1604a, 1604b, 1604c, 1604d) OFDM symbols. The duration of COS can be fixed, such as it can be at least 4 OFDM symbols, such as 4, 5, 8, 12, or 14 OFDM symbols. The duration of COS can also depend on the number of CRS symbols (such as 2 or 4 CRS symbols) and the number of PSS/SSS symbols required. The duration of COS can also depend on the number of CRS symbols (such as 2 or 4 CRS symbols) and the number of PSS/SSS symbols required. COS with 4 OFDM symbols are shown in FIGS. 16A and 16B, whereas COS with 5 OFDM symbols are shown in FIGS. 16C and 16D. The COS duration can also be dynamic, such as extended to the end of the LAA slot or to the end of the first LAA slot plus one additional LAA slot. The CRS mapping can continue to the second slot with the same relative time and frequency spacing among the CRS resource elements as in the legacy mapping.

If the remainder of the first LAA slot is fewer than 4 OFDM symbols (for FIGS. 16A and 16B) or fewer than 5 OFDM symbols (for FIGS. 16C and 16D), the mapping of CRS and PSS/SSS can continue to the second LAA slot. Other design variations include swapping the locations of PSS and SSS, placing the SSS and the PSS in the first and second OFDM symbols and CRS from the third OFDM symbol. In another design option, the SSS and the PSS are mapped to the first and the second OFDM symbols, and can be repeated for multiple consecutive OFDM symbol-pairs, such as 1 or 2 or 3 (the number of repetitions can depend on the next subframe boundary or the time boundary where control/data channel for UE begins); the CRS may not be mapped or may only be mapped to the subcarriers not occupied by the PSS and the SSS and their repetitions. For resource elements not mapped for PSS, SSS, CRS, or CSI-RS, any signals that meet the regulatory requirements such as Reservation Signal can be transmitted.

In another option, the fixed length COS is only mapped with Reservation signal. EPDCCH and PDSCH can be transmitted in the remaining region of the subframe with DM-RS as the reference signal for channel estimates. If the COS region has a fixed duration, the EPDCCH and PDSCH region can have flexible duration, but with a minimum duration e.g. at least one slot of a subframe. If the minimum EPDCCH/PDSCH region duration condition is not met, the COS region can be extended till the end of subframe boundary, or Reservation signal can be inserted between the end of COS and the start of EPDCCH/PDSCH. The DM-RS RE mapping can be according to the legacy method or can be according to the method as described in FIG. 18. The COS may not include the PSS and the SSS, such as if they are transmitted in different subframe(s), in which case, the signals indicated as 1603a, 1603b, 1603c, 1604a, 1604b, 1604c, 1604d are not present. It is noted that reservation signal can be transmitted between the CCA slot and the COS when CCA is successful before the transmission timing for COS. Other possible COS designs without departing from the principles of this disclosure include FIG. 16E (where COS consists of PSS and SSS) and FIG. 16F.

Figure 17A:
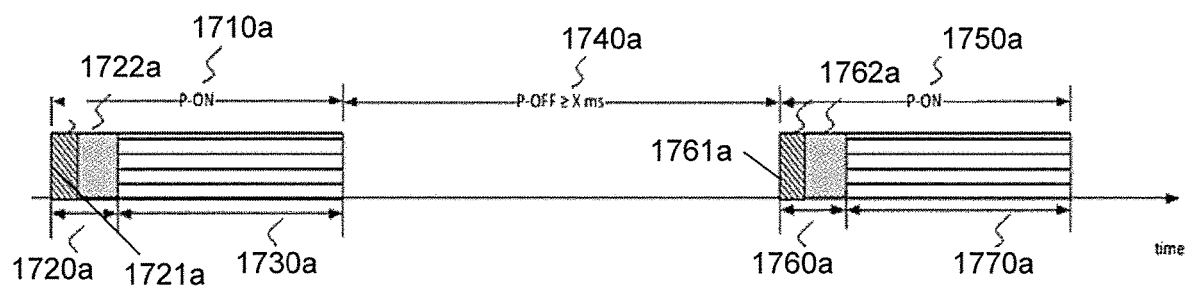
FIGS. 17A and 17B illustrate examples of a COS of a fourth method according to this disclosure.
Figure 17B:
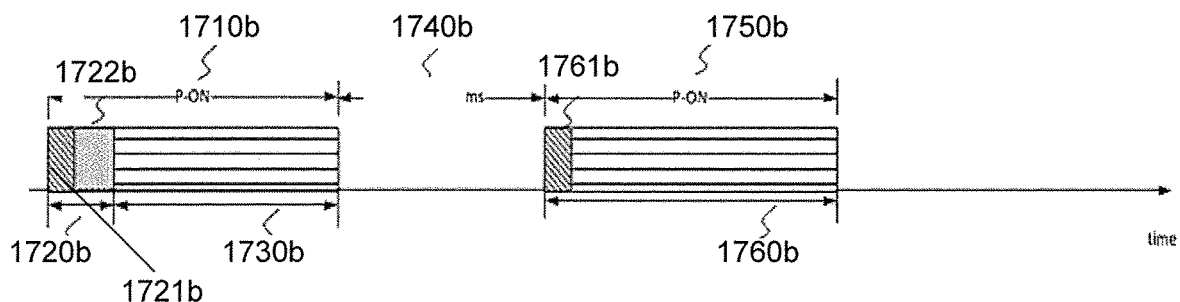

FIGS. 17A and 17B illustrate examples of a COS of a fourth method according to this disclosure. In the fourth method, a condition can be further specified for transmission of the fixed length region of COS for the first and second methods described herein. Specifically, if the last CCA slot before transmission is determined to be idle by a LAA cell, and a certain condition is met, both the variable length region and the fixed length region of the COS are transmitted by the LAA cell. Otherwise, if the last CCA slot before transmission is determined to be idle by a LAA cell and the condition is not met, only the variable length region of the COS is transmitted mainly for the purpose of channel occupancy. Note that the duration of the variable length region can be zero millisecond if the last idle CCA slot is just before the start of the next subframe. An example of the condition can be the time since the end of the last transmission by the LAA cell (denoted as P-OFF).

Referring to FIGS. 17A and 17B, if P-OFF≥xms 1740a, then the condition is met and the physical signals such as PSS and SSS of the fixed length region 1762a of COS 1760a as well as the variable length region 1761a are transmitted. Otherwise, the condition is not met 1740b and the physical signals such as PSS and SSS of the fixed length region of COS are not transmitted, but the variable length region

1761*b*, is transmitted. FIGS. 17A and 17B also illustrate elements 1720*a*, 1720*b*, 1721*a*, 1721*b*, 1710*a*, 1710*b*, 1730*a*, 1730*b*, 1750*a*, 1750*b*, 1760*b*, 1761*b*, and 1762*b*.

In a fifth method, the COS transmission according to the first method, the second method, the third method, or the fourth method, can only occur in a predetermined or configurable system frame or subframe. For example, for PSS, SSS, CRS, CSI-RS mapping according to the first frame structure type, the variable length region of the COS can only occur in subframe 9, or alternatively only subframe 4 and subframe 9 (provided a listen-before-talk protocol is fulfilled). Accordingly, the fixed length region of the COS can only occur in subframe 0, or alternatively only subframe 5 and subframe 9. For PSS, SSS, CRS, CSI-RS mapping according to the second frame structure type, the variable length region of the COS can only occur in subframe 0, or alternatively only subframe 5 and subframe 0 (provided a listen-before-talk or channel access protocol is fulfilled). Accordingly, the fixed length region of the COS can only occur in subframe 1, or alternatively only subframe 6 and subframe 1. Further conditions can be imposed on the system frame where COS can be transmitted such as in every even system frame number.

For all methods described herein, for resource elements of COS without CRS, PSS, SSS or CSI-RS, the network can transmit signals in those location in order to the meet certain regulatory requirement. A physical channel can also be mapped to those resource elements and it can carry control messages or data, including broadcast or unicast messages.

For a subframe, if COS is transmitted in the first slot, and assuming PDCCH/EPDCCH/PDSCH (such as for unicast) are not transmitted in COS subframes, EPDCCH/PDSCH can be transmitted in the second slot of the subframe. In this case, there is a need to define a one-slot EPDCCH or PDSCH transmission method. In particular, DM-RS resource element mapping for a one-slot EPDCCH or PDSCH needs to be defined.

Figure 18:
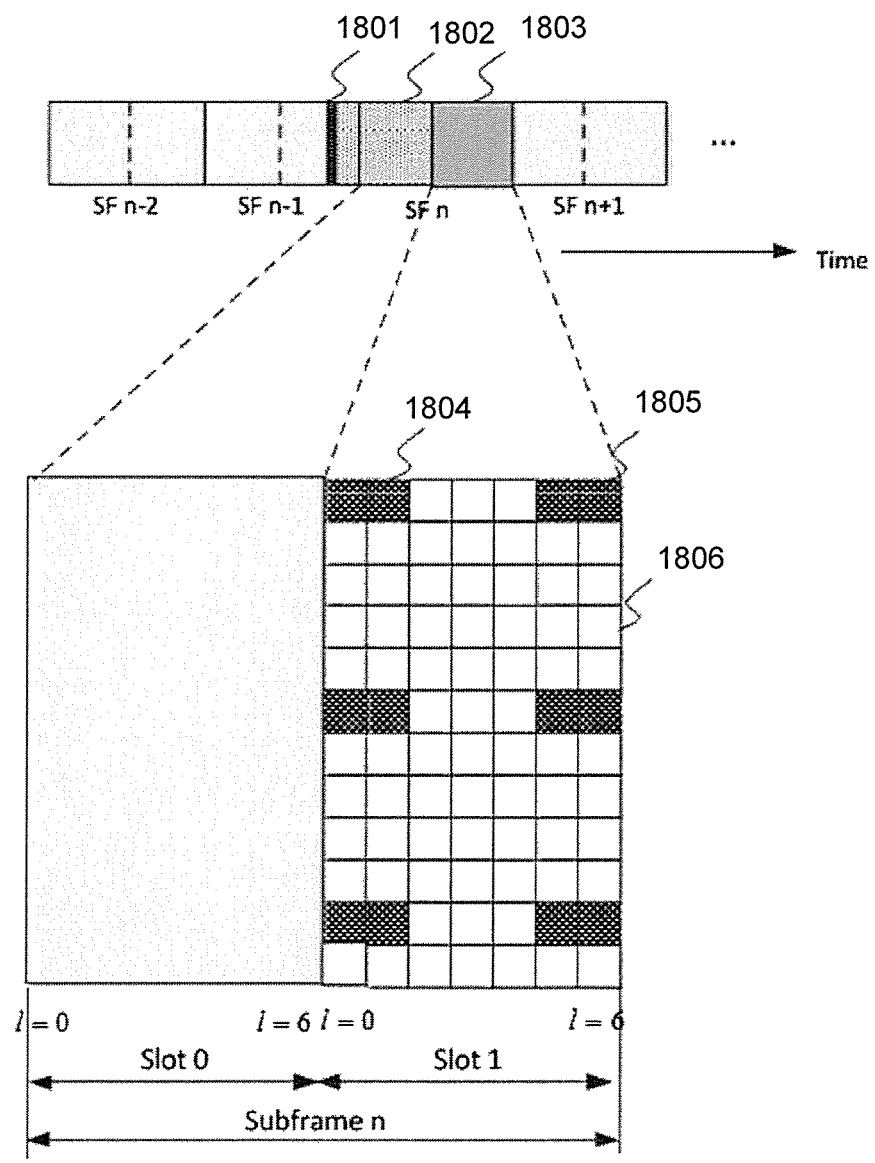
FIG. 18 illustrates an example DMRS resource element mapping for a one-slot PDSCH/EPDSCH according to this disclosure.

FIG. 18 illustrates an example DMRS resource element mapping for a one-slot PDSCH/EPDSCH according to this disclosure. A fifth method of DM-RS resource element mapping can also be applied in the case where EPDCCH or PDSCH are transmitted in a fractional slot (the remainder of the slot is occupied by COS), followed by a full one slot. Referring to FIG. 18, an example DMRS resource element mapping for the one-slot EPDCCH/PDSCH 1803 is shown. FIG. 18 also includes element 1801. The one-slot EPDCCH/PDSCH 1803 is transmitted after COS 1802 in the second slot of the DL subframe. For the legacy LTE, a first DM-RS is mapped to the last two OFDM symbols of the first slot and a second DM-RS is mapped to the last two OFDM symbols of the second slot of a DL subframe. However, for the one-slot EPDCCH/PDSCH, the first DM-RS is mapped to the first two ODFM symbols 1804 on the second slot instead, and the second DM-RS is still mapped to the last two OFDM symbols 1805 of the second slot. EPDCCH/PDSCH is mapped to resource elements 1806. In case EPDCCH or PDSCH or other DM-RS based physical channel can be mapped to the COS subframes and that the COS includes PSS and SSS which can collide with the conventional DM-RS, then the DM-RS designs as proposed in [9] that avoid collision with PSS and SSS can be applied.

Figure 19A:
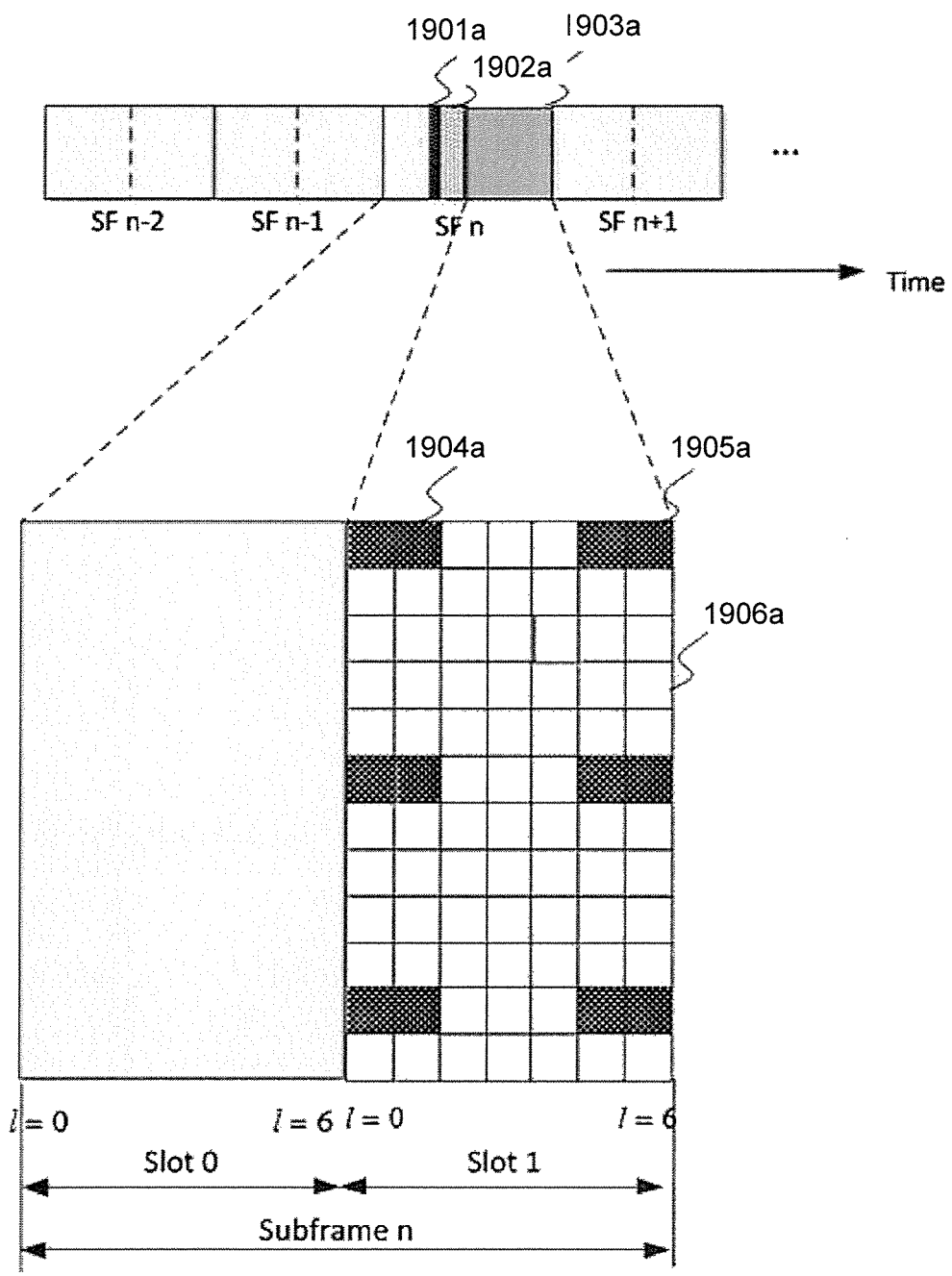
FIG. 19A illustrates another example DMRS resource element mapping for a one-slot PDSCH/EPDCCH according to this disclosure.
Figure 19B:
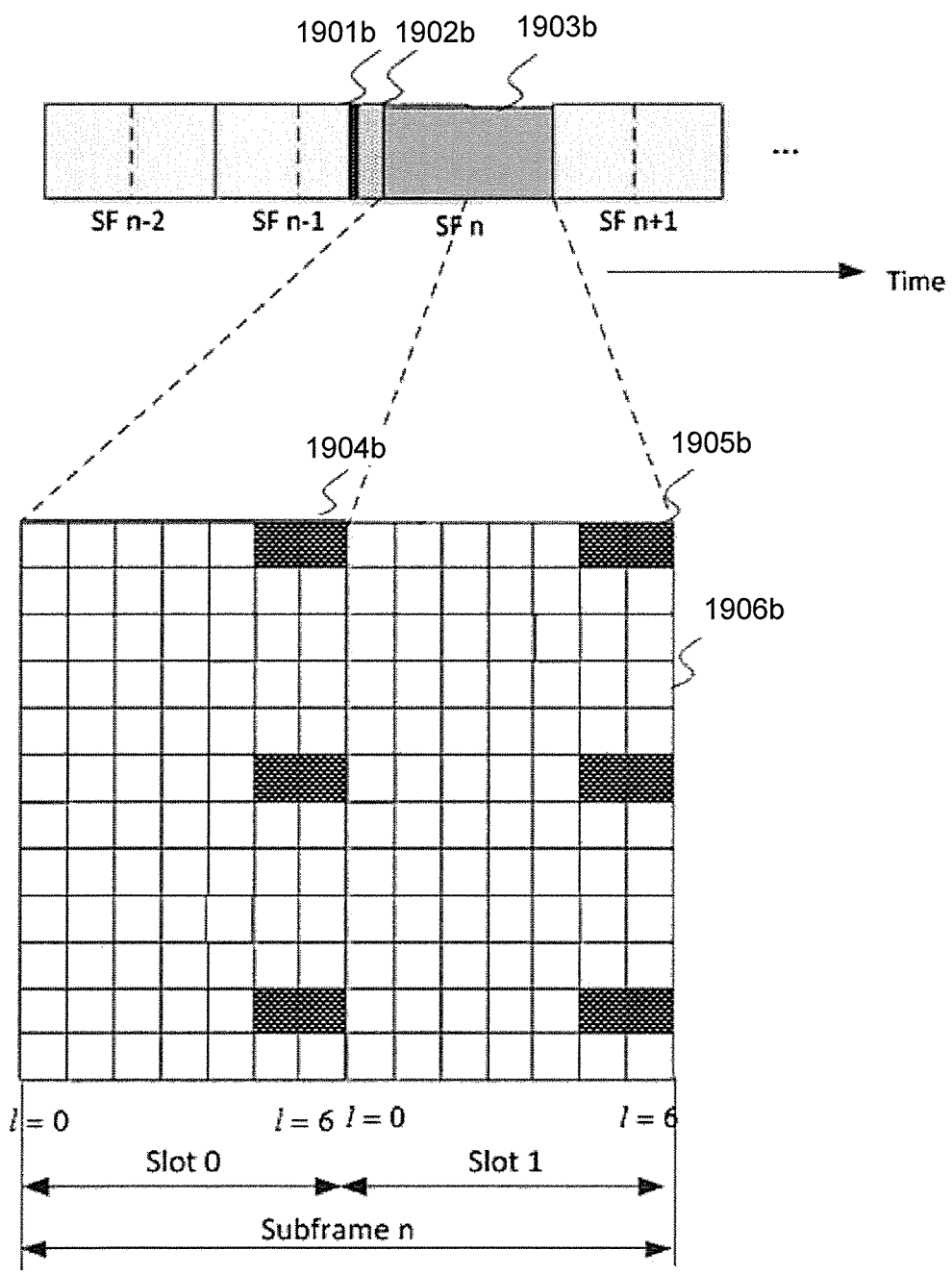
FIG. 19B illustrates an example DMRS resource element mapping for a normal PDSCH/EPDCCH according to this disclosure.

FIG. 19A illustrates another example DMRS resource element mapping for a one-slot PDSCH/EPDCCH 1903*a* according to this disclosure. As shown in FIG. 19A, the COS is located in the first slot of subframe n 1902*a*, after CCA 1901*a*, and consists of only the variable length region (<1 slot). The DMRS REs can be located in the first two OFDM symbols 1904*a* as well as in the last two OFDM symbols 1905*a* of the second slot of the subframe. Control or data information can be mapped to the other REs 1906*a* of the second slot of the subframe. This is an example where the COS overhead can be minimized with one-slot PDSCH/EPDCCH. FIG. 19B illustrates an example DMRS resource element mapping for a normal PDSCH/EPDCCH 1903*b* according to this disclosure. As shown in FIG. 19B, if the COS of variable length region 1902*b* is located in the second slot of a subframe (subframe n−1), after CCA 1901*b*, then the PDSCH/EPDCCH can be more than 1 slot in subframe n 1903*b* [1]. The DMRS REs can be located in the last two OFDM symbols 1904*b* of the first slot of a subframe as well as in the last two OFDM symbols 1905*b* of the second slot of the subframe. In this case, PDCCH can also be transmitted in subframe n. One implication can be that the presence of PDCCH (hence need for UE to monitor/receive PDCCH) can depend on the time location of COS, such as if the COS is in the first slot of subframe n, then PDCCH is not transmitted in subframe n; else if the COS is the second slot of subframe n, then PDCCH can be transmitted in subframe n+1. Furthermore, the type of physical control channel to be monitored or received by the UE can also depend on the time location of the COS. For example, if the COS is in the first slot of subframe n, then the UE monitors EPDCCH in subframe n (and not monitor PDCCH in subframe n). Otherwise, if the COS is the second slot of subframe n, then the UE monitors PDCCH in subframe n+1 (and not monitor EPDCCH in subframe n+1). Moreover, if PSS/SSS is transmitted in the same slot or subframe as EPDCCH/PDSCH, the position of PSS/SSS can be changed to avoid collision with DM-RS (such as SSS can be in the third OFDM symbol of the second slot and PSS can be in the fourth OFDM symbol of the second slot of a EPDCCH/PDSCH subframe). Collision of CRS (such as port 0) with DM-RS for one-slot EPDCCH/PDSCH can be avoided with fixed frequency shift fixed (not dependent on PCI) such as zero frequency shift (the first CRS RE is mapped to the smallest subcarrier index, with six subcarrier spacing between CRS REs in the same OFDM symbol).

A second embodiment is directed to enhanced discovery signals for an LAA. The discovery signal for LAA can be enhanced to support improved cell detection. Specifically, a cell detection false alarm or a misdetection rate can be reduced with PSS and SSS repetition within a transmission period. A UE can perform energy accumulation of the repeated PSS and SSS for cell detection. The enhanced discovery signal design can be applied to the discovery signal transmission [8] (such as Embodiment 2 of [8] where enhanced discovery signal is transmitted after CCA within time window corresponding to the Discovery signal Measurement Timing Configuration (DMTC)).

PSS and SSS repetition can be performed within the same channel access instance by an LAA cell. This can reduce cell detection latency as well as UE cell detection algorithm complexity. Since CCA is required before transmission, PSS and SSS repetition across multiple channel access instances can complicate UE PSS/SSS energy accumulation algorithm as the number of hypotheses of the time location of the repeated PSS/SSS can increase exponentially with the number of channel access instances.

Figure 20A:
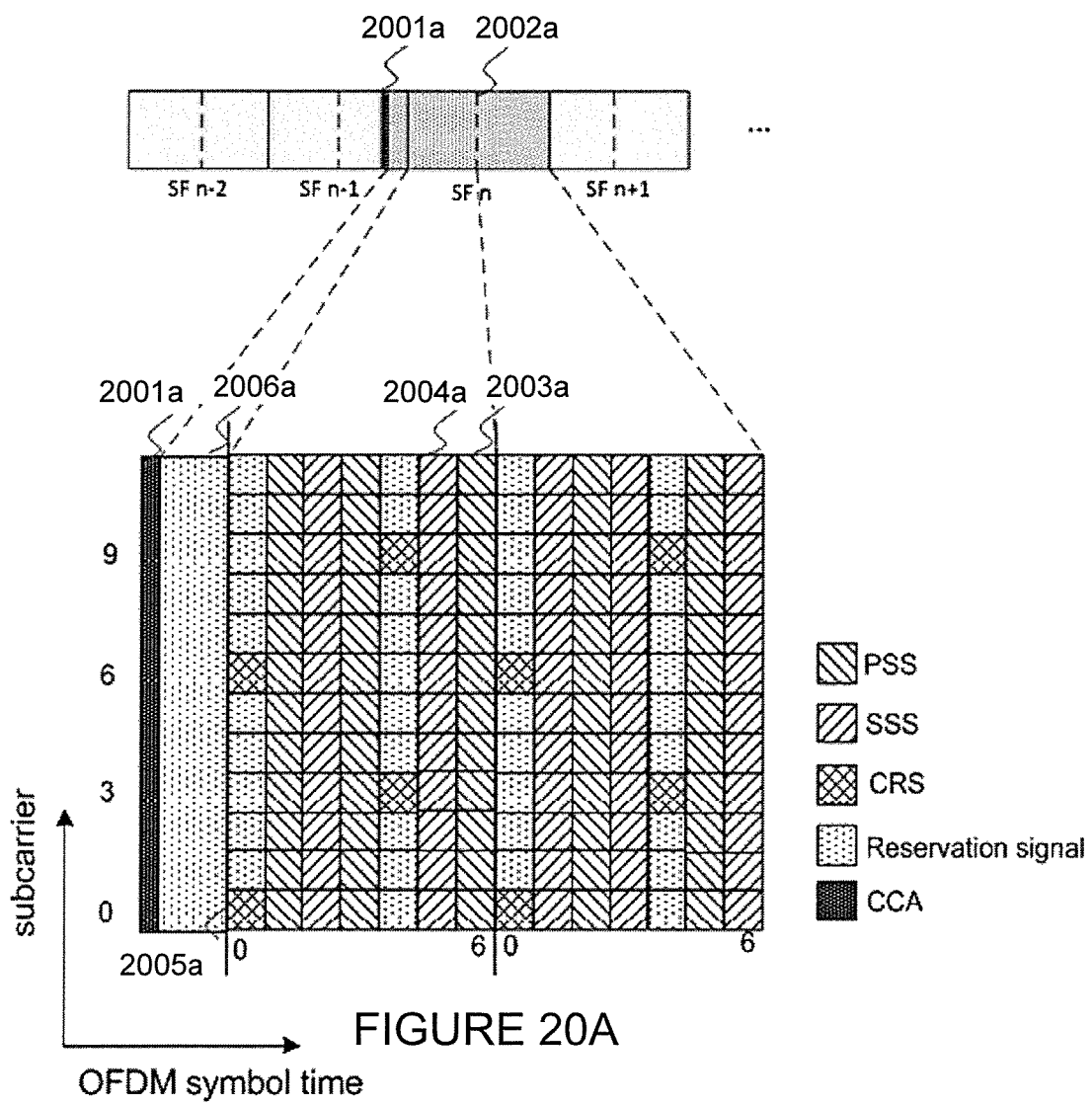
FIGS. 20A, 20B, 20C, 20D, 20E, 20F, 20G, 20H, and 20I illustrate example enhanced discover signals according to this disclosure.

In a first approach, the PSS and the SSS are repeated in OFDM symbols not used for CRS transmission. FIG. 20A illustrates an example enhanced discover signal according to this disclosure. It can be assumed that the discovery signal occasion is 1 ms. As shown in FIG. 20A, the idle CCA 2001*a* before transmission is detected in the second slot of subframe n−1, reservation signal 2006a is transmitted for the remaining duration of subframe n−1, CRS port 0 2005a is mapped according to the legacy method to subframe n (1$^{st}$, 5$^{th}$ OFDM symbols of each slot), the PSS 2003a and the SSS 2004a are repeatedly mapped in OFDM symbols not used for CRS port 0 transmission within subframe n; in particular the PSS is mapped to the 2$^{nd}$, 4$^{th}$, 7$^{th}$, 10$^{th}$, 13$^{th}$ OFDM symbols, whereas the SSS is mapped to the 3$^{rd}$, 6$^{th}$, 9$^{th}$, 11$^{th}$, 14$^{th}$ OFDM symbols. The resource elements not mapped to PSS, SSS or CRS can be transmitted with reservation signal, or they can be empty resource elements to reduce interference.

Figure 20B:
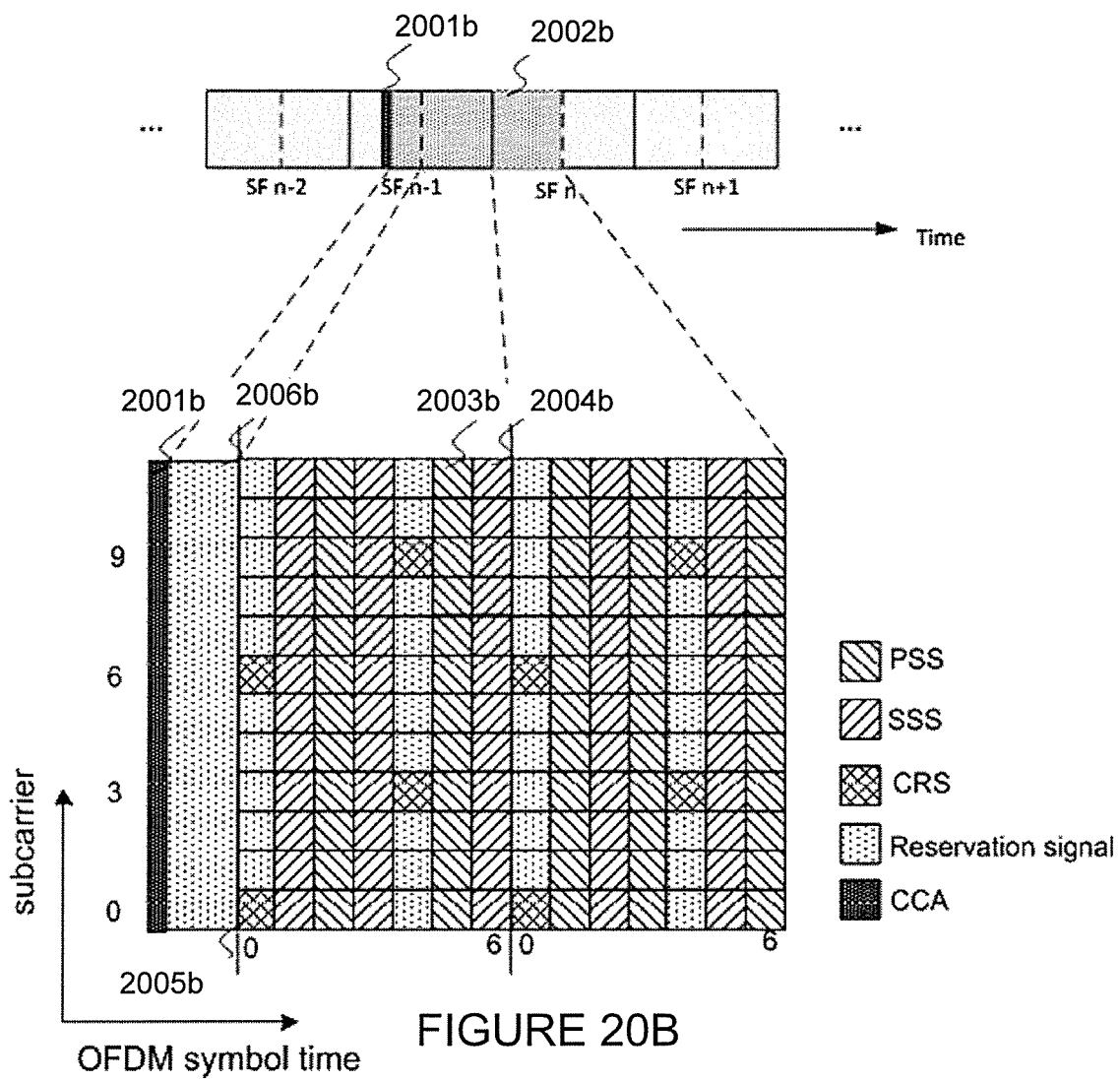
Figure 20C:
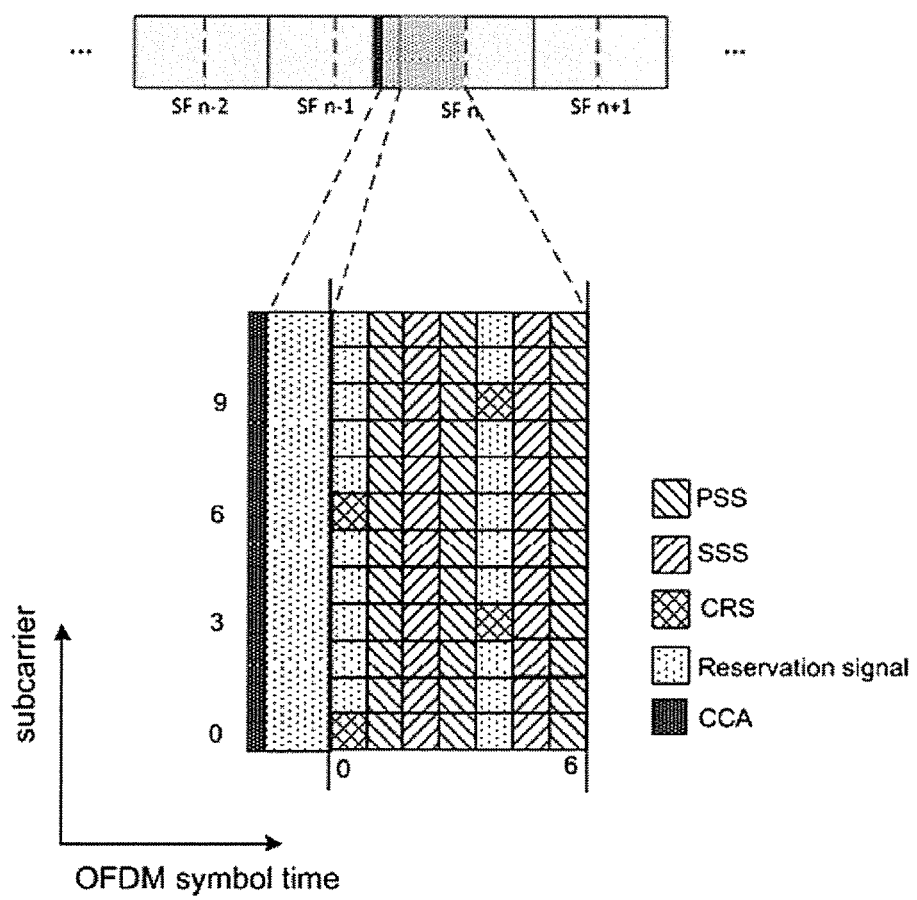

FIG. 20B illustrates another example enhanced discover signal according to this disclosure. As shown in FIG. 20B, the idle CCA before transmission is detected in the first slot of subframe n−1. In order to reduce the reservation signal overhead, the enhanced discovery signal spans the second slot of subframe n−1 and the first slot of subframe n 2002b. CRS port 0 2005b is mapped to the second slot of subframe n−1 and the first slot of subframe n (1$^{st}$, 5$^{th}$ OFDM symbols of each slot), the PSS 2003b and the SSS 2004b are repeatedly mapped in OFDM symbols not sued for CRS port 0 transmission. The resource elements not mapped to PSS, SSS, or CRS can be transmitted with a reservation signal, or they can be empty resource elements to reduce interference. FIG. 20C illustrates another example enhanced discovery signal according to this disclosure. As shown in FIG. 20C, as an alternative to the first approach, the overhead of the enhanced discovery signal can be reduced if transmission of the PSS, the SSS and the CRS is reduced to one slot.

Figure 20D:
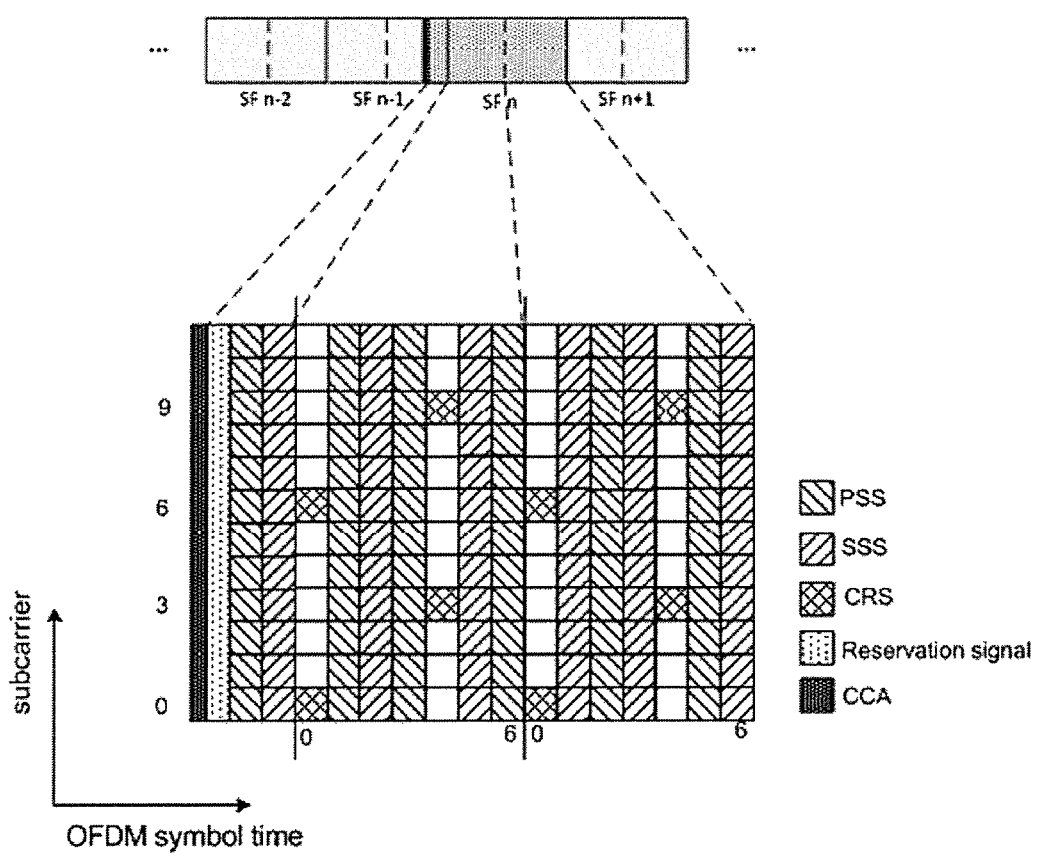

FIG. 20D illustrates yet another example enhanced discovery signal according to this disclosure. The enhanced discovery signal, as illustrated in FIG. 20D, is an enhanced discovery signal with one slot. As shown in FIG. 20D, as another alternative the first approach, PSS and SSS are also transmitted in the variable length region after the idle CCA. A reservation signal can still be transmitted after the idle CCA for a duration less than an OFDM symbol until the next OFDM symbol boundary.

Figure 20E:
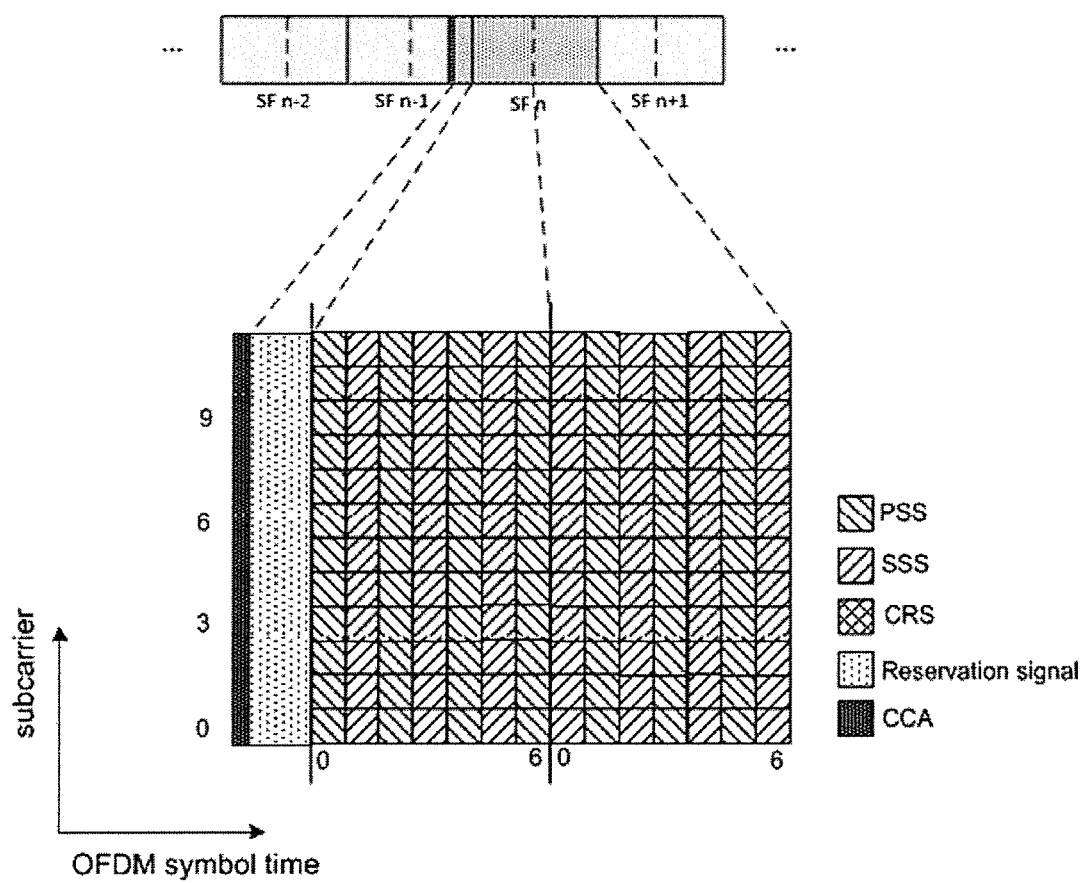
Figure 20F:
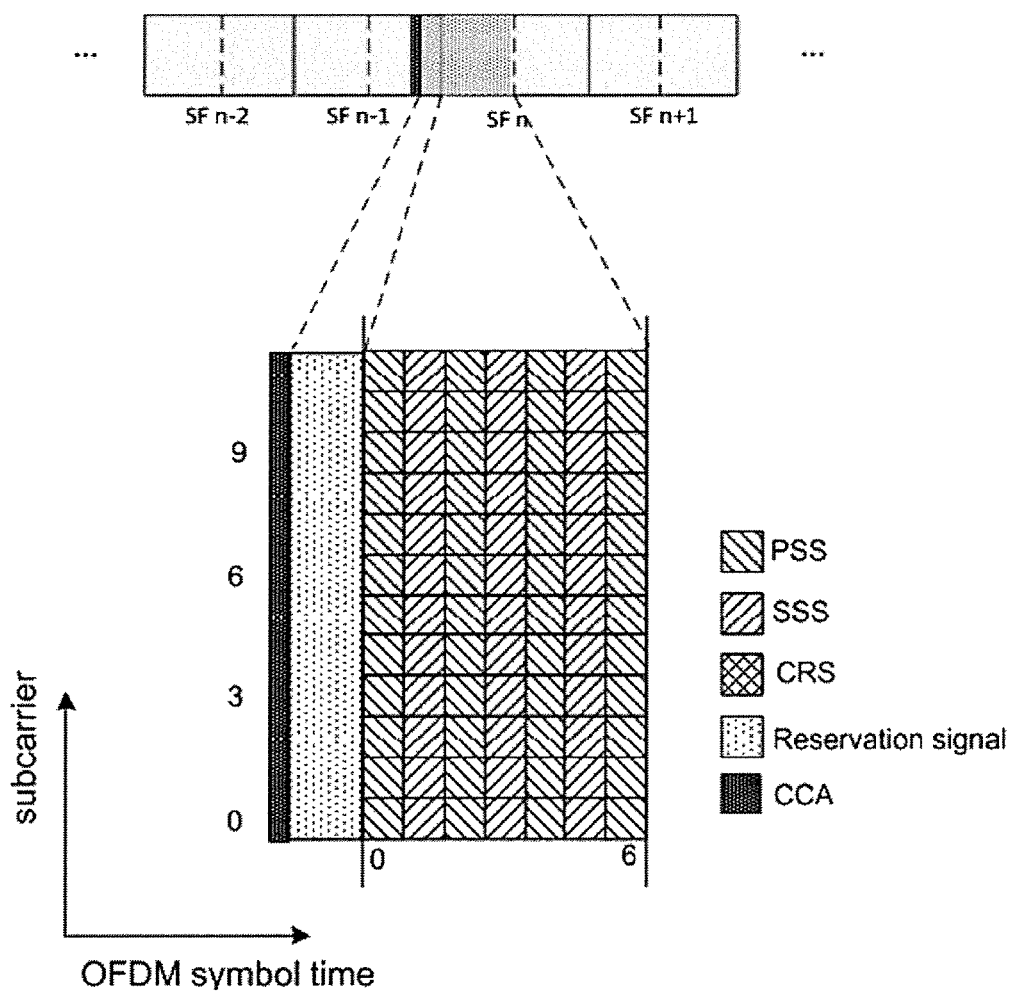

FIG. 20E illustrate an example enhanced discovery signal according to this disclosure. In a second approach, as shown in FIG. 20E, CRS is not included in the enhanced discovery signal and only PSS, SSS and their repetitions are transmitted as enhanced discovery signal. FIG. 20F illustrates an example enhanced discovery signals according to this disclosure. Specifically, FIG. 20F, shows reduced overhead of 1 slot PSS/SSS repetition. PSS and SSS are transmitted in the center 6 physical resource blocks of the system bandwidth. In case CRS is also transmitted in the same subframe as the enhanced discovery signal (such as for facilitating fine synchronization by the UE before data reception such as that described in Embodiment 2 of [8]), the CRS can be punctured in the resource elements occupied by the enhanced discovery signal. In another alternative, the repeated PSS and the repeated SSS can be punctured with CRS.

Figure 20G:
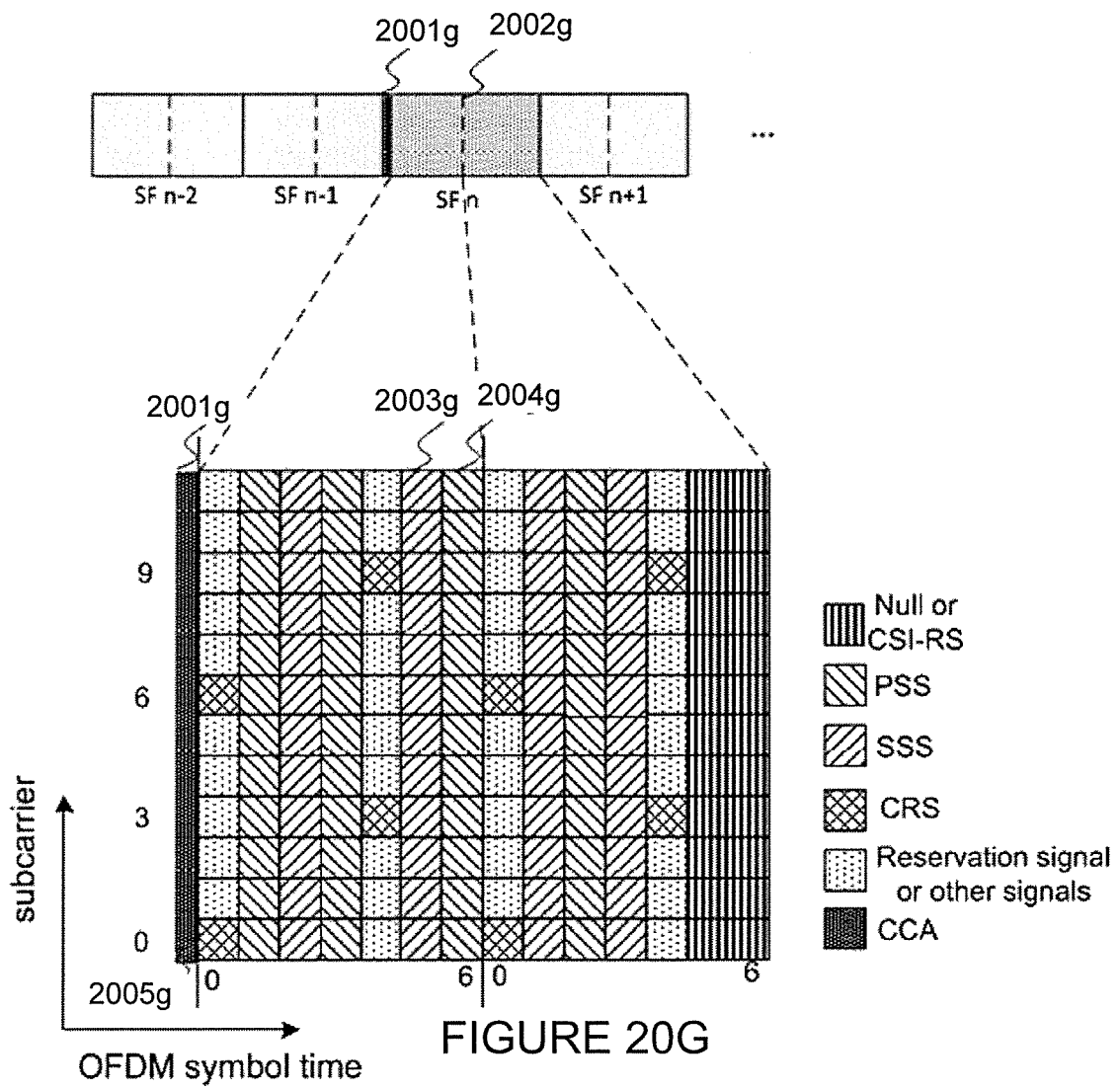

In another alternative of the first approach, the last two OFDM symbols of DRS subframes are null, can be used to carry CSI-RS (port 15, or port 15 to 22 depending on the number of CSI-RS ports supported for CSI feedback). This is illustrated in FIG. 20G. FIG. 20G includes elements 2001g, 2002g, 2003g, 2004g, and 2005g.

Figure 20H:
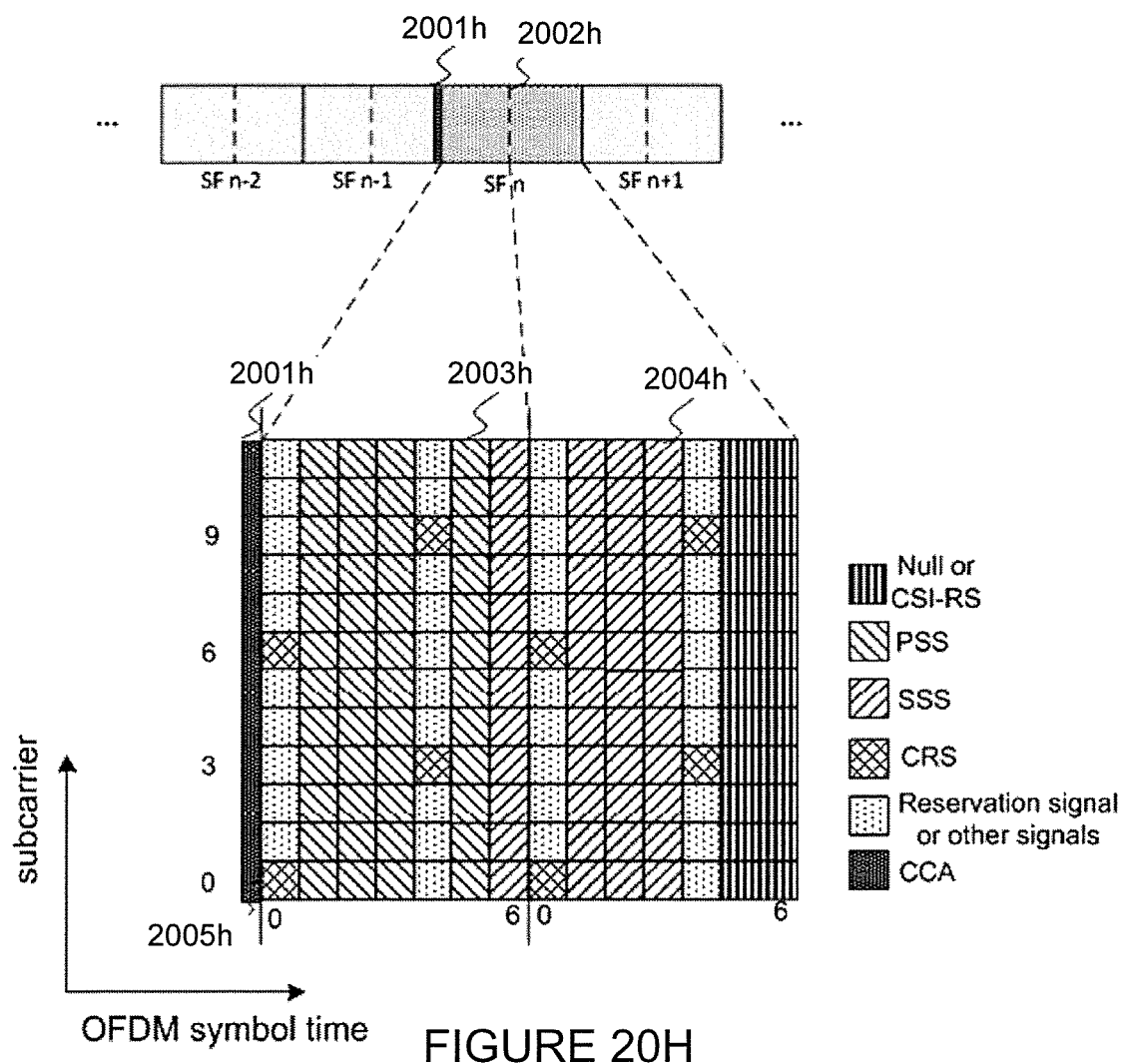

In another alternative of the first approach, the repeated PSSs are mapped consecutive in time and the repeated SSSs are mapped consecutive in time. In addition, consecutive PSSs can be mapped first before the consecutive SSSs. This enables the UE to detect the PSS first and then the SSS in an efficient manner. This is illustrated in FIG. 20H where there are 4 PSSs and 4 SSSs in a DRS subframe. FIG. 20H includes elements 2001h, 2002h, 2003h, 2004h, and 2005h.

Figure 20I:
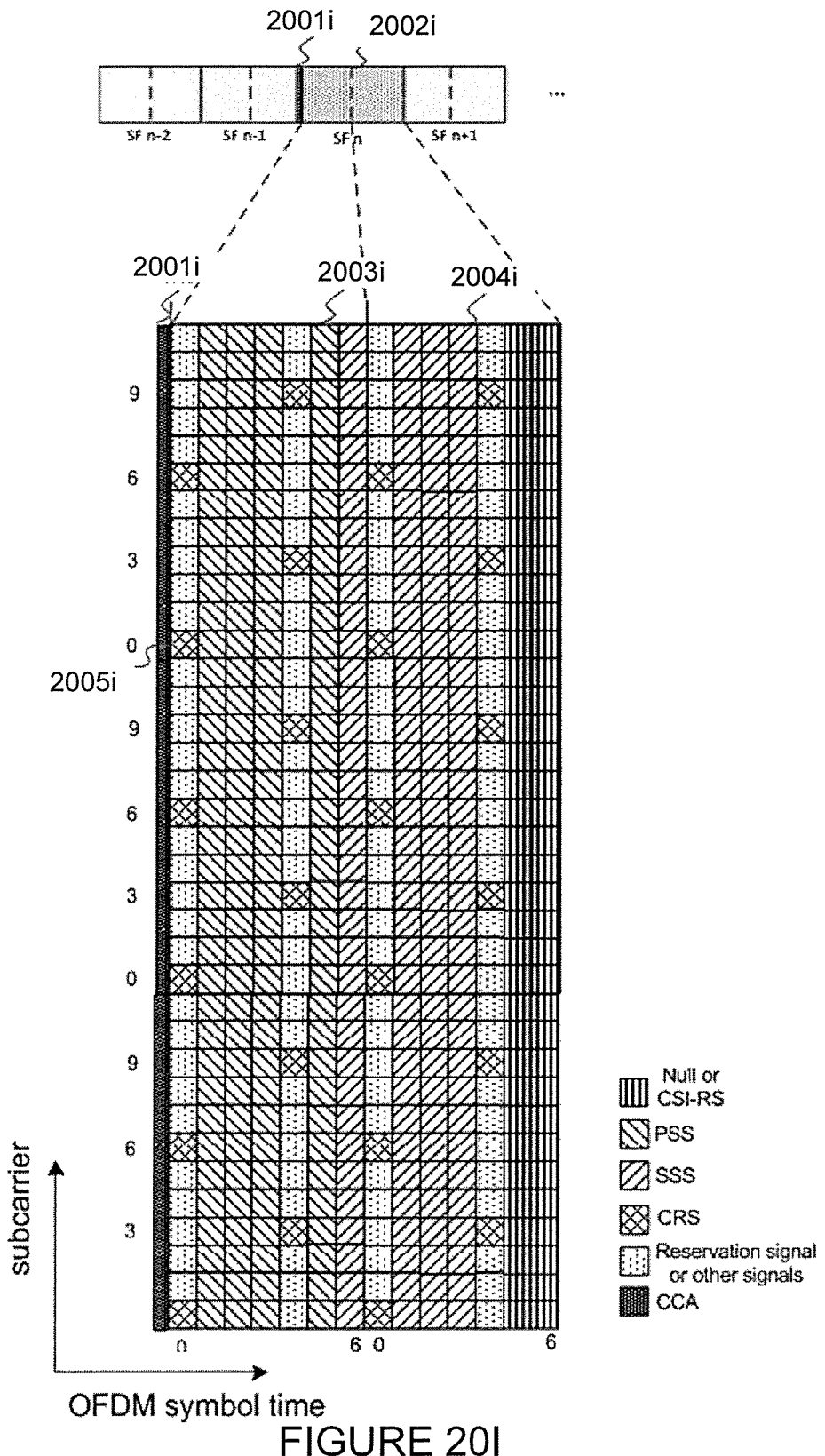

In another alternative of the first approach, in addition to repeating the PSSs and SSSs in the time domain, the PSSs and the SSSs can be in addition repeated in the frequency domain to improve cell detection reliability. This is illustrated in FIG. 20I where the PSSs and the SSSs are repeated (such as in 3 PRBs in the frequency domain and 4 times in the time domain for a total of 12 sets of PSSs and SSSs in a DRS subframe). FIG. 20I includes elements 2001i, 2002i, 2003i, 2004i, and 2005i.

In a third approach, CRS, PSS, SSS are repeated until a condition is satisfied. For example, such a condition could include that the number of the PSS and the SSS transmitted is at least a predetermined number (such as 2 for each synchronization signal type), or the number of the CRS OFDM symbols is at least another predetermined number (such as 2 or 4 symbols). The conditions of the number of transmissions are known at the UE and can be either fixed or configured by the network. It should be understood that for the approaches and embodiments discussed herein, if CSI-RS is also configured, the OFDM symbols with CSI-RS do not contain PSS and SSS (such as the 3$^{rd}$ and the 4$^{th}$ symbol of the second slot, or the 6$^{th}$ and the 7$^{th}$ symbol of the second slot of the enhanced discovery signal subframe). In another alternative, the PSS and the SSS can be punctured with CSI-RS.

In some cases, a definition of the length of a clear channel assessment (CCA) slot and the timing of a CCA slot is needed. The frequency range of a CCA slot can be 20 MHz. If the CCA slot with the specified timing and duration is occupied, an LAA device assumes the channel to be occupied; otherwise the channel is assumed to be idle. According to a certain channel access protocol, an LAA device may need to determine a number of CCA slots to be idle before it can transmit. For example, a random integer can be drawn by the LAA device from a range of a minimum value to a maximum value (such as 1 to 32), and the value drawn is set as the initial value of a back-off counter. If a CCA slot is determined to be idle, the back-off counter is decremented. Otherwise, the back-off counter doesn't decrement. When the back-off counter reaches zero, the LAA device can transmit.

Figure 21A:
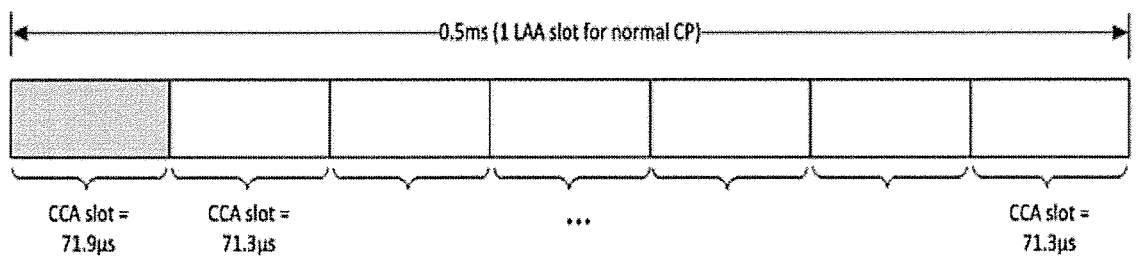
FIGS. 21A, 21B, 22, 23, 24, and 25 illustrate example CCA slot definitions according to this disclosure.
Figure 21B:
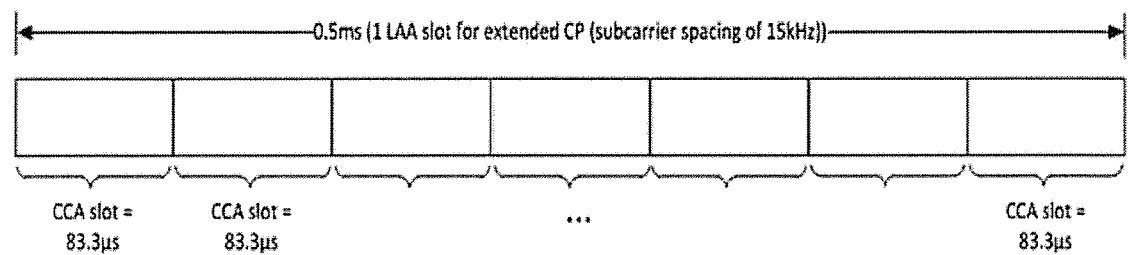

In a first approach, a CCA slot is defined to be one LAA OFDM symbol length (or one LAA SC-FDM symbol length for uplink if SC-FDM is adopted for uplink). FIGS. 21A and 21B illustrate example CCA slot definitions of the first approach according to this disclosure. For normal cyclic prefix, as shown in FIG. 21A, the CAA slot is 71.9 μs and 71.3 μs for the first OFDM symbol of a LAA slot (0.5 ms) and the second to the seventh OFDM symbols of a LAA slot, respectively. For extended cyclic prefix, as shown in FIG. 21B, the CAA slot is 83.3 μs and 166.7 μs as for subcarrier spacing of 15 kHz and 7.5 kHz, respectively. A CCA slot aligns exactly with an LAA OFDM symbol. CCA slots can be consecutive in time. An advantage of this approach is alignment of CCA slot duration and timing with LAA OFDM numerology. CCA slots are consecutive in time. In this approach, after the CCA protocol is satisfied (such as when a back-off counter has reached zero); the LAA device transmits signals corresponding to a fractional LAA slot or subframe.

Figure 22:
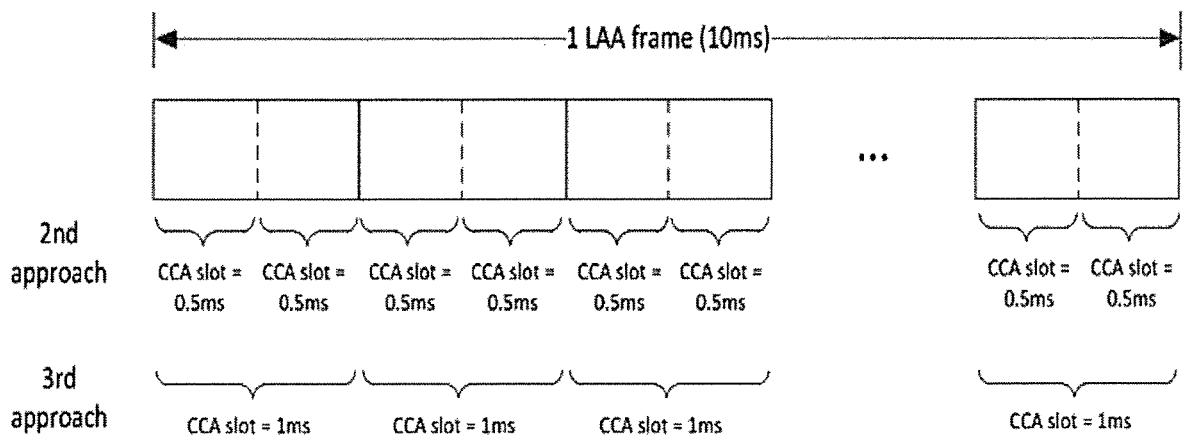

FIG. 22 illustrates example CCA slot definitions according to this disclosure. In a second approach, a CCA slot is defined to be one LAA slot (0.5 ms). The CCA slot aligns exactly with the LAA slot. CCA slots can be consecutive in time. An advantage of this approach is alignment of CCA slot duration and timing with LAA OFDM numerology. In a third approach, a CCA slot is defined to be one LAA subframe (1 ms). The CCA slot aligns exactly with the LAA subframe. CCA slots are consecutive in time. An advantage of this approach is alignment of CCA slot duration and timing with LAA OFDM numerology.

Figure 23:
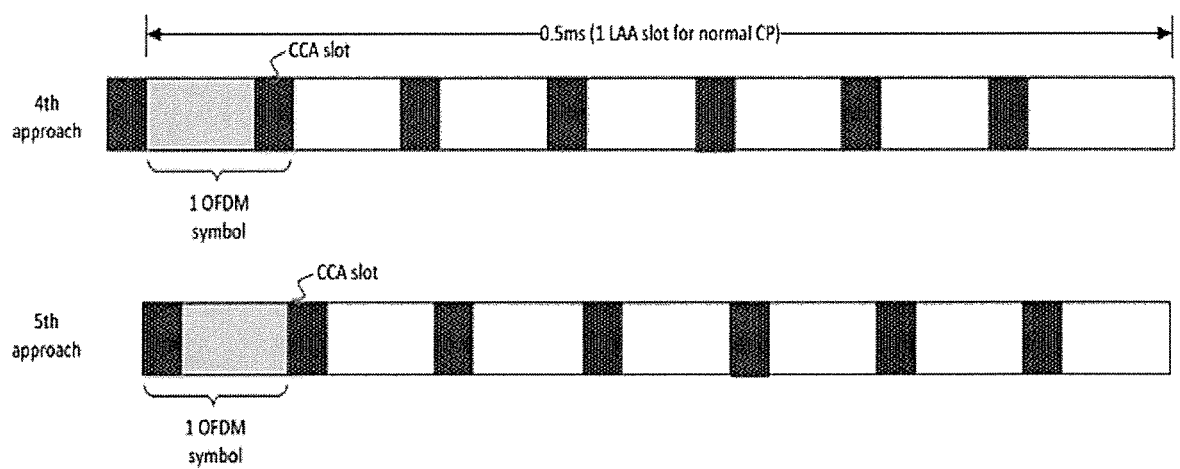

FIG. 23 illustrates example CCA slot definitions according to this disclosure. In a fourth approach, a CCA slot is defined to be of sub-symbol duration, such as 20 μs. As shown in FIG. 23, the CCA slot is located immediately before each OFDM symbol boundary. In an alternative of the fourth approach, CCA slot is located immediately before each LAA slot. In yet another alternative, the CCA slot is located immediately before each LAA subframe. In this approach, the CCA slots are not consecutive in time. In a fifth approach, a CCA slot is defined to be of sub-symbol duration, such as 20 μs. As shown in FIG. 23, the CCA slot is located immediately after each OFDM symbol boundary. In an alternative of the fourth approach, CCA slot is located immediately after each LAA slot. In yet another alternative, the CCA slot is located immediately after each LAA subframe. In this approach, the CCA slots are not consecutive in time.

Figure 24:
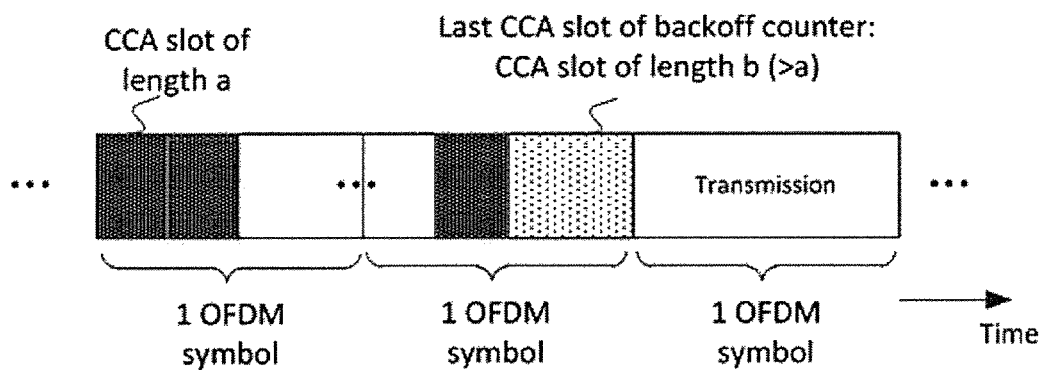

FIG. 24 illustrates another example CCA slot definitions according to this disclosure. In a sixth approach, as shown in FIG. 24, a CCA slot is defined to be of sub-symbol duration, such as 20 μs. It can be up to the LAA device to determine the start of a CCA slot. In one alternative, the CCA slots have a fixed duration. In another alternative, the CCA slots have a fixed duration except possibly for the last CCA slot corresponding to the back-off counter value of 1 (such as the last CCA slot to be determined to be idle before transmission is allowed), where the CCA slot duration is extended to the next OFDM symbol boundary. An advantage of this approach is that fractional OFDM symbol transmission after the last idle CCA slot can be avoided. The principle of the sixth approach can also be applied to the CCA slot length of one LAA OFDM symbol and extending to slot or subframe boundary for the last idle CCA slot. Similarly, the principle of the sixth approach can also be applied to the CCA slot length of one LAA slot and extending to subframe boundary for the last idle CCA slot.

Figure 25:
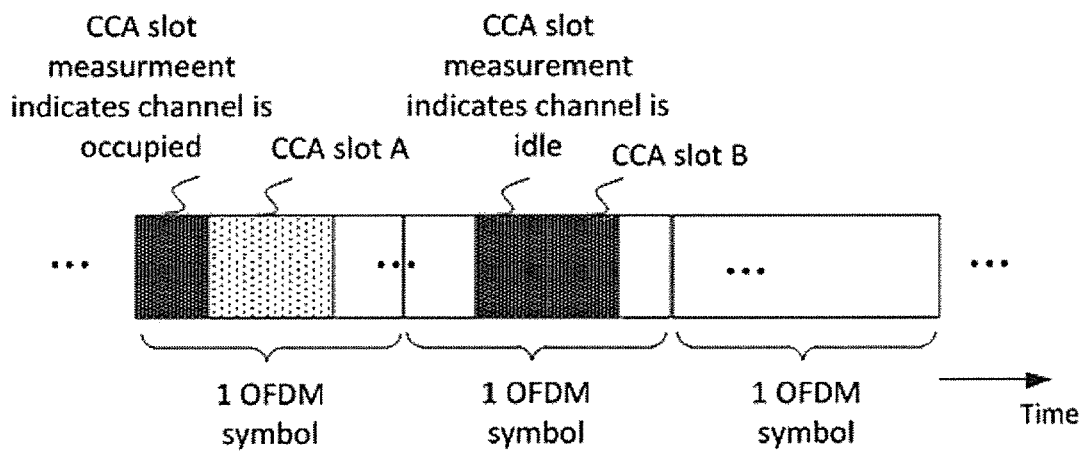

FIG. 25 illustrates another example CCA slot definitions according to this disclosure. In a seventh approach, as shown in FIG. 25, the CCA slot that occurs after the channel/carrier is determined to be occupied (CCA slot A) has a longer duration than the CCA slot that occurs after the channel/carrier is determined to be idle (CCA slot B). For example, CCA slot A can be 34 μs or 40 μs or 43 μs, whereas CCA slot B can be 20 μs. The advantage of longer CCA slot A is enable better co-channel coexistence with WiFi (such as IEEE 802.11n, IEEE 802.11ac), whereby ACK/NACK can be transmitted 16 μs after data reception. It should be understood that any two or more of the above indicated approaches can be combined. For example, the first approach could be combined with at least one of the second, third, fourth, fifth, sixth, or seventh approaches. In other words, any combination of the first, second, third, fourth, fifth, sixth, or seventh approaches can be used together.

In some cases, a definition of a listen-before-talk (LBT) or channel access protocol for LAA devices is needed. A device may transmit immediately after it finds that the channel is unoccupied for the first CCA slot [7]. Assuming all LAA devices enter the system at the same time, the protocol as indicated in reference [7], can favor LAA devices with earlier CCA slots. In order to randomize channel access priority, an Extended CCA procedure can also be applied for the first attempt to access the channel. In other words, an Extended CCA procedure is applied each time a LAA device needs to access the channel.

In an embodiment, an example of LBT protocol for load-based LAA equipment is provided. Before a transmission or a burst of transmissions on an Operating Channel, the equipment shall perform an Extended CCA check in which the Operating Channel is observed for the duration of a random factor N multiplied by the CCA observation time. The duration of the CCA observation time shall be not less than 20 μs. N defines the number of clear idle slots resulting in a total Idle Period that need to be observed before initiation of the transmission. The value of N can be randomly selected in the range q0 . . . q1 each time an Extended CCA is required and the value stored in a counter. q0 can be a fixed integer value such as 0 or 1, or from a range such as 1 . . . 4. q1 can be an integer value from, for example, the range 4 . . . 32, or the integer set [15, 31, 63] (other values, e.g. >32, are not precluded). The counter is decremented each time a CCA slot is considered to be "unoccupied." The Operating Channel shall be considered occupied if the energy level in the channel exceeds the threshold corresponding to the power level as discussed herein. When the counter reaches zero, the equipment may transmit. An LBT protocol for load-based LAA equipment is also referred to as an LBT protocol with random back-off (with fixed or variable contention window size), and the two terms are used inter-changeably in this disclosure. Other examples of load based LBT protocol include Category 3 LBT and Category 4 LBT procedures as described in [10].

In an embodiment, q0 or q1 values can be fixed or configurable for LAA devices, such as q1=25, or q1=32, or a larger integer than 32, for example, 64. q0 or q1 can also be changed or adjusted over time according to a predetermined protocol, such as q0 or q1 can be linearly or exponentially incremented (within a maximum value) according to an outcome of CCA checks or according to the ACK/NACK feedbacks by the UE (this includes the case where q0 is fixed and q1 is adjusted over time).

The q1 value can depend on the purpose or type of intended transmission. For example, if the intended transmission is a discovery signal or a physical signal used for cell detection and/or coarse synchronization (such as within DMTC as proposed in [8]), then q1 can be configured with a smaller value compared to the case where the intended transmission is unicast data (such as q1=32 for unicast data and q1=5 for discovery signal). This implies that the discovery signal has a higher priority than the unicast message. In another example, q0 or q1 can be fixed if the intended transmission is a discovery signal or a physical signal used for cell detection or coarse synchronization. Conversely, q0 or q1 can be adapted, for example, with linear/exponential back-off for unicast control or data transmission (such as according to the ACK/NACK feedbacks by the UE or according to an outcome of CCA checks). In another example, q0 or q1 can be linearly incremented (within a maximum value) if the intended transmission is a discovery signal or a physical signal used for cell detection or coarse synchronization. Conversely, q0 or q1 can be exponentially incremented (within a maximum value) (exponentially backed-off) for unicast control or data transmission.

In another example, q0 or q1 or both can depend on the DMTC duration (such as proposed in [8]). For example, q1 can increase proportionally with the increase of DMTC duration, such as q1=α×DMTC duration, where a is a predefined or configurable value. In another example, the q1 value for a broadcast message can be smaller than the q1 value for unicast message. If the intended transmission contains multiple messages or transmission types, then the q1 value can depend on the message or transmission with the higher priority (such as a smaller q1 value). Further details on LBT protocol design depending on transmission type are discussed herein. Defining the CCA observation time or slot is also discussed herein.

The total time that an equipment makes use of an Operating Channel is the Maximum Channel Occupancy Time can be less than (13/32)×q2 ms, after which the device performs the Extended CCA as discussed herein. q2 can be the same as q1 if q1 is less than or equal to 32. If q1 is larger than 32, q2 can be 32 (other values smaller than 32 are also possible, such as q2=min (32, q1)). The actual Maximum Channel Occupancy Time can be rounded down to the nearest ms (such as 10.2 ms is rounded down to 10 ms). The actual Maximum Channel Occupancy Time can be capped to 10 ms, for example, so that a maximum channel occupancy time=max (10 ms, q2).

The maximum channel occupancy time can also depend on a purpose or type of intended transmission. For example, if the intended transmission is a discovery signal or a physical signal used for cell detection or coarse synchronization (such as within DMTC as proposed in [8]), then q2 or the maximum channel occupancy time can be a smaller value compared to the case where the intended transmission is unicast data. For example, the maximum channel occupancy time can be 10 ms for unicast data and 2 ms for discovery signal. In another example, the maximum channel occupancy time can be 4 ms for unicast data and 12 OFDM symbols for discovery signal.

In an embodiment, which may not be applicable if a UL is not supported or configured for LAA, the equipment, upon correct reception of a packet which was intended for this equipment, skips CCA and immediately proceeds with a transmission of management and control frames (such as ACK and Block ACK frames). A consecutive sequence of transmissions by the equipment, without it performing a new CCA, may not exceed the Maximum Channel Occupancy Time as defined herein.

The energy detection threshold for the CCA is proportional to the maximum transmit power (PH) of the transmitter. Thus, for a 23 dBm EIRP transmitter, the CCA threshold level (TL) is equal to or less than −73 dBm/MHz at the input to the receiver (while assuming a 0 dBi receive antenna). For some transmit power levels, the CCA threshold level TL is calculated using the formula TL=−73 dBm/MHz+23−PH (while assuming a 0 dBi receive antenna and PH specified in dBm EIRP).

Extended CCA procedure can also be applied to a "frame-based" LAA equipment, by treating each CCA slot before a frame as the CCA slot considered for the Extended CCA procedure. The parameters for extended CCA can be adapted or configured based upon the congestion level of the wireless channels, which can be quantified by the number of occupied CCA slots or the percentage of occupied CCA slots (such as from the most recent extended CCA procedure or the past few extended CCA procedures). For example, if the number or percentage of occupied CCA slots from the most recent extended CCA procedure is a greater than a first threshold, q1, which controls the amount of back-off, can be incremented by the LAA device. Likewise, if the number or percentage of occupied CCA slots is lower than a second threshold, a smaller q1 value can be set or the present q1 value can be decremented by the LAA device. The first threshold can be the same or different (such as lower) than the second threshold.

If a LAA device can determine the type of interference that occupies the wireless channel, the parameters for extended CCA can be adapted or configured based upon the type of interference source, such as the RAT type of the interference source. In one example, the value q1 can be configurable or adapted based upon the number or percentage of occupied CCA slots by non-LAA devices (such as from the most recent extended CCA procedure or the past few extended CCA procedures). For example, a larger q1 value can be set or the present q1 is incremented if the number or percentage of occupied CCA slots by non-LAA devices from the most recent extended CCA procedure is a greater than a first threshold. Likewise, if the number or percentage of occupied CCA slots by non-LAA devices is lower than a second threshold, a smaller q1 value can be set or the present q1 can be decremented by the LAA device. The first threshold can be the same or different (such as lower) than the second threshold.

In another example, the value q1 can also be configurable or adapted based upon the number or percentage of occupied CCA slots of LAA devices of different operator(s). For example, a larger q1 value can be set or the present q1 is incremented if the number or percentage of occupied CCA slots by LAA devices of different operator(s) from the most recent extended CCA procedure is a greater than a first threshold. Likewise, if the number or percentage of occupied CCA slots by LAA devices of different operator(s) is lower than a second threshold, a smaller q1 value can be set or the present q1 can be decremented by the LAA device.

As discussed herein, an LBT protocol can be different depending on the transmission type such as the physical signal/channel type or the transmission functionalities. One of the reasons is to enable higher priority for channel access for a certain transmission type, such that a discovery signal used for coarse synchronization may be given higher priority for channel access since acquiring coarse synchronization is important to the UE for control/data reception with discontinuous transmission on unlicensed spectrum. Another reason can be to enable easier multiplexing of discovery signals of multiple LAA cells in the same subframe.

In another example, if the intended transmission is a discovery signal or a physical signal used for cell detection or coarse synchronization and RRM (such as within DMTC as proposed in [8]), the LBT protocol can be according (or similar) to that defined for "frame-based equipment" of [7]. The LBT protocol for unicast control or data transmission can be according to that defined for "load-based equipment" of [7].

In one example configuration of a "frame-based" LBT protocol for the discovery signal for cell detection and/or coarse synchronization and RRM, the maximum channel occupancy time can be defined to be 1 ms (or 1 subframe) and the idle time following channel occupancy can be defined to be 1 OFDM symbol. In another example, the maximum channel occupancy time can be defined to be 1 subframe minus 1 OFDM symbol (such as 13 OFDM symbols for normal CP) and the idle time following channel occupancy can be defined to be 1 OFDM symbol. In another example, the maximum channel occupancy time can be defined to be 1 subframe minus 2 OFDM symbols (such as 12 OFDM symbols for normal CP) and the idle time following channel occupancy can be defined to be 2 OFDM symbols. In yet another example, the maximum channel occupancy time can be defined to be 1 slot and the idle time following channel occupancy can be defined to be 1 OFDM symbol or a fraction of 1 OFDM symbol (such as 0.046 ms). Other examples with more than 1 ms channel occupancy time are also possible, such as to improve measurement accuracy. It is noted that if discovery signal transmission for cell detection, RRM, or coarse synchronization can only be transmitted within a restricted resource, such as the DMTC duration as described in [8], then the "frame-based" LBT protocol operates only within the DMTC duration. An example of a "frame-based" LBT protocol is an LBT protocol based on a single sensing interval and the two terms are used interchangeably in this disclosure. Another example of a "frame-based" LBT is the Category 2 LBT procedure as described in [10].

An advantage of adopting a "frame-based" LBT protocol for the discovery signal for cell detection or coarse synchronization and RRM is to enable easier multiplexing of discovery signal transmissions from multiple neighboring cells in the same subframe or time location even if they are operating on the same carrier frequency. This is assuming the neighboring cells are time synchronized (such as for intra-operator deployment scenario) and that the CCA slots of the cells are also synchronized. Another advantage is that signal to reserve channel as is required for a "load-based" LBT protocol would not be necessary.

As a LAA cell needs to transmit the different transmission types from the same node, there is a need to specify how the two or more LBT protocols can interact with each other. In one approach, the LBT protocols can operate concurrently. For this approach, there is a need to specify how the back-off mechanism of a first "load-based" LBT protocol can be affected by the current states of the other LBT protocol such as the other "load-based" LBT protocol or a "frame-based" LBT protocol.

Assuming the first LBT protocol is contending for the channel, in a first embodiment, a back-off counter for the first "load based" LBT protocol is suspended or frozen during the transmission state corresponding to the second LBT protocol, such that the back-off counter value of the first LBT protocol does not decrement during transmission of signals after successful completion of the second LBT protocol. In one option, an additional idle period is inserted after the transmission corresponding to the second LBT protocol, before CCA is performed again for the first LBT protocol. The back-off counter can continue to count down if the CCA slot is idle. If the second LBT protocol is a "frame-based" protocol, the additional idle period can be the same as the idle period required after transmission for the second LBT protocol. In an embodiment, the idle period is included as a CCA slot for the first LBT protocol, implying that CCA needs to pass before the back-off counter can count down again. In another embodiment, the back-off counter is reset when the second LBT protocol starts transmission.

In a second embodiment, a back-off counter for the first "load based" LBT protocol continues as if the CCA slot is idle during the transmission state corresponding to the second LBT protocol. This is because it may be assumed that transmission due to the second LBT protocol can imply that the CCA slot check on external interference by the first "load based" LBT protocol would result in "idle" outcome assuming the other nodes would back off or stay idle due to the transmission. In one embodiment, an additional idle period is inserted after the transmission corresponding to the second LBT protocol in case the first LBT protocol has not begun transmission during the transmission period corresponding to the second LBT protocol. If the second LBT protocol is a "frame-based" protocol, the additional idle period can be the same as the idle period required after transmission for the second LBT protocol. In another embodiment, the idle period is included as a CCA slot for the first LBT protocol, implying that CCA needs to pass before the back-off counter can count down again. In yet another embodiment, further restriction can be imposed on the transmission due to the first LBT protocol in case transmission occurs during the transmission period corresponding to the second LBT protocol, for example the maximum channel occupancy time is limited to that configured or defined for the second LBT protocol.

In a third embodiment, a back-off counter for the first "load based" LBT protocol goes to zero after the state of the second LBT protocol transitions to a transmission state, which implies that the first "load based" LBT protocol can transition to the transmission state. This means that the transmissions from the first and the second LBT protocols can be multiplexed in the same subframe(s). The advantage, in the case, is that the first LBT protocol obtains more transmission opportunity. In an embodiment, further restriction can be imposed on the transmission due to the first LBT protocol, for example the maximum channel occupancy time is limited to that configured or defined for the second LBT protocol.

In fourth embodiment, the first, second, or third embodiment is applied based on the transmission type corresponding to the first LBT protocol. For example, if the first LBT protocol corresponds to a transmission type to support RRM or coarse synchronization, then the first LBT protocol follows the third embodiment and if the first LBT protocol corresponds to a transmission of unicast control/data, then the first LBT protocol follows the first embodiment or the second embodiment. The reason can be to provide channel access priority to RRM or coarse synchronization functionalities.

Since the transmission priority can be different for different transmission type, additional mechanisms to control transmission priority depending on transmission type can be beneficial. In one approach, the CCA slot duration can depend on transmission type. A longer CCA slot duration can be defined for transmission type of lower priority. For example, if discovery signal used for coarse synchronization and RRM is given a higher priority over unicast control or data transmission, the CCA slot duration for discovery signal can be shorter (such as 20 µs) than the CCA slot duration for unicast control or data transmission (such as 30 µs, 34 µs, 40 µs). In another approach, the channel can be sensed to be idle by the transmitter for a different time duration after the last detected busy CCA slot before resuming normal CCA slot duration (such as 20 µs) (for continuing back-off counter decrement (such as load based) or for determining transmission decision (such as frame based)) depending on the transmission type. For example, a time duration can be 0 µs for a transmission type with a high priority, while a time duration can be 20 µs for a transmission type with a low priority.

Figure 26:
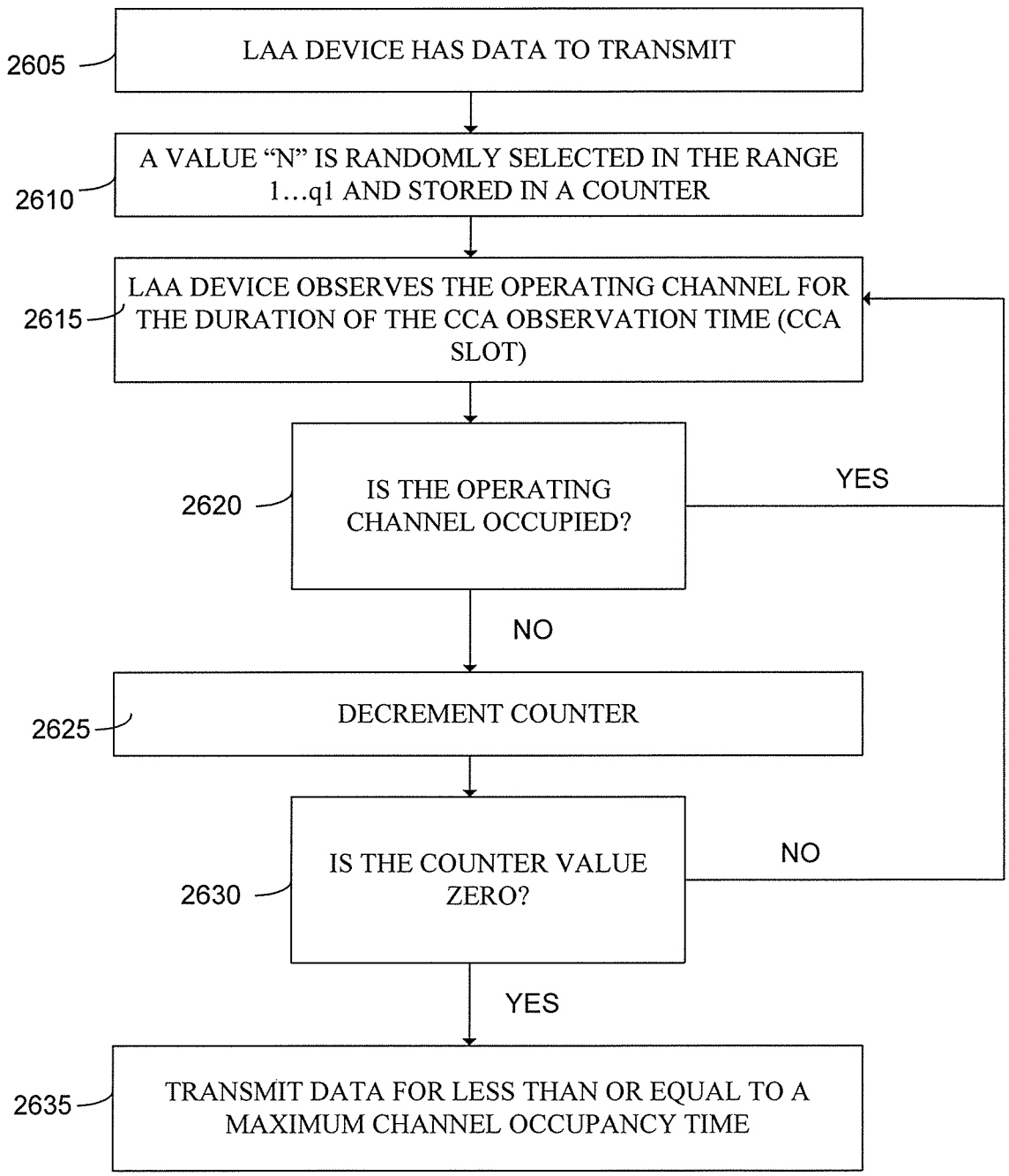
FIG. 26 illustrates an example method according to this disclosure.

FIG. 26 illustrates an example method according to this disclosure. At step 2605, an LAA device receives data to transmit. At step 2610, an "N" value is randomly selected in the range of 1 to q1 and stored in a counter. At step 2615, the LAA device observes the operating channel for the duration of the CCA observation time (CCA SLOT). At step 2620, the LAA determines whether the operating channel is occupied. If the operating channel is occupied, then the LAA device again observes the operating channel for the duration of the CCA observation time (CCA SLOT) at step 2615. If the operating channel is not occupied, then, at step 2625, the counter is decremented. At step 2630, the LAA determines if the counter value is zero. If the counter value not zero, the LAA again observes the operating channel for the duration of the CCA observation time (CCA SLOT) at step 2615. If the counter value is zero, then, at step 2635, the LAA transmits data for less than or equal to a maximum channel occupancy time.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of implementing a listen-before-talk (LBT) protocol by a base station (BS), the method comprising:
   generating for transmission a discovery reference signal (DRS) and a data signal;
   initiating an LBT protocol based on a single sensing interval in order to access a channel for transmission of the DRS in contiguous orthogonal frequency-division multiplexing (OFDM) symbols, wherein the DRS is transmitted when the channel is determined to be idle during the single sensing interval; and
   initiating an LBT protocol with random back-off in order to access a channel for transmission of the data signal, wherein a back-off counter value of the LBT protocol with random back-off does not decrement when the DRS is transmitted in the channel.

2. The method of claim 1, wherein at least one of the DRS or the data signal comprises an initial signal, wherein the initial signal comprises a variable portion and a fixed portion, and wherein the fixed portion comprises at least one of a primary synchronization signal (PSS), a secondary synchronization signal (SSS), a common reference signal (CRS), or a cell specific reference signal (CSRS).

3. The method of claim 2, wherein the fixed portion is multiplexed with at least one of physical downlink control channel (PDCCH) or enhanced physical downlink control channel (EPDSCH).

4. The method of claim 1, wherein each of the DRS and the data signal comprises one of a two-slot demodulation reference signal (DM-RS) mapping pattern or a one-slot DM-RS mapping pattern.

5. The method of claim 4, wherein generating at least one of the DRS or the data signal for transmission comprises configuring at least one of the DRS or the data signal with the two-slot DM-RS mapping pattern or the one-slot DM-RS mapping pattern based on a channel access timing.

6. A base station (BS), comprising:
   a transceiver; and
   processing circuitry coupled to the transceiver and configured to:
      generate for transmission a discovery reference signal (DRS) and a data signal;
      initiate a listen-before-talk (LBT) protocol based on a single sensing interval in order to access a channel for transmission of the DRS in contiguous orthogonal frequency-division multiplexing (OFDM) symbols, wherein the DRS is transmitted when the channel is determined to be idle during the single sensing interval; and
      initiate an LBT protocol with random back-off in order to access a channel for transmission of the data signal, wherein a back-off counter value of the LBT protocol with random back-off does not decrement when the DRS is transmitted in the channel.

7. The BS of claim 6, wherein at least one of the DRS or the data signal comprises an initial signal, wherein the initial signal comprises a variable portion and a fixed portion, and wherein the fixed portion comprises at least one of a primary synchronization signal (PSS), a secondary synchronization signal (SSS), a common reference signal (CRS), or a cell specific reference signal (CSRS).

8. The BS of claim 7, wherein the fixed portion is multiplexed with at least one of physical downlink control channel (PDCCH) or enhanced physical downlink control channel (EPDSCH).

9. The BS of claim 6, wherein each of the DRS and the data signal comprises one of a two-slot demodulation reference signal (DM-RS) mapping pattern or a one-slot DM-RS mapping pattern.

10. The BS of claim 9, wherein the processing circuitry is further configured to configure at least one of the DRS or the data signal with the two-slot DM-RS mapping pattern or the one-slot DM-RS mapping pattern based on a channel access timing.

11. A method of implementing a listen-before-talk (LBT) protocol by a mobile station (MS), the method comprising:
   receiving a discovery reference signal (DRS) transmitted from a base station (BS) via a channel, wherein a timing of receipt of the DRS following an end of occupancy of the channel corresponds to use by the BS of an LBT protocol based on a single sensing interval, wherein the DRS is received in contiguous orthogonal frequency-division multiplexing (OFDM) symbols, wherein the DRS is transmitted when the channel is determined to be idle during the single sensing interval; and
   receiving a data signal transmitted from the BS via the channel, wherein a timing of receipt of the data signal following an end of occupancy of the channel corresponds to use by the BS of an LBT protocol with random back-off.

12. The method of claim 11, wherein at least one of the DRS or the data signal comprises an initial signal, wherein the initial signal comprises a variable portion and a fixed portion, and wherein the fixed portion comprises at least one of a primary synchronization signal (PSS), a secondary synchronization signal (SSS), a common reference signal (CRS), or a cell specific reference signal (CSRS).

13. The method of claim 12, wherein the fixed portion is multiplexed with at least one of physical downlink control channel (PDCCH) or enhanced physical downlink control channel (EPDSCH).

14. The method of claim 11, wherein each of the DRS and the data signal comprises one of a two-slot demodulation reference signal (DM-RS) mapping pattern or a one-slot DM-RS mapping pattern.

15. The method of claim 14, wherein the DRS and the data signal is configured with the two-slot DM-RS mapping pattern or the one-slot DM-RS mapping pattern based on a channel access timing.

16. A mobile station (MS), comprising:
   a transceiver; and
   processing circuitry coupled to the transceiver and configured to:
      detect a reception, via the transceiver, of a discovery reference signal (DRS) transmitted from a base station (BS) via a channel, wherein a timing of receipt of the DRS following an end of occupancy of the channel corresponds to use by the BS of an LBT protocol based on a single sensing interval, wherein the DRS is received in contiguous orthogonal frequency-division multiplexing (OFDM) symbols, wherein the DRS is transmitted when the channel is determined to be idle during the single sensing interval; and detect a reception, via the transceiver, of a data signal transmitted from the BS via the channel, wherein a timing of receipt of the data signal following an end of occupancy of the channel corresponds to use by the BS of an LBT protocol with random back-off.

17. The MS of claim 16, wherein at least one of the DRS or the data signal comprises an initial signal, wherein the initial signal comprises a variable portion and a fixed portion, and wherein the fixed portion comprises at least one of a primary synchronization signal (PSS), a secondary synchronization signal (SSS), a common reference signal (CRS), or a cell specific reference signal (CSRS).

18. The MS of claim 17, wherein the fixed portion is multiplexed with at least one of physical downlink control channel (PDCCH) or enhanced physical downlink control channel (EPDSCH).

19. The MS of claim 16, wherein each of the DRS and the data signal comprises one of a two-slot demodulation reference signal (DM-RS) mapping pattern or a one-slot DM-RS mapping pattern.

20. The MS of claim 19, wherein the DRS and the data signal is configured with the two-slot DM-RS mapping pattern or the one-slot DM-RS mapping pattern based on a channel access timing.

\* \* \* \* \*